(12) United States Patent
Luo et al.

(10) Patent No.: US 11,802,073 B2
(45) Date of Patent: Oct. 31, 2023

(54) SILICOBORATE AND BOROSILICATE GLASSES WITH HIGH REFRACTIVE INDEX AND LOW DENSITY

(71) Applicant: CORNING INCORPORATED, Corning, NY (US)

(72) Inventors: Jian Luo, Painted Post, NY (US); Lina Ma, Corning, NY (US); Alexander I Priven, Chungchongnam-do (KR)

(73) Assignee: Corning Incorporated, Corning, NY (US)

(*) Notice: Subject to any disclaimer, the term of this patent is extended or adjusted under 35 U.S.C. 154(b) by 136 days.

(21) Appl. No.: 17/398,541

(22) Filed: Aug. 10, 2021

(65) Prior Publication Data

US 2022/0073414 A1   Mar. 10, 2022

Related U.S. Application Data

(60) Provisional application No. 63/076,547, filed on Sep. 10, 2020.

(51) Int. Cl.
  *C03C 3/097* (2006.01)
(52) U.S. Cl.
  CPC .................... *C03C 3/097* (2013.01)
(58) Field of Classification Search
  CPC ................. C03C 3/068; C03C 3/097
  See application file for complete search history.

(56) References Cited

U.S. PATENT DOCUMENTS

| | | | |
|---|---|---|---|
| 3,460,954 A | 8/1969 | Young | |
| 3,563,773 A | 2/1971 | Heinz et al. | |
| 3,999,997 A | 12/1976 | Faulstich et al. | |
| 4,390,638 A | 6/1983 | Mennemann et al. | |
| 4,584,279 A | 4/1986 | Grabowski et al. | |
| 4,732,876 A | 3/1988 | Nagamine et al. | |
| 4,742,028 A | 5/1988 | Boudot et al. | |
| 4,996,173 A | 2/1991 | Tachiwana | |
| 5,288,669 A | 2/1994 | Grateau et al. | |

(Continued)

FOREIGN PATENT DOCUMENTS

| | | |
|---|---|---|
| CN | 101215082 A | 7/2008 |
| CN | 102219374 A | 10/2011 |

(Continued)

OTHER PUBLICATIONS

Bengisu et al., Glasses and glass-ceramics in the SrO-TiO2-Al2O3-SiO2-B2O3 system and the effect of P2O5 additions, J.Mater.Sci., 2008, vol. 43, No. 10, p. 3531-3538.

(Continued)

*Primary Examiner* — Karl E Group
(74) *Attorney, Agent, or Firm* — Kevin L. Bray

(57) ABSTRACT

Glasses containing silicon dioxide ($SiO_2$) and/or boron oxide ($B_2O_3$) as glass formers and having a refractive index $n_d$ of greater than or equal to 1.9, as measured at 587.56 nm, and a density of less than or equal to 5.5 g/cm$^3$, as measured at 25° C., are provided. Optionally, the glasses may be characterized by a high transmittance in the visible and near-ultraviolet (near-UV) range of the electromagnetic spectrum and/or good glass forming ability.

20 Claims, 7 Drawing Sheets

(56) References Cited

U.S. PATENT DOCUMENTS

| | | |
|---|---|---|
| 5,693,580 A | 12/1997 | Brow et al. |
| 5,747,397 A | 5/1998 | Mcpherson et al. |
| 6,121,176 A | 9/2000 | Comte |
| 6,187,702 B1 | 2/2001 | Morishita |
| 6,333,288 B1 | 12/2001 | Clement et al. |
| 6,413,894 B1 | 7/2002 | Sato |
| 7,091,145 B2 | 8/2006 | Wolff et al. |
| 7,232,779 B2 | 6/2007 | Kasuga et al. |
| 7,490,485 B2 | 2/2009 | Endo |
| 7,538,051 B2 | 5/2009 | Fujiwara et al. |
| 7,563,738 B2 | 7/2009 | Uehara |
| 7,598,193 B2 | 10/2009 | Endo |
| 7,605,099 B2 | 10/2009 | Wolff et al. |
| 7,615,507 B2 | 11/2009 | Endo |
| 7,655,585 B2 | 2/2010 | Hayashi |
| 7,737,064 B2 | 6/2010 | Fu |
| 7,827,823 B2 | 11/2010 | Kasuga et al. |
| 7,897,532 B2 | 3/2011 | Onoda et al. |
| 8,012,896 B2 | 9/2011 | Fujiwara |
| 8,034,733 B2 | 10/2011 | Kobayashi et al. |
| 8,077,406 B2 | 12/2011 | Hachitani et al. |
| 8,399,371 B2 | 3/2013 | Saito |
| 8,404,606 B2 | 3/2013 | Wolff et al. |
| 8,486,850 B2 | 7/2013 | Li et al. |
| 8,507,394 B2 | 8/2013 | Shimizu |
| 8,575,048 B2 | 11/2013 | Negishi et al. |
| 8,647,996 B2 | 2/2014 | Takazawa |
| 8,661,853 B2 | 3/2014 | Negishi et al. |
| 8,728,963 B2 | 5/2014 | Negishi et al. |
| 8,741,795 B2 | 6/2014 | Zou et al. |
| 8,741,796 B2 | 6/2014 | Negishi et al. |
| 8,835,336 B2 | 9/2014 | Taguchi |
| 8,835,337 B2 | 9/2014 | Negishi |
| 8,846,555 B2 | 9/2014 | George et al. |
| 8,852,745 B2 | 10/2014 | Yamaguchi et al. |
| 8,859,444 B2 | 10/2014 | Yamaguchi et al. |
| 8,883,664 B2 | 11/2014 | Negishi |
| 9,018,116 B2 | 4/2015 | Schreder et al. |
| 9,169,152 B2 | 10/2015 | Kuang |
| 9,302,930 B2 | 4/2016 | Negishi et al. |
| 9,394,194 B2 | 7/2016 | Negishi |
| 9,416,047 B2 | 8/2016 | Yamaguchi |
| 9,487,432 B2 | 11/2016 | Kuang |
| 9,643,880 B2 | 5/2017 | Negishi |
| 10,259,738 B2 | 4/2019 | Sun |
| 10,287,205 B2 | 5/2019 | Sun |
| 2006/0105900 A1 | 5/2006 | Kasuga et al. |
| 2006/0189473 A1 | 8/2006 | Endo |
| 2009/0288450 A1 | 11/2009 | Kasuga et al. |
| 2015/0225282 A1 | 8/2015 | Kuang |
| 2016/0090320 A1 | 3/2016 | Negishi |
| 2018/0016182 A1 | 1/2018 | Sun |
| 2018/0057394 A1 | 3/2018 | Kikkawa et al. |
| 2018/0244559 A1 | 8/2018 | Akiba et al. |
| 2018/0251395 A1 | 9/2018 | Akiba et al. |
| 2021/0179479 A1* | 6/2021 | Amma .................... G02B 1/11 |

FOREIGN PATENT DOCUMENTS

| | | |
|---|---|---|
| CN | 102372430 A | 3/2012 |
| CN | 102910816 A | 2/2013 |
| CN | 103626394 A | 3/2014 |
| CN | 103708724 A | 4/2014 |
| CN | 108290771 A | 7/2018 |
| CN | 110510869 A | 11/2019 |
| CN | 110950531 A | 4/2020 |
| DE | 2653581 A1 | 6/1977 |
| DE | 3201344 A1 | 7/1983 |
| DE | 3201346 A1 | 7/1983 |
| DE | 4242859 A1 | 2/1994 |
| DE | 102006024805 A1 | 11/2007 |
| EP | 0570687 A1 | 11/1993 |
| EP | 0992461 A1 | 4/2000 |
| FR | 1214486 A | 4/1960 |
| GB | 2342918 B | 4/2001 |
| JP | 50-018509 A | 2/1975 |
| JP | 59-050048 A | 3/1984 |
| JP | 61-168551 A | 7/1986 |
| JP | 61-232243 A | 10/1986 |
| JP | 07-041334 A | 2/1995 |
| JP | 2000-128570 A | 5/2000 |
| JP | 2000-159537 A | 6/2000 |
| JP | 3060914 B2 | 7/2000 |
| JP | 2001-072432 A | 3/2001 |
| JP | 2001-342035 A | 12/2001 |
| JP | 2002-173334 A | 6/2002 |
| JP | 2002-362939 A | 12/2002 |
| JP | 2003-252646 A | 9/2003 |
| JP | 2004-175632 A | 6/2004 |
| JP | 2005-008518 A | 1/2005 |
| JP | 2005-047732 A | 2/2005 |
| JP | 2005-239506 A | 9/2005 |
| JP | 2006-111499 A | 4/2006 |
| JP | 2006-248897 A | 9/2006 |
| JP | 2007-112697 A | 5/2007 |
| JP | 2007-153734 A | 6/2007 |
| JP | 2008-105863 A | 5/2008 |
| JP | 2008-214135 A | 9/2008 |
| JP | 4310538 B2 | 8/2009 |
| JP | 2009-263141 A | 11/2009 |
| KR | 10-2009-0026249 A | 3/2009 |
| SU | 986886 A1 | 1/1983 |
| TW | 201711973 A | 4/2017 |
| TW | 201713602 A | 4/2017 |
| TW | 201900572 A | 1/2019 |
| WO | 98/32706 A1 | 7/1998 |
| WO | 2006/106781 A1 | 10/2006 |
| WO | 2011/086855 A1 | 7/2011 |
| WO | 2012/099168 A1 | 7/2012 |
| WO | 2012/133420 A1 | 10/2012 |
| WO | 2013/049988 A1 | 4/2013 |
| WO | 2014/048362 A1 | 4/2014 |
| WO | 2014/187132 A1 | 11/2014 |
| WO | 2017/110304 A1 | 6/2017 |
| WO | 2019/017205 A1 | 1/2019 |
| WO | 2019/021689 A1 | 1/2019 |
| WO | 2019/031095 A1 | 2/2019 |
| WO | 2019/131123 A1 | 7/2019 |
| WO | 2020/045417 A1 | 3/2020 |
| WO | WO-2020045417 A1 * | 3/2020 ......... C03C 17/3417 |
| WO | 2020/063208 A1 | 4/2020 |

OTHER PUBLICATIONS

Burger et al., "Phase equilibrium, glass-forming, properties and structure of glasses in the TeO2-B2O3 system", Journal of Materials Science, 1984, vol. 19, No. 2, pp. 403-412.

Burger et al., R transmission and properties of glasses in the TeL2-RnOm, RnXm, Rn(SO4)m, Rn(PO3)mandB2L3] systems, Infrared Physics, 1985, vol. 25, No. 1-2, pp. 395-409.

Fargin et al., "Optical non-linearity in oxide glasses", Journal of Non-Crystalline Solids, 1996, vol. 203, p. 96-101.

Gupta et al., "Mid-IR transparent TeO2-TiO2-La2O3 glass and its crystallization behaviour for photonic applications", J.Am.Ceram. Soc., 2018, vol. 101, No. 9, p. 3900-3916.

Hakamatsuka et al., "Electrical properties of vanadium borophosphate glasses", J.Ceram.Soc. Jpn, 1981, vol. 89, No. 9, p. 461-470.

Madheshiya et al., "Synthesis, structural and X-ray absorption spectroscopy of (PbxBi1-x). TiO3 borosilicate glass and glass ceramics" Journal of Asian Ceramic Societies', 2017, vol. 5, No. 3, p. 276-283.

Saddeek et al., "Optical study of lead borosilicate glasses", Physica B: Condensed Matter, 2010, vol. 405, No. 10, p. 2407-2412.

Singh et al., "Effect of La2O3 concentration on structural, optical and cytotoxicity behaviours of strontium titanate borosilicate glasses", In Journal of Non-Crystalline Solids, vol. 481, 2018, pp. 176-183.

Strimple J.H.,Giess E.A., Glass formation and properties of glasses in the system Na2O-B2O3-SiO2-TiO2., J.American Ceramic Society, 1958, vol. 41, No. 7, p. 231-237.

International Search Report and Written Opinion of the International Searching Authority; PCT/US2021/046897; dated Apr. 7, 2022, 20 pages; European Patent Office.

(56) References Cited

OTHER PUBLICATIONS

International Search Report and Written Opinion of the International Searching Authority; PCT/US2021/047544; dated Dec. 10, 2021; 12 pages; European Patent Office.
International Search Report and Written Opinion of the International Searching Authority; PCT/US2021/047434; dated Dec. 13, 2021; 14 pages; European Patent Office.

\* cited by examiner

SILICOBORATE AND BOROSILICATE GLASSES WITH HIGH REFRACTIVE INDEX AND LOW DENSITY

This Application claims priority under 35 USC § 119(e) from U.S. Provisional Patent Application Ser. No. 63/076,547 filed on Sep. 10, 2020 which is incorporated by reference herein in its entirety.

FIELD

The present disclosure generally relates to silicoborate and borosilicate glasses having a high refractive index and low density.

BACKGROUND

Glass is used in a variety of optical devices, examples of which include augmented reality devices, virtual reality devices, mixed reality devices, eye wear, etc. Desirable properties for this type of glass often include a high refractive index and a low density. Additional desirable properties may include high transmission in the visible and near-ultraviolet (near-UV) range of the electromagnetic spectrum and/or low optical dispersion. It can be challenging to find glasses having the desired combination of these properties and which can be formed from compositions having good glass-forming ability. For example, generally speaking, as the refractive index of a glass increases, the density also tends to increase. Species such as $TiO_2$ and $Nb_2O_5$ are often added to increase the refractive index of a glass without increasing the density of the glass. However, these materials often absorb blue and UV light, which can undesirably decrease the transmittance of light in this region of the spectrum by the glass. Often, attempts to increase the refractive index of a glass while maintaining a low density, and without decreasing transmittance in the blue and UV region of the spectrum, can result in a decrease in the glassforming ability of the material. For example, crystallization and/or liquid-liquid phase separation can occur during cooling of the glass melt at cooling rates that are generally acceptable in the industry. Typically, the decrease in glass-forming ability appears as the amount of certain species, such as $ZrO_2$, $Y_2O_3$, $Sc_2O_3$, BeO, etc. increases.

Low density, high refractive index glasses often belong to one of two types of chemical systems, based on the glass formers used: (a) silicoborate or borosilicate glasses in which $SiO_2$ and/or $B_2O_3$ are used as the main glass formers and (b) phosphate glasses in which $P_2O_5$ is used as a main glass former. Glasses which rely on other oxides as main glass formers, such as $GeO_2$, $TeO_2$, $Bi_2O_3$, and $V_2O_5$, can be challenging to use due to cost, glass-forming ability, optical properties, and/or production requirements.

Phosphate glasses can be characterized by a high refractive index and low density, however, phosphate glasses can be challenging to produce due to volatilization of $P_2O_5$ from the melts and/or risks of platinum incompatibility. In addition, phosphate glasses are often highly colored and may require an extra bleaching step to provide a glass having the desired transmittance characteristic. Furthermore, phosphate glasses exhibiting a high refractive index also tend to have an increase in optical dispersion.

Silicoborate and borosilicate glasses are typically easier to produce and can exhibit a high transmittance without a bleaching step. However, silicoborate and borosilicate glasses typically exhibit an increase in density at increasing refractive indices, compared to phosphate glasses.

In view of these considerations, there is a need for silicoborate and borosilicate glasses having a high refractive index and low density, optionally in combination with a high transmittance in the visible and near UV-range and/or which are made from compositions that provide good glass-forming ability.

SUMMARY

According to an embodiment of the present disclosure, a glass comprises $SiO_2$ of from 14.0 mol % to 50.0 mol %, $B_2O_3$ at greater than 0.0 mol %, $TiO_2$ from 5.0 mol % to 40.0 mol %, $Nb_2O_5$ of from 2.2 mol % to 50.0 mol %, $ZrO_2$ from 2.5 mol % to 25.0 mol %, a total content of rare earth metal oxides ($RE_mO_n$) of from 0.0 mol % to 30.0 mol %, and other oxide species, when present, present at 0.5 mol % or less. A ratio of an amount of $B_2O_3$ to an amount of $SiO_2$ ($B_2O_3$/$SiO_2$), in mole percent of oxide, is at least 0.050. Further, the glass is substantially free of $Y_2O_3$.

According to another embodiment of the present disclosure, a glass comprises $B_2O_3$ of from 1.0 mol % to 40.0 mol %, $La_2O_3$ at 13.5 mol % or greater, $SiO_2$ at greater than or equal to 0.0 mol %, wherein a sum of ($SiO_2$+$B_2O_3$) is from 1.0 mol % to 50.0 mol %, and at least one oxide selected from rare earth metal oxides, $Al_2O_3$, $Nb_2O_5$, $TiO_2$, $ThO_2$, $GeO_2$, $P_2O_5$, ZnO, $Y_2O_3$, BaO, $Bi_2O_3$, CaO, $Er_2O_3$, $Gd_2O_3$, $K_2O$, $La_2O_3$, $Li_2O$, $Na_2O$, $Nd_2O_3$, PbO, $TeO_2$, $WO_3$, $Yb_2O_3$, and $ZrO_2$, subject to the proviso that: $Nb_2O_5$ is from 0.0 mol % to 12.3 mol %; $TiO_2$ is from 0.0 mol % to 33.0 mol %; $ThO_2$ is from 0.0 mol % to 5.0 mol %; $GeO_2$ is from 0.0 mol % to 10.0 mol %; $P_2O_5$ is from 0.0 mol % to 20.0 mol %; $Al_2O_3$ is from 0.0 mol % to 2.5 mol %; and a sum of (ZnO+$Y_2O_3$) is from 0.0 mol % to 2.5 mol %. The glass further satisfies formula (X):

$$P_n - (0.815 + 0.25 * P_d) > 0.000 \qquad (X)$$

where $P_n$ is a refractive index parameter of the glass and is calculated according to formula (VIII):

$$\begin{aligned} P_n = {} & 1.817 - 0.0035654 * Al_2O_3 - 0.0038101 * B_2O_3 + \\ & 0.00081216 * BaO + 0.010373 * Bi_2O_3 + 0.00013728 * CaO + \\ & 0.0073116 * Er_2O_3 + 0.0055226 * Gd_2O_3 - 0.003343 * K_2O + \\ & 0.0060806 * La_2O_3 - 0.0009011 * Li_2O - 0.001967 * Na_2O + \\ & 0.0093799 * Nb_2O_5 + 0.0060396 * Nd_2O_3 - 0.0061024 * P_2O_5 + \\ & 0.0040356 * PbO - 0.0032812 * SiO_2 + 0.0030562 * TeO_2 + \\ & 0.0034148 * TiO_2 + 0.004267 * WO_3 + 0.0034424 * Y_2O_3 + \\ & 0.0071109 * Yb_2O_3 + 0.00096907 * ZnO + 0.0026412 * ZrO_2 \end{aligned} \quad \text{(VIII)}$$

and
$P_d$ is a density parameter and is calculated according to formula (IX):

$$\begin{aligned} P_d = {} & 4.17 - 0.018843 * Al_2O_3 - 0.020477 * B_2O_3 + \\ & 0.021988 * BaO + 0.074733 * Bi_2O_3 - 0.0024274 * CaO + \\ & 0.100258 * Er_2O_3 + 0.074270 * Gd_2O_3 - 0.018568 * K_2O + \\ & 0.060370 * La_2O_3 - 0.0089006 * Li_2O - 0.0090924 * Na_2O + \\ & 0.0062468 * Nb_2O_5 + 0.068993 * Nd_2O_3 - 0.038868 * P_2O_5 + \end{aligned} \quad \text{(IX)}$$

$$0.048530*PbO - 0.018196*SiO_2 + 0.013124*TeO_2 -$$
$$0.005285*TiO_2 + 0.044564*WO_3 + 0.022887*Y_2O_3 +$$
$$0.097857*Yb_2O_3 + 0.0077032*ZnO + 0.012501*ZrO_2$$

and each oxide listed in formula (VIII) and formula (IX) refers to the amount of the oxide, expressed in mol %, in the glass.

According to yet another embodiment, a glass comprises $B_2O_3$ at 14.5 mol % or greater, $SiO_2$ at 2.0 mol % or greater, and wherein a sum of $(SiO_2+B_2O_3)$ is from 3.0 mol % to 50.0 mol %, $Nb_2O_5$ from 1.0 mol % to 45.0 mol %, and at least one oxide selected from monovalent metal oxides, divalent metal oxides, rare earth metal oxides, $As_2O_3$, $Sb_2O_3$, $Al_2O_3$, $TiO_2$, $MoO_3$, $Ta_2O_5$, $GeO_2$, $P_2O_5$, $ZnO$, $Y_2O_3$, $BaO$, $Bi_2O_3$, $CaO$, $Er_2O_3$, $Gd_2O_3$, $Ga_2O_3$, $K_2O$, $La_2O_3$, $Li_2O$, $Na_2O$, $Nd_2O_3$, $PbO$, $TeO_2$, $WO_3$, $Yb_2O_3$, and $ZrO_2$, subject to the proviso that: $TiO_2$ is from 0.0 mol % to 36.0 mol %; $ZrO_2$ is at 0.0 mol % or greater; $Y_2O_3$ is from 0.0 mol % to 1.0 mol %; $Ta_2O_5$ is from 0.0 mol % to 1.5 mol %; $GeO_2$ is from 0.0 mol % to 0.5 mol %; $CaO$ is from 0.0 mol % to 15.0 mol %; $P_2O_5$ is from 0.0 mol % to 20.0 mol %; $Al_2O_3$ is from 0.0 mol % to 2.5 mol %; $ZnO$ is from 0.0 mol % to 5.5 mol %; $MoO_3$ is from 0.0 mol % to 3.0 mol %; $MgO$ is from 0.0 mol % to 15.0 mol %; $Ga_2O_3$ is from 0.0 mol % to 5.0 mol %; $Li_2O$ is from 0.0 mol % to 8.0 mol %; $TeO_2$ is from 0.0 mol % to 10.0 mol %; a total content of monovalent metal oxides $(R_2O)$ is from 0.0 mol % to 15.0 mol %; a total content of rare earth metal oxides $(RE_mO_n)$ is from 0.0 mol % to 50.0 mol %; a sum of $(As_2O_3+Sb_2O_3)$ is from 0.0 mol % to 1.0 mol %; a sum of $(RE_mO_n+TiO_2+Nb_2O_5+ZrO_2+Bi_2O_3+WO_3)$ is 25.0 mol % or greater; and a sum of $(R_2O+RO-BaO)$ is from 0.0 mol % to 20.0 mol %, where RO is a total content of divalent metal oxides. The glass is further substantially free of fluorine. In addition, the glass satisfies formula (XII):

$$P_n-(0.815+0.25*P_d)-(0.16-0.38*T_i)>0.000 \quad (XII)$$

where $P_n$ is a refractive index parameter having a value of 1.85 or greater and is calculated according to formula (VIII):

$$P_n = 1.817 - 0.0035654*Al_2O_3 - 0.0038101*B_2O_3 + \quad (VIII)$$
$$0.00081216*BaO + 0.010373*Bi_2O_3 + 0.00013728*CaO +$$
$$0.0073116*Er_2O_3 + 0.0055226*Gd_2O_3 - 0.003343*K_2O +$$
$$0.0060806*La_2O_3 - 0.0009011*Li_2O - 0.001967*Na_2O +$$
$$0.0093799*Nb_2O_5 + 0.0060396*Nd_2O_3 - 0.0061024*P_2O_5 +$$
$$0.0040356*PbO - 0.0032812*SiO_2 + 0.0030562*TeO_2 +$$
$$0.0034148*TiO_2 + 0.004267*WO_3 + 0.0034424*Y_2O_3 +$$
$$0.0071109*Yb_2O_3 + 0.00096907*ZnO + 0.0026412*ZrO_2$$

where $P_d$ a density parameter calculated according to formula (IX):

$$P_d = 4.17 - 0.018843*Al_2O_3 - 0.020477*B_2O_3 + \quad (IX)$$
$$0.021988*BaO + 0.074733*Bi_2O_3 - 0.0024274*CaO +$$
$$0.100258*Er_2O_3 + 0.074270*Gd_2O_3 - 0.018568*K_2O +$$
$$0.060370*La_2O_3 - 0.0089006*Li_2O - 0.0090924*Na_2O +$$
$$0.0062468*Nb_2O_5 + 0.068993*Nd_2O_3 - 0.038868*P_2O_5 +$$
$$0.048530*PbO - 0.018196*SiO_2 + 0.013124*TeO_2 -$$
$$0.005285*TiO_2 + 0.044564*WO_3 + 0.022887*Y_2O_3 +$$
$$0.097857*Yb_2O_3 + 0.0077032*ZnO + 0.012501*ZrO_2$$

and
where $T_i$ is a transmittance index calculated according to formula (VI):

$$T_i = \frac{(La_2O_3 + Gd_2O_3 + ZrO_2)}{(La_2O_3 + Gd_2O_3 + ZrO_2 + TiO_2 + Nb_2O_5)} \quad (VI)$$

and each oxide listed in formula (VIII), formula (IX), and formula (VI) refers to the amount of the oxide, expressed in mol %, in the glass.

These and other aspects, objects, and features of the present disclosure will be understood and appreciated by those skilled in the art upon studying the following specification, claims, and appended drawings.

DETAILED DESCRIPTION

Figure 1:
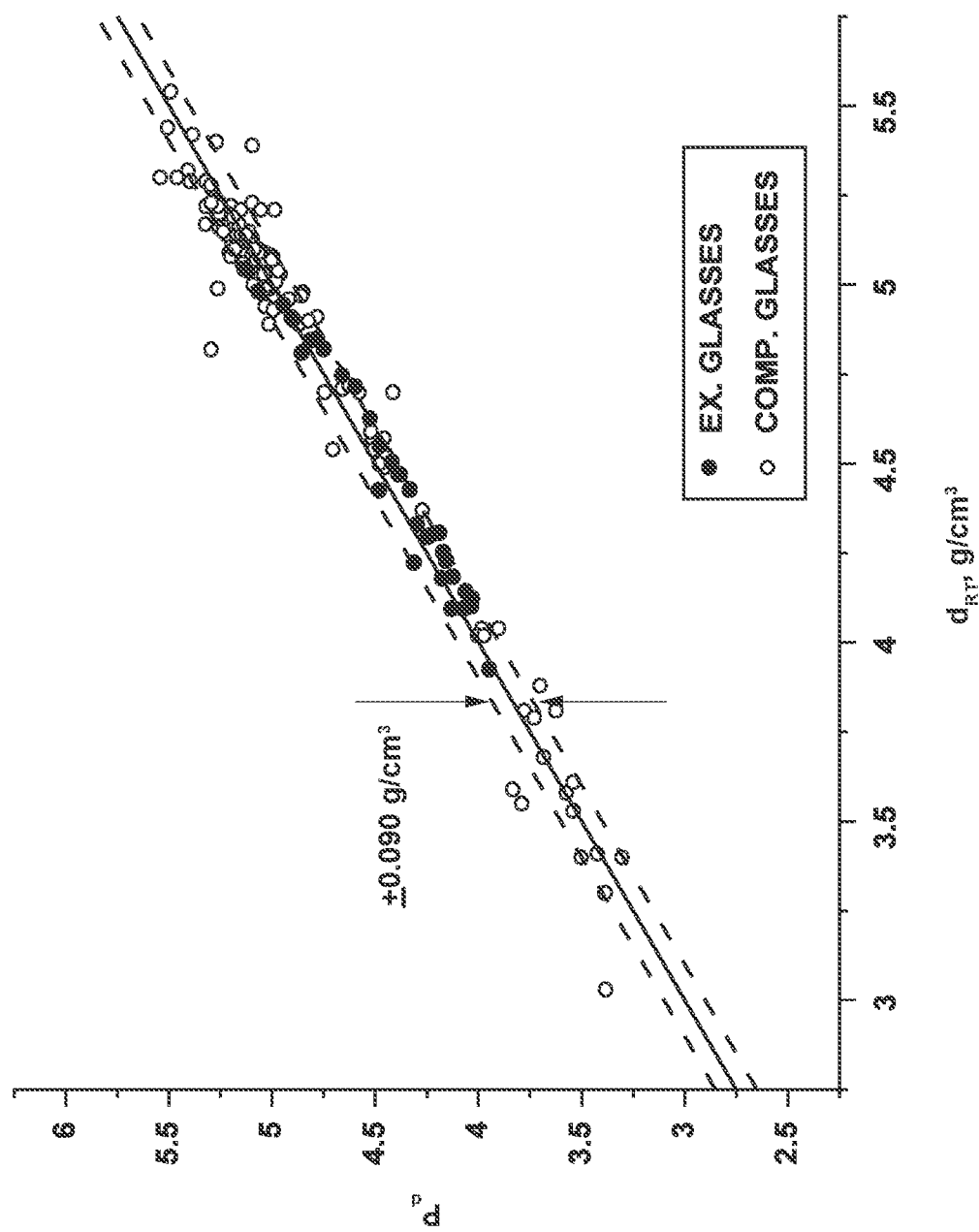
FIG. 1 is a plot illustrating the relationship between the density at room temperature $d_{RT}$ and the density parameter $P_d$ calculated according to formula (IX) for some comparative glasses and some exemplary glasses according to an embodiment of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those skilled in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "formed from" can mean one or more of comprises, consists essentially of, or consists of. For example, a component that is formed from a particular material can comprise the particular material, consist essentially of the particular material, or consist of the particular material.

Unless otherwise specified, all compositions are expressed in terms of as-batched mole percent (mol %). As will be understood by those having ordinary skill in the art, various melt constituents (e.g., fluorine, alkali metals, boron, etc.) may be subject to different levels of volatilization (e.g., as a function of vapor pressure, melt time and/or melt temperature) during melting of the constituents. As such, the term "about," in relation to such constituents, is intended to encompass values within about 0.2 mol % when measuring final articles as compared to the as-batched compositions provided herein. With the forgoing in mind, substantial compositional equivalence between final articles and as-batched compositions is expected. In some embodiments, where indicated, the compositions may be expressed in terms of as-batched percent by weight of oxides (wt %).

In the case when fluorine is added to or is present in an oxide glass, the molecular representation of the resulting glass composition may be expressed in different ways. In the present disclosure, the content of fluorine as a single term, when present, is expressed in terms of atomic percent (at. %), which is determined based on the fraction of fluorine in a total sum of all atoms in a glass composition multiplied by a factor of 100.

In the present disclosure, the following method of representation of fluorine-containing compositions and concentration ranges is used. The concentration limits for all oxides (e.g. $SiO_2$, $B_2O_3$, $Na_2O$, etc.) are presented under the assumption that the respective cations (such as, for example, silicon [$Si^{4+}$], boron [$B^{3+}$], sodium [$Na^+$], etc.) are initially presented in the form of the corresponding oxides. When fluorine is present, for the purposes of calculating the concentration of components of the composition, some part of the oxygen in the oxide is equivalently replaced with fluorine (i.e. one atom of oxygen is replaced with two atoms of fluorine). The said fluorine is assumed to be present in the form of silicon fluoride ($SiF_4$); accordingly, the total sum of all oxides plus $SiF_4$ is assumed to be 100 mole percent or 100 weight percent in all compositions.

The terms "free" and "substantially free" are used interchangeably herein to refer to an amount and/or an absence of a particular component in a glass composition that is not intentionally added to the glass composition. It is understood that the glass composition may contain traces of a particular constituent component as a contaminant or a tramp in an amount of less than 0.10 mol %.

As used herein, the term "tramp," when used to describe a particular constituent component in a glass composition, refers to a constituent component that is not intentionally added to the glass composition and is present in an amount of less than 0.05 mol %. Tramp components may be unintentionally added to the glass composition as an impurity in another constituent component and/or through migration of the tramp component into the composition during processing of the glass composition.

The term "glass former" is used herein to refer to a component that, being solely present in the glass composition (i.e., without other components, except for tramps), is able to form a glass when cooling the melt at a rate of not greater than about 200° C./min to about 300° C./min.

The term "modifier", as used herein, refers to the oxides of monovalent or divalent metals, i.e., $M_2O$ or MO, where "M" stands for a metal. Modifiers can be added to a glass composition to change the atomic structure of the melt and the resulting glass. In some embodiments, the modifier may change the coordination numbers of cations present in the glass formers (e.g., boron in $B_2O_3$), which may result in forming a more polymerized atomic network and, as a result, may provide better glass formation.

As used herein, the term "RO" refers to a total content of divalent metal oxides, the term "$R_2O$" refers to a total content of monovalent metal oxides, and the term "$Alk_2O$" refers to a total content of alkali metal oxides. The term $R_2O$ encompasses alkali metal oxides ($Alk_2O$), in addition to other monovalent metal oxides, such as $Ag_2O$, $Tl_2O$, and $Hg_2O$, for example. As discussed below, in the present disclosure, a rare earth metal oxide is referred to herein by its normalized formula ($RE_2O_3$) in which the rare earth metal has the redox state "+3," and thus rare earth metal oxides are not encompassed by the term RO.

As used herein, the term "rare earth metals" refers to the metals listed in the Lanthanide Series of the IUPAC Periodic Table, plus yttrium and scandium. As used herein, the term "rare earth metal oxides," is used to refer to the oxides of rare earth metals in different redox states, such as "+3" for lanthanum in $La_2O_3$, "+4" for cerium in $CeO_2$, "+2" for europium in EuO, etc. In general, the redox states of rare earth metals in oxide glasses may vary and, in particular, the redox state may change during melting, based on the batch composition and/or the redox conditions in the furnace where the glass is melted and/or heat-treated (e.g., annealed). Unless otherwise specified, a rare earth metal oxide is referred to herein by its normalized formula in which the rare earth metal has the redox state "+3." Accordingly, in the case in which a rare earth metal having a redox state other than "+3" is added to the glass composition batch, the glass compositions are recalculated by adding or removing some oxygen to maintain the stoichiometry. For example, when $CeO_2$ (with cerium in redox state "+4") is used as a batch component, the resulting glass composition is recalculated assuming that two moles of $CeO_2$ is equivalent to one mole of $Ce_2O_3$, and the resulting glass composition is presented in terms of $Ce_2O_3$. As used herein, the term "$RE_mO_n$" is used to refer to the total content of rare earth metal oxides in all redox states present, and the term "$RE_2O_3$" is used to refer to the total content of rare earth metal oxides in the "+3" redox state.

The measured density values for the glasses reported herein were measured at room temperature in units of $g/cm^3$ using a Helium pycnometer having an error of 0.001 $g/cm^3$. As used herein, density measurements at room temperature (specified as $d_{RT}$) are indicated as being measured at 20° C. or 25° C., and encompass measurements obtained at temperatures that may range from 20° C. to 25° C. It is understood that room temperature may vary between about 20° C. to about 25° C., however, for the purposes of the present disclosure, the variation in density within the temperature range of 20° C. to 25° C. is expected to be less than the error of 0.001 $g/cm^3$, and thus is not expected to impact the room temperature density measurements reported herein.

As used herein, unless otherwise specified, the term "low density" means a density less than or equal to 5.5 $g/cm^3$ and the term "low density parameter" means a value of the density parameter $P_d$ is less than or equal to 5.5 $g/cm^3$.

As used herein, good glass forming ability refers to a resistance of the melt to devitrification as the material cools. Glass forming ability can be measured by determining the critical cooling rate of the melt. The terms "critical cooling rate" or "$v_{cr}$" are used herein to refer to the minimum cooling rate at which a melt of a given composition forms a glass free of crystals visible under an optical microscope under magnification from 100× to 500×. The critical cooling rate can be used to measure the glass-forming ability of a composition, i.e., the ability of the melt of a given glass composition to form glass when cooling. Generally speaking, the lower the critical cooling rate, the better the glass-forming ability.

The term "liquidus temperature" is used herein to refer to a temperature above which the glass composition is completely liquid with no crystallization of constituent components of the glass. The liquidus temperature values reported herein were obtained by measuring samples using either DSC or by isothermal hold of samples wrapped in platinum foil. For samples measured using DSC, powdered samples were heated at 10 K/min to 1250° C. The end of the endothermal event corresponding to the melting of crystals was taken as the liquidus temperature. For the second technique (isothermal hold), a glass block (about 1 $cm^3$) was wrapped in platinum foil, to avoid volatilization, and placed in a furnace at a given temperature for 17 hours. The glass block was then observed under an optical microscope to check for crystals.

The refractive index values reported herein were measured at room temperature (about 25° C.), unless otherwise specified. The refractive index values for a glass sample were measured using a Metricon Model 2010 prism coupler refractometer with an error of about ±0.0002. Using the Metricon, the refractive index of a glass sample was measured at two or more wavelengths of about 406 nm, 473 nm, 532 nm, 633 nm, 828 nm, and 1064 nm. The measured dependence characterizes the dispersion and was then fitted with a Cauchy's law equation or Sellmeier equation to allow for calculation of the refractive index of the sample at a given wavelength of interest between the measured wavelengths. The term "refractive index $n_d$" is used herein to refer to a refractive index calculated as described above at a wavelength of 587.56 nm, which corresponds to the helium d-line wavelength. The term "refractive index $n_C$" is used herein to refer to a refractive index calculated as described above at a wavelength of 656.3 nm. The term "refractive index $n_F$" is used herein to refer to a refractive index calculated as described above at a wavelength of 486.1 nm. The term "refractive index $n_g$" is used herein to refer to a refractive index calculated as described above at a wavelength of 435.8 nm.

As used herein, the terms "high refractive index" or "high index" refers to a refractive index value of a glass that is greater than or equal to at least 1.85, as measured at a wavelength of 587.56 nm, unless otherwise indicated. Where indicated, terms "high refractive index" or "high index" refers to a refractive index value of a glass that is greater than or equal to at least 1.85, greater than or equal to 1.90, greater than or equal to 1.95, or greater than or equal to 2.00, as measured at a wavelength of 587.56 nm. As used herein, the term "high refractive index parameter" refers to a value of the refractive index parameter $P_n$ that is greater than or equal to 1.85, greater than or equal to at least 1.90, greater than or equal to 1.95, or greater than or equal to 2.00.

As used herein, unless otherwise specified, the term "internal transmittance" is used to refer to the transmittance through a glass sample that is corrected for Fresnel losses. The term "transmittance" is used to refer to transmittance values for which Fresnel losses are not accounted for. Transmittance of the glass samples were measured on 2 mm thick samples with a Cary 5000 Spectrometer at wavelengths of from 250 nm to 2500 nm, at a resolution of 1 nm, and using an integrating sphere. The internal transmittance values for 10 mm thick samples was calculated between 375 nm and 1175 nm using the measured refractive index and the measured raw transmittance.

The term "blue light" is used herein to refer to light corresponding to wavelengths of from about 330 nm to about 480 nm. The term "internal transmittance for blue light" refers to transmittance to blue light that is corrected for Fresnel losses. The term "transmittance for blue light" refers to transmittance to blue light in which Fresnel losses are not taken into account.

Embodiments of the present disclosure generally relate to silicoborate and borosilicate glasses which have a high refractive index and a low density. In some embodiments, the glasses may also be characterized by a high transmittance in the visible and near-ultraviolet (near-UV) range of the electromagnetic spectrum. The glasses of the present disclosure can contain silica ($SiO_2$) and boron oxide ($B_2O_3$) as glass formers, and one or more additional modifiers and/or index raisers, examples of which include oxides of monovalent and divalent metals, $ZrO_2$, $La_2O_3$, $Nb_2O_5$, $TiO_2$, and $Gd_2O_3$. In some embodiments, the glasses may include a relatively low $TiO_2$ content and a relatively high content of $La_2O_3$, $ZrO_2$, and/or other low-absorbing oxide species.

According to an embodiment of the present disclosure, the glasses described herein include silicon dioxide ($SiO_2$) and/or boron oxide ($B_2O_3$) as glass formers. Increasing amounts of glass-forming oxides, such as $SiO_2$ and $B_2O_3$, can result in a corresponding increase in viscosity values at a given temperature, which may protect the melts from crystallization during cooling and thus provide a glass having a lower critical cooling rate. In some embodiments, the glass of the present disclosure may include both $SiO_2$ and $B_2O_3$ to provide a glass having a desirable critical cooling rate, i.e., a desired degree of glass forming ability.

According to some embodiments, the glass composition may comprise silica ($SiO_2$) in an amount of from greater than or equal to 0.0 mol % to less than or equal to 50.0 mol % and all ranges and sub-ranges between the foregoing values. In some embodiments, the glass composition may comprise $SiO_2$ in an amount greater than or equal to 0.0 mol %, greater than or equal to 2.0 mol %, greater than or equal to 4.0 mol %, greater than or equal to 6.0 mol %, greater than or equal to 10.0 mol %, greater than or equal to 12.0 mol %, greater than or equal to 14.0 mol %, greater than or equal to 20.0 mol %, greater than or equal to 30.0 mol %, greater than or equal to 40.0 mol %, greater than or equal to 44.0 mol %, greater than or equal to 46.0 mol %, or greater than or equal to 48.0 mol %. In some other embodiments, the glass composition may comprise $SiO_2$ in an amount less than or equal to 50.0 mol %, less than or equal to 48.0 mol %, less than or equal to 46.0 mol %, less than or equal to 44.0 mol %, less than or equal to 40.0 mol %, less than or equal to 30.0 mol %, less than or equal to 20.0 mol %, less than or equal to 10.0 mol %, less than or equal to 6.0 mol %, less than or equal to 4.0 mol %, or less than or equal to 2.0 mol %. In some more embodiments, the glass composition may comprise $SiO_2$ in an amount of from 0.0 mol % to 50.0 mol %, from 0.0 mol % to 44.0 mol %, from 0.0 mol % to 20.0 mol %, from 2.0 mol % to 50.0 mol %, from 2.0 mol % to 20.0 mol %, from 4.0 mol % to 50.0 mol %, from 4.0 mol % to 20.0 mol %, from 6.0 mol % to 46.0 mol %, from 6.0 mol % to 40.0 mol %, from 10.0 mol % to 20.0 mol %, from 14.0 mol % to 50.0 mol %, from 14.0 mol % to 45.0 mol %, from 14.0 mol % to 40.0 mol %, from 14.0 mol % to 36.0 mol %, from 14.0 mol % to 35.0 mol %, from 14.0 mol % to 30.0 mol %, from 30.0 mol % to 48.0 mol %, from 30.0 mol % to 46.0 mol %, from 30.0 mol % to 44.0 mol %, from 30.0 mol % to 40.0 mol %, from 20.0 mol % to 50.0 mol %, from 20.0 mol % to 45.0 mol %, from 20.0 mol % to 40.0 mol %, from 20.0 mol % to 35.0 mol %, from 20.0 mol % to 30.0 mol %, from 25.0 mol % to 50.0 mol %, from 25.0 mol % to 45.0 mol %, from 25.0 mol % to 40.0 mol %, from 25.0 mol % to 35.0 mol %, from 25.0 mol % to 30.0 mol %, from 2.0 mol % to 36.0 mol %, from 12.0 mol % to 36.0 mol %, from 8.0 mol % to 25.0 mol %, from 21.0 mol % to 42.0 mol %, or from 10.0 mol % to 32.0 mol %.

According to some embodiments, the glass composition may comprise boron oxide ($B_2O_3$) in an amount of from greater than or equal to 0.0 mol % to less than or equal to 51.0 mol % and all ranges and sub-ranges between the foregoing values. In some embodiments, the glass composition may comprise $B_2O_3$ in an amount greater than or equal to 0.0 mol %, greater than or equal to 1.0 mol %, greater than or equal to 2.0 mol %, greater than or equal to 4.0 mol %, greater than or equal to 6.0 mol %, greater than or equal to 10.0 mol %, greater than or equal to 14.0 mol %, greater than or equal to 14.5 mol %, greater than or equal to 17.0 mol %, greater than or equal to 20.0 mol %, greater than or equal to 30.0 mol %, greater than or equal to 40.0 mol %, or greater than or equal to 50.0 mol %. In some other embodiments, the glass composition may comprise $B_2O_3$ in an amount less than or equal to 51.0 mol %, less than or equal to 50.0 mol %, less than or equal to 40.0 mol %, less than or equal to 30.0 mol %, less than or equal to 20.0 mol %, less than or equal to 10.0 mol %, less than or equal to 6.0 mol %, less than or equal to 4.0 mol %, or less than or equal to 2.0 mol %. In some more embodiments, the glass composition may comprise $B_2O_3$ in an amount of from 0.0 mol % to 51.0 mol %, from 14.5 mol % to 51.0 mol %, from 0.0 mol % to 30.0 mol %, from 14.5 mol % to 30.0 mol %, from 1.0 mol % to 40.0 mol %, from 2.0 mol % to 40.0 mol %, from 4.0 mol % to 40.0 mol %, from 14.5 mol % to 40.0 mol %, from 6.0 mol % to 51.0 mol %, from 6.0 mol % to 40.0 mol %, from 6.0 mol % to 20.0 mol %, from 10.0 mol % to 50.0 mol %, from 10.0 mol % to 40.0 mol %, from 10.0 mol % to 30.0 mol %, from 10.0 mol % to 20.0 mol %, from 14.5 mol % to 50.0 mol %, from 14.5 mol % to 40.0 mol %, from 14.5 mol % to 30.0 mol %, from 14.5 mol % to 20.0 mol %, from 20.0 mol % to 51.0 mol %, from 20.0 mol % to 50.0 mol %, from 20.0 mol % to 40.0 mol %, from 20.0 mol % to 30.0 mol %, from 30.0 mol % to 50.0 mol %, from 14.0 mol % to 48.0 mol %, from 30.0 mol % to 40.0 mol %, from 3.0 mol % to 30.0 mol %, from 15.0 mol % to 32.0 mol %, or from 13.0 mol % to 38.0 mol %.

However, the combination of $SiO_2$ and $B_2O_3$ may result in a decrease of the refractive index, which may make it more challenging to provide a glass having the desired high refractive index. Therefore, in some embodiments, total amount of $SiO_2$ and $B_2O_3$ ($SiO_2+B_2O_3$) in the glasses may be limited. In some embodiments, the glass composition may comprise a sum of ($SiO_2+B_2O_3$) in an amount from greater than or equal to 0.0 mol % to less than or equal to 50.0 mol % and all ranges and sub-ranges between the foregoing values. In some embodiments, the glass composition may comprise ($SiO_2+B_2O_3$) in an amount greater than or equal to 0.0 mol %, greater than or equal to 1.0 mol %, greater than or equal to 2.0 mol %, greater than or equal to 3.0 mol %, greater than or equal to 4.0 mol %, greater than or equal to 6.0 mol %, greater than or equal to 10.0 mol %, greater than or equal to 20.0 mol %, greater than or equal to 30.0 mol %, greater than or equal to 40.0 mol %, greater than or equal to 44.0 mol %, greater than or equal to 46.0 mol %, or greater than or equal to 48.0 mol %. In some other embodiments, the glass composition may comprise ($SiO_2+B_2O_3$) in an amount less than or equal to 50.0 mol %, less than or equal to 48.0 mol %, less than or equal to 46.0 mol %, less than or equal to 44.0 mol %, less than or equal to 40.0 mol %, less than or equal to 30.0 mol %, less than or equal to 20.0 mol %, less than or equal to 10.0 mol %, less than or equal to 6.0 mol %, less than or equal to 4.0 mol %, or less than or equal to 2.0 mol %. In some more embodiments, the glass composition may comprise ($SiO_2+B_2O_3$) in an amount of from 0.0 mol % to 50.0 mol %, from 0.0 mol % to 44.0 mol %, 2.0 mol % to 44.0 mol %, from 0.0 mol % to 20.0 mol %, from 2.0 mol % to 20.0 mol %, from 4.0 mol % to 44.0 mol %, from 4.0 mol % to 20.0 mol %, from 6.0 mol % to 50.0 mol %, from 1.0 mol % to 50.0 mol %, from 6.0 mol % to 46.0 mol %, 6.0 mol % to 40.0 mol %, 6.0 mol % to 20.0 mol %, from 10.0 mol % to 46.0 mol %, from 10.0 mol % to 40.0 mol %, from 10.0 mol % to 20.0 mol %, from 20.0 mol % to 50.0 mol %, from 30.0 mol % to 50.0 mol %, from 20.0 mol % to 46.0 mol %, from 20.0 mol % to 40.0 mol %, from 30.0 mol % to 48.0 mol %, from 30.0 mol % to 46.0 mol %, from 30.0 mol % to 40.0 mol %, from 30.0 mol % to 40.0 mol %, from 25.0 mol % to 46.0 mol %, from 7.0 mol % to 45.0 mol %, from 24.0 mol % to 40.0 mol %, from 17.0 mol % to 42.0 mol %, from 9.0 mol % to 33.0 mol %, from 3.0 mol % to 50.0 mol %, or from 3.0 mol % to 44.0 mol %.

In some embodiments, the glass composition may have a ratio of an amount of $B_2O_3$ to an amount of $SiO_2$ ($B_2O_3$/$SiO_2$), in mole percent of oxide, that is at least 0.050. For example, the ratio ($B_2O_3$/$SiO_2$), in mole percent of oxide, that is at least 0.050, at least 0.10, at least 0.9, at least 1.1, at least 1.5, at least 1.7, at least 2.0, at least 2.5, at least 3.0, at least 3.5, at least 4.0, at least 4.5, at least 5.5, at least 6, at least 10, at least 100, or at least 1000.

In some embodiments, the glass composition may comprise phosphorus oxide ($P_2O_5$) in an amount of from greater than or equal to 0.0 mol % to less than or equal to 20.0 mol % and all ranges and sub-ranges between the foregoing values. In some embodiments, the glass composition may comprise $P_2O_5$ in an amount greater than or equal to 0.0 mol %, greater than or equal to 1.0 mol %, greater than or equal to 2.0 mol %, greater than or equal to 3.0 mol %, greater than or equal to 5.0 mol %, greater than or equal to 10.0 mol %, greater than or equal to 15.0 mol %, greater than or equal to 17.0 mol %, greater than or equal to 18.0 mol %, or greater than or equal to 19.0 mol %. In some other embodiments, the glass composition may comprise $P_2O_5$ in an amount less than or equal to 20.0 mol %, less than or equal to 19.0 mol %, less than or equal to 18.0 mol %, less than or equal to 17.0 mol %, less than or equal to 15.0 mol %, less than or equal to 10.0 mol %, less than or equal to 5.0 mol %, less than or equal to 3.0 mol %, less than or equal to 2.0 mol %, or less than or equal to 1.0 mol %. In some more embodiments, the glass composition may comprise $P_2O_5$ in an amount of from 0.0 mol % to 20.0 mol %, from 0.0 mol % to 17.0 mol %, from 0.0 mol % to 5.0 mol %, from 1.0 mol % to 17.0 mol %, from 1.0 mol % to 5.0 mol %, from 2.0 mol % to 18.0 mol %, from 2.0 mol % to 15.0 mol %, from 3.0 mol % to 18.0 mol %, from 5.0 mol % to 18.0 mol %, from 5.0 mol % to 15.0 mol %, from 10.0 mol % to 20.0 mol %, from 10.0 mol % to 18.0 mol %, from 10.0 mol % to 17.0 mol %, from 10.0 mol % to 15.0 mol %, from 15.0 mol % to 19.0 mol %, from 9.0 mol % to 16.0 mol %, from 3.0 mol % to 10.0 mol %, or from 1.0 mol % to 8.0 mol %.

According to an embodiment of the present disclosure, the glass can include one or more index raisers that have been added to increase a refractive index of the glass. Examples of index raisers that can be used with the glasses of the present disclosure include titania ($TiO_2$), niobia ($Nb_2O_5$), zirconia ($ZrO_2$), and other rare earth metal oxides.

Titania ($TiO_2$) is generally expected to increase the refractive index of the glass, in combination with achieving a low density and/or acceptably low dispersion. In some examples, titania may produce a glass that is yellow or brown coloring, which can be addressed by bleaching, such as by melting and/or annealing in oxidation conditions and/or through the addition of one or more oxidizers, examples of which include $CeO_2$, $As_2O_5$, and $Mn_2O_3$, etc., to the glass batch. In some cases, titania at too high amount may cause crystallization of refractory species, e.g. rutile ($TiO_2$), sphene (CaTiSiO$_5$), and titanium niobates (e.g. $Ti_2Nb_{10}O_{29}$), etc., which may result in increasing the liquidus temperature of the glass and thus may decrease the glass-forming ability of the melt. In addition, at high concentrations, titania may cause liquid-liquid phase separation of the melt, which may result in a loss of transmittance of the glass.

In embodiments, the glass composition may comprise titania ($TiO_2$) in an amount from greater than or equal to 0.0 mol % to less than or equal to 55.0 mol % and all ranges and sub-ranges between the foregoing values. In some embodiments, the glass composition may comprise $TiO_2$ in an amount greater than or equal to 0.0 mol %, greater than or equal to 2.0 mol %, greater than or equal to 4.0 mol %, greater than or equal to 5.0 mol %, greater than or equal to 6.0 mol %, greater than or equal to 7.0 mol %, greater than or equal to 10.0 mol %, greater than or equal to 13.0 mol %, greater than or equal to 20.0 mol %, greater than or equal to 30.0 mol %, greater than or equal to 40.0 mol %, greater than or equal to 50.0 mol %, greater than or equal to 52.0 mol %, or greater than or equal to 54.0 mol %. In some other embodiments, the glass composition may comprise $TiO_2$ in an amount of less than or equal to 55.0 mol %, less than or equal to 54.0 mol %, less than or equal to 52.0 mol %, less than or equal to 50.0 mol %, less than or equal to 40.0 mol %, less than or equal to 33.0 mol %, less than or equal to 30.0 mol %, less than or equal to 20.0 mol %, less than or equal to 10.0 mol %, less than or equal to 6.0 mol %, less than or equal to 4.0 mol %, or less than or equal to 2.0 mol %. In some more embodiments, the glass composition may comprise $TiO_2$ in an amount from 0.0 mol % to 55.0 mol %, from 0.0 mol % to 50.0 mol %, from 0.0 mol % to 36.0 mol %, from 0.0 mol % to 35.0 mol %, from 0.0 mol % to 33.0 mol %, from 0.0 mol % to 20.0 mol %, from 0.3 mol % to 35.0 mol %, from 0.3 mol % to 33.0 mol %, from 2.0 mol % to 50.0 mol %, from 2.0 mol % to 33.0 mol %, from 2.0 mol % to 20.0 mol %, from 4.0 mol % to 50.0 mol %, from 4.0 mol % to 33.0 mol %, from 5.0 mol % to 40.0 mol %, from 6.0 mol % to 40.0 mol %, from 6.0 mol % to 33.0 mol %, from 6.0 mol % to 20.0 mol %, from 10.0 mol % to 40.0 mol %, from 10.0 mol % to 33.0 mol %, from 12.0 mol % to 40.0 mol %, from 12.0 mol % to 33.0 mol %, from 20.0 mol % to 52.0 mol %, from 20.0 mol % to 40.0 mol %, from 20.0 mol % to 33.0 mol %, from 30.0 mol % to 54.0 mol %, from 30.0 mol % to 50.0 mol %, from 30.0 mol % to 40.0 mol %, from 40.0 mol % to 54.0 mol %, from 40.0 mol % to 52.0 mol %, from 40.0 mol % to 50.0 mol %, from 24.0 mol % to 46.0 mol %, rom 28.0 mol % to 50.0 mol %, or from 28.0 mol % to 50.0 mol %.

Niobia ($Nb_2O_5$), like titania, can be used in some aspects of the present disclosure to increase the refractive index of glass while also maintaining a low density. However, niobia can introduce a yellow coloring to the glass that cannot be bleached in the same manner as titania, which can result in a loss of transmittance, particularly in the blue and UV range. Niobia, like titania, may cause crystallization and/or phase separation of the melt. In some cases, niobia may provide the glass with a high optical dispersion, which can be significantly higher than that induced by titania and some other index raisers, when added in similar concentrations. The effects of niobia can be affected by the other components of the glass, and thus it can be challenging to determine an exact limit for niobia. Thus, according to one aspect of the present disclosure, the amount of niobia is limited to less than or equal to 20 mol % and in some cases the glass may be free or substantially free of niobia. In some examples, however, the amount of niobia present may be greater than 20 mol %, based on the content of the components of the glass and/or in cases where high blue transmittance is not a high priority, for example.

In embodiments, the glass composition may comprise niobia ($Nb_2O_5$) in an amount from greater than or equal to 0.0 mol % to less than or equal to 50.0 mol % and all ranges and sub-ranges between the foregoing values. In some embodiments, the glass composition may comprise $Nb_2O_5$ in an amount of greater than or equal to 0.0 mol %, greater than or equal to 1.0 mol %, greater than or equal to 2.0 mol %, greater than or equal to 2.2 mol %, greater than or equal to 4.0 mol %, greater than or equal to 6.0 mol %, greater than or equal to 10.0 mol %, greater than or equal to 20.0 mol %, greater than or equal to 30.0 mol %, greater than or equal to 40.0 mol %, greater than or equal to 44.0 mol %, greater than or equal to 46.0 mol %, or greater than or equal to 48.0 mol %. In some other embodiments, the glass composition may comprise $Nb_2O_5$ in an amount less than or equal to 50.0 mol %, less than or equal to 48.0 mol %, less than or equal to 46.0 mol %, less than or equal to 44.0 mol %, less than or equal to 40.0 mol %, less than or equal to 30.0 mol %, less than or equal to 20.0 mol %, less than or equal to 12.3 mol %, less than or equal to 10.0 mol %, less than or equal to 6.0 mol %, less than or equal to 4.0 mol %, or less than or equal to 2.0 mol %. In some more embodiments, the glass composition may comprise $Nb_2O_5$ in an amount of from 0.0 mol % to 50.0 mol %, from 0.0 mol % to 44.0 mol %, from 0.0 mol % to 12.5 mol %, from 2.2 mol % to 50.0 mol %, from 2.2 mol % to 30.0 mol %, from 1.0 mol % to 45.0 mol %, from 2.0 mol % to 44.0 mol %, from 2.0 mol % to 20.0 mol %, from 4.0 mol % to 44.0 mol %, from 4.0 mol % to 30.0 mol %, from 4.0 mol % to 20.0 mol %, from 6.0 mol % to 46.0 mol %, from 6.0 mol % to 40.0 mol %, from 6.0 mol % to 30.0 mol %, from 6.0 mol % to 20.0 mol %, from 10.0 mol % to 40.0 mol %, from 10.0 mol % to 30.0 mol %, from 20.0 mol % to 40.0 mol %, from 20.0 mol % to 30.0 mol %, from 30.0 mol % to 48.0 mol %, from 30.0 mol % to 46.0 mol %, from 30.0 mol % to 44.0 mol %, from 30.0 mol % to 40.0 mol %, from 10.0 mol % to 30.0 mol %, from 0.3 mol % to 30.0 mol %, from 0.3 mol % to 12.3 mol %, from 12.0 mol % to 34.0 mol %, or from 4.0 mol % to 30.0 mol %.

Zirconia ($ZrO_2$) is another example of an oxide that can increase the refractive index of glasses of the present disclosure while maintaining an acceptably low density. In some examples, $ZrO_2$ may provide the glass with a higher density compared to that of $TiO_2$ and $Nb_2O_5$ at similar refractive index values. $ZrO_2$ can also increase the viscosity of the melt, which may help to protect the melt from crystallization. In contrast to other index raisers that can provide the glass with a low density, such as $TiO_2$ and $Nb_2O_5$, $ZrO_2$ does not introduce coloring in the glass in the visible and near-UV ranges, which may help to maintain a high transmittance of the glass. However, high concentrations of zirconia may cause crystallization of refractory minerals, such as zirconia ($ZrO_2$), zircon ($ZrSiO_4$), calcium zirconate ($CaZrO_3$) and others, which can increase the liquidus temperature. As a result, crystallization may happen at a lower viscosity, which may decrease the glass forming ability of the melt (i.e., may increase the critical cooling rate). To address these challenges, according to one aspect of the present disclosure, the content of zirconia in the glasses is less than or equal to 20.0 mol % and in some examples the glasses are free or substantially free of zirconia. In some cases, such as when the requirements for glass forming ability are low, the glasses may include higher amounts of zirconia.

In some embodiments, the glass composition may comprise zirconia ($ZrO_2$) in an amount of from greater than or equal to 0.0 mol % to less than or equal to 25.0 mol % and all ranges and sub-ranges between the foregoing values. In some embodiments, the glass composition may comprise $ZrO_2$ in an amount greater than or equal to 0.0 mol %, greater than or equal to 1.0 mol %, greater than or equal to 2.0 mol %, greater than or equal to 2.3 mol %, greater than or equal to 2.5 mol %, greater than or equal to 3.0 mol %, greater than or equal to 5.0 mol %, greater than or equal to 6.0 mol %, greater than or equal to 10.0 mol %, greater than or equal to 15.0 mol %, greater than or equal to 20.0 mol %, greater than or equal to 22.0 mol %, greater than or equal to 23.0 mol %, or greater than or equal to 24.0 mol %. In some other embodiments, the glass composition may comprise $ZrO_2$ in an amount less than or equal to 25.0 mol %, less than or equal to 24.0 mol %, less than or equal to 23.0 mol %, less than or equal to 22.0 mol %, less than or equal to 20.0 mol %, less than or equal to 15.0 mol %, less than or equal to 10.0 mol %, less than or equal to 5.0 mol %, less than or equal to 3.0 mol %, less than or equal to 2.0 mol %, or less than or equal to 1.0 mol %. In some more embodiments, the glass composition may comprise $ZrO_2$ in an amount of from 0.0 mol % to 25.0 mol %, from 1.0 mol % to 22.0 mol %, from 2.0 mol % to 22.0 mol %, from 2.0 mol % to 10.0 mol %, from 2.5 mol % to 25.0 mol %, from 2.5 mol % to 20.0 mol %, from 2.5 mol % to 13.0 mol %, from 3.0 mol % to 25.0 mol %, from 3.0 mol % to 23.0 mol %, from 3.0 mol % to 10.0 mol %, from 5.0 mol % to 25.0 mol %, from 5.0 mol % to 23.0 mol %, from 5.0 mol % to 20.0 mol %, from 5.0 mol % to 10.0 mol %, from 10.0 mol % to 25.0 mol %, from 10.0 mol % to 23.0 mol %, from 15.0 mol % to 24.0 mol %, from 15.0 mol % to 25.0 mol %, from 15.0 mol % to 23.0 mol %, from 15.0 mol % to 22.0 mol %, from 15.0 mol % to 20.0 mol %, from 0.3 mol % to 15.0 mol %, from 0.3 mol % to 13.0 mol %, from 4.0 mol % to 15.0 mol %, from 8.0 mol % to 15.0 mol %, or from 8.0 mol % to 19.0 mol %.

In some embodiments, rare earth metal oxides may be added to the glass composition to increase the refractive index of the glasses of the present disclosure. Examples of rare earth metal oxides that can be added to glasses of the present disclosure include $La_2O_3$, $Gd_2O_3$, $Yb_2O_3$, $Y_2O_3$, and $Sc_2O_3$. In some embodiments, the glass composition includes at least one rare earth metal oxide selected from $La_2O_3$, $Gd_2O_3$, $Yb_2O_3$, and combinations thereof. The oxides of the two last elements, $Y_2O_3$ and $Sc_2O_3$, can also provide the glass with a comparably low density, less than that for titania and niobia at similar refractive indices. However, scandium oxide ($Sc_2O_3$) can be expensive and thus may not be desirable in mass-production. In some cases, $Sc_2O_3$ may be acceptable where the cost of the glass batch is of lower priority. Yttrium oxide ($Y_2O_3$) is of lower cost than scandium oxide. However, in some cases, $Y_2O_3$ may decrease the glass forming ability of the glass (i.e., increase the critical cooling rate), even at lower concentrations. Thus, according to some embodiments of the present disclosure, the glass may be free or substantially free of $Y_2O_3$. In some embodiments, the glass composition may comprise yttria ($Y_2O_3$) in an amount of from greater than or equal to 0.0 mol % to less than or equal to 5.0 mol % and all ranges and sub-ranges between the foregoing values. In some embodiments, the glass composition may comprise $Y_2O_3$ in an amount greater than or equal to 0.0 mol %, greater than or equal to 0.2 mol %, greater than or equal to 0.4 mol %, greater than or equal to 0.6 mol %, greater than or equal to 1.0 mol %, greater than or equal to 2.0 mol %, greater than or equal to 3.0 mol %, greater than or equal to 4.0 mol %, greater than or equal to 4.4 mol %, greater than or equal to 4.6 mol %, or greater than or equal to 4.8 mol %. In some other embodiments, the glass composition comprise $Y_2O_3$ in an amount of less than or equal to 5.0 mol %, less than or equal to 4.8 mol %, less than or equal to 4.6 mol %, less than or equal to 4.4 mol %, less than or equal to 4.0 mol %, less than or equal to 3.0 mol %, less than or equal to 2.0 mol %, less than or equal to 1.0 mol %, less than or equal to 0.6 mol %, less than or equal to 0.4 mol %, or less than or equal to 0.2 mol %. In some more embodiments, the glass composition may comprise $Y_2O_3$ in an amount of from 0.0 mol % to 5.0 mol %, from 0.0 mol % to 2.0 mol %, from 0.0 mol % to 1.0 mol %, from 0.2 mol % to 4.4 mol %, from 0.2 mol % to 2.0 mol %, from 0.4 mol % to 4.4 mol %, from 0.6 mol % to 4.6 mol %, from 0.6 mol % to 4.0 mol %, from 1.0 mol % to 5.0 mol %, from 1.0 mol % to 4.6 mol %, from 1.0 mol % to 4.0 mol %, from 2.0 mol % to 4.0 mol %, from 3.0 mol % to 4.6 mol %, from 3.0 mol % to 4.4 mol %, from 3.0 mol % to 4.0 mol %, from 2.0 mol % to 5.0 mol %, from 1.0 mol % to 4.0 mol %, or from 2.0 mol % to 4.0 mol %.

Among the rare earth metal oxides, with the exception of $Y_2O_3$ and $Sc_2O_3$, in some aspects, lanthanum oxide ($La_2O_3$) may be a preferred index raiser. $La_2O_3$ can provide the glasses of the present disclosure with a lower density at similar refractive indices compared to several other rare earth metal oxides. $La_2O_3$ can also provide the glass composition with acceptably good glass formation and is among the most cost efficient of rare earth metal oxides. Thus, in some aspects of the present disclosure, the glass composition can comprise at least some amount of $La_2O_3$. However, in some cases, when the concentration of $La_2O_3$ becomes too high, lanthanum oxide can cause precipitation of refractory species, such as lanthanum silicates ($La_4Si_3O_{12}$, $La_2SiO_5$, $La_2Si_2O_7$), lanthanum borates ($LaBO_3$, $LaB_3O_6$), lanthanum niobate ($LaNbO_4$), lanthanum zirconates ($La_2ZrO_5$, $La_2Zr_2O_7$), lanthanum titanates ($La_2TiO_5$, $La_2Ti_2O_7$) and others, which can increase the liquidus temperature of the glass and may reduce the glass forming ability of the composition. In addition, high concentrations of $La_2O_3$ may stimulate phase separation in the melt that results in a loss of transmittance of the resulting glass. Similar adverse effects can also occur upon the addition of other rare earth metal oxides in high concentrations.

In some embodiments, the glass composition may comprise lanthanum oxide ($La_2O_3$) in an amount of from greater than or equal to 0.0 mol % to less than or equal to 33.0 mol % and all ranges and sub-ranges between the foregoing values. In some embodiments, the glass composition may comprise $La_2O_3$ in an amount of greater than or equal to 0.0 mol %, greater than or equal to 1.0 mol %, greater than or equal to 2.0 mol %, greater than or equal to 3.0 mol %, greater than or equal to 4.0 mol %, greater than or equal to 5.0 mol %, greater than or equal to 9.0 mol %, greater than or equal to 10.0 mol %, greater than or equal to 13.5 mol %, greater than or equal to 15.0 mol %, greater than or equal to 20.0 mol %, greater than or equal to 25.0 mol %, greater than or equal to 30.0 mol %, greater than or equal to 31.0 mol %, or greater than or equal to 32.0 mol %. In some other embodiments, the glass composition may comprise $La_2O_3$ in an amount less than or equal to 33.0 mol %, less than or equal to 32.0 mol %, less than or equal to 31.0 mol %, less than or equal to 30.0 mol %, less than or equal to 25.0 mol %, less than or equal to 20.0 mol %, less than or equal to 15.0 mol %, less than or equal to 10.0 mol %, less than or equal to 5.0 mol %, less than or equal to 3.0 mol %, less than or equal to 2.0 mol %, or less than or equal to 1.0 mol %. In some more embodiments, the glass composition may comprise $La_2O_3$ in an amount of from 0.0 mol % to 33.0 mol %, from 0.0 mol % to 25.0 mol %, from 1.0 mol % to 30.0 mol %, from 1.0 mol % to 15.0 mol %, from 2.0 mol % to 30.0 mol %, from 2.0 mol % to 15.0 mol %, from 3.0 mol % to 30.0 mol %, from 3.0 mol % to 15.0 mol %, from 5.0 mol % to 15.0 mol %, from 10.0 mol % to 31.0 mol %, from 10.0 mol % to 25.0 mol %, from 13.5 mol % to 30.0 mol %, from 15.0 mol % to 33.0 mol %, from 15.0 mol % to 31.0 mol %, from 20.0 mol % to 32.0 mol %, from 20.0 mol % to 31.0 mol %, from 20.0 mol % to 30.0 mol %, from 25.0 mol % to 32.0 mol %, from 2.0 mol % to 32.0 mol %, from 13.0 mol % to 26.0 mol %, or from 4.0 mol % to 13.0 mol %.

Optionally, other rare earth metal oxides such as $Gd_2O_3$ and $Yb_2O_3$ can be added to the glass composition. Rare earth metal oxides, such as $Gd_2O_3$ and $Yb_2O_3$, can facilitate maintaining a high refractive index and good transmittance of the glass, but may undesirably increase a density of the glass. To address these challenges, some embodiments of the present disclosure include limiting the content of $RE_mO_n$ in the glass composition. In some embodiments, the glass composition may comprise a total content of rare earth metal oxides ($RE_mO_n$) in an amount of from greater than or equal to 0.0 mol % to less than or equal to 50.0 mol % and all ranges and sub-ranges between the foregoing values. In some embodiments, the glass composition may comprise $RE_mO_n$ in an amount of greater than or equal to 0.0 mol %, greater than or equal to 2.0 mol %, greater than or equal to 4.0 mol %, greater than or equal to 6.0 mol %, greater than or equal to 10.0 mol %, greater than or equal to 20.0 mol %, greater than or equal to 30.0 mol %, greater than or equal to 40.0 mol %, greater than or equal to 44.0 mol %, greater than or equal to 46.0 mol %, or greater than or equal to 48.0 mol %. In some other embodiments, the glass composition may comprise $RE_mO_n$ in an amount of less than or equal to 50.0 mol %, less than or equal to 48.0 mol %, less than or equal to 46.0 mol %, less than or equal to 44.0 mol %, less than or equal to 40.0 mol %, less than or equal to 30.0 mol %, less than or equal to 20.0 mol %, less than or equal to 10.0 mol %, less than or equal to 6.0 mol %, less than or equal to 4.0 mol %, or less than or equal to 2.0 mol %. In some more embodiments, the glass composition may comprise $RE_mO_n$ in an amount of from 0.0 mol % to 50.0 mol %, from 0.0 mol % to 44.0 mol %, from 0.0 mol % to 30.0 mol %, from 2.0 mol % to 50.0 mol %, from 2.0 mol % to 44.0 mol %, from 2.0 mol % to 30.0 mol %, from 2.0 mol % to 20.0 mol %, from 4.0 mol % to 44.0 mol %, from 4.0 mol % to 30.0 mol %, from 4.0 mol % to 20.0 mol %, from 6.0 mol % to 46.0 mol %, from 6.0 mol % to 30.0 mol %, from 6.0 mol % to 20.0 mol %, from 10.0 mol % to 46.0 mol %, from 10.0 mol % to 30.0 mol %, from 10.0 mol % to 20.0 mol %, from 20.0 mol % to 46.0 mol %, from 20.0 mol % to 30.0 mol %, from 30.0 mol % to 50.0 mol %, from 30.0 mol % to 48.0 mol %, from 30.0 mol % to 44.0 mol %, from 7.0 mol % to 25.0 mol %, from 12.0 mol % to 30.0 mol %, or from 2.0 mol % to 17.0 mol %.

In some embodiments, the glasses of the present disclosure may optionally include additional and/or alternative index raisers, such as tungsten oxide ($WO_3$), tantalum oxide ($Ta_2O_5$), thorium oxide ($ThO_2$), bismuth oxide ($Bi_2O_3$), which may be used in small amounts, if present. In some embodiments, the glasses of the present disclosure are free or substantially free of tungsten oxide ($WO_3$), tantalum oxide ($Ta_2O_5$), thorium oxide ($ThO_2$), bismuth oxide ($Bi_2O_3$). In some embodiments, the glasses may optionally include additional and/or alternative index raisers selected from vanadia ($V_2O_5$), molybdenum oxide ($MoO_3$), germania ($GeO_2$), tellurium oxide ($TeO_2$), fluorides (e.g. $ZrF_4$, $LaF_3$, etc.), and thallium oxide ($Tl_2O$). Index raisers such as $V_2O_5$, $MoO_3$, $GeO_2$, $TeO_2$, fluorides, and $Tl_2O$ may be generally less preferred in some cases due to low transmittance, cost, and/or environmental concerns, however, these index raisers may be used in some cases.

$Ta_2O_5$ may increase the density of the glass and in some examples may cause crystallization of the glass melt when cooling. In addition, $Ta_2O_5$ can be cost prohibitive in some cases. Therefore, in some embodiments it may be preferable to limit an amount of $Ta_2O_5$ in the glass to an amount of from 0.0 mol % to 5.0 mol %. In embodiments, the glass composition may comprise tantalum oxide ($Ta_2O_5$) in an amount of from greater than or equal to 0.0 mol % to less than or equal to 5.0 mol % and all ranges and sub-ranges between the foregoing values. In some embodiments, the glass composition may comprise $Ta_2O_5$ in an amount of greater than or equal to 0.0 mol %, greater than or equal to 0.2 mol %, greater than or equal to 0.4 mol %, greater than or equal to 0.6 mol %, greater than or equal to 1.0 mol %, greater than or equal to 2.0 mol %, greater than or equal to 3.0 mol %, greater than or equal to 4.0 mol %, greater than or equal to 4.4 mol %, greater than or equal to 4.6 mol %, or greater than or equal to 4.8 mol %. In some other embodiments, the glass composition may comprise $Ta_2O_5$ in an amount less than or equal to 5.0 mol %, less than or equal to 4.8 mol %, less than or equal to 4.6 mol %, less than or equal to 4.4 mol %, less than or equal to 4.0 mol %, less than or equal to 3.0 mol %, less than or equal to 2.0 mol %, less than or equal to 1.0 mol %, less than or equal to 0.6 mol %, less than or equal to 0.4 mol %, or less than or equal to 0.2 mol %. In some more embodiments, the glass composition may comprise $Ta_2O_5$ in an amount of from 0.0 mol % to 5.0 mol %, from 0.0 mol % to 4.4 mol %, from 0.0 mol % to 1.5 mol %, from 0.2 mol % to 5.0 mol %, from 0.2 mol % to 4.4 mol %, from 0.2 mol % to 2.0 mol %, from 0.6 mol % to 4.6 mol %, from 0.6 mol % to 4.0 mol %, from 1.0 mol % to 4.6 mol %, from 1.0 mol % to 4.0 mol %, from 1.0 mol % to 2.0 mol %, from 2.0 mol % to 4.6 mol %, from 2.0 mol % to 4.0 mol %, from 3.0 mol % to 4.8 mol %, from 3.0 mol % to 4.4 mol %, from 3.0 mol % to 4.0 mol %, from 2.0 mol % to 5.0 mol %, or from 3.0 mol % to 5.0 mol %.

In some embodiments, $Bi_2O_3$ may be present in the glass in an amount of from 0.0 mol % to 20.0 mol %. For example, $Bi_2O_3$ may be present in the glass from 0.0 mol % to 20.0 mol %, 0.0 mol % to 15.0 mol %, 0.0 mol % to 10.0 mol %, 0.0 mol % to 5.0 mol %, 0.0 mol % to 1.0 mol %, 1.0 mol % to 20.0 mol %, 1.0 mol % to 15.0 mol %, 1.0 mol % to 10.0 mol %, 1.0 mol % to 5.0 mol %, 5.0 mol % to 20.0 mol %, 5.0 mol % to 15.0 mol %, 5.0 mol % to 10.0 mol %, or 10.0 mol % to 20.0 mol %. In some embodiments, the glass is free or substantially free of $Bi_2O_3$.

In some embodiments, the glass composition may comprise thorium oxide ($ThO_2$) in an amount of from greater than or equal to 0.0 mol % to less than or equal to 10.0 mol % and all ranges and sub-ranges between the foregoing values. In some embodiments, the glass composition may comprise $ThO_2$ in an amount greater than or equal to 0.0 mol %, greater than or equal to 0.5 mol %, greater than or equal to 1.0 mol %, greater than or equal to 1.5 mol %, greater than or equal to 2.5 mol %, greater than or equal to 5.0 mol %, greater than or equal to 7.5 mol %, greater than or equal to 8.5 mol %, greater than or equal to 9.0 mol %, or greater than or equal to 9.5 mol %. In some other embodiments, the glass composition may comprise $ThO_2$ in an amount less than or equal to 10.0 mol %, less than or equal to 9.5 mol %, less than or equal to 9.0 mol %, less than or equal to 8.5 mol %, less than or equal to 7.5 mol %, less than or equal to 5.0 mol %, less than or equal to 2.5 mol %, less than or equal to 1.5 mol %, less than or equal to 1.0 mol %, or less than or equal to 0.5 mol %. In some more embodiments, the glass composition may comprise $ThO_2$ in an amount of from 0.0 mol % to 10.0 mol %, from 0.0 mol % to 8.5 mol %, from 0.0 mol % to 5.0 mol %, from 0.0 mol % to 2.5 mol %, from 1.0 mol % to 7.5 mol %, from 1.5 mol % to 9.0 mol %, from 1.5 mol % to 7.5 mol %, from 2.5 mol % to 9.0 mol %, from 5.0 mol % to 9.5 mol %, from 5.0 mol % to 9.0 mol %, from 5.0 mol % to 8.5 mol %, from 5.0 mol % to 7.5 mol %, from 7.5 mol % to 10.0 mol %, from 7.5 mol % to 9.5 mol %, from 1.4 mol % to 5.8 mol %, from 1.4 mol % to 5.0 mol %, or from 3.0 mol % to 7.0 mol %.

In some embodiments, the glass composition may comprise tungsten oxide ($WO_3$) in an amount of from greater than or equal to 0.0 mol % to less than or equal to 10.0 mol % and all ranges and sub-ranges between the foregoing values. In some embodiments, the glass composition may comprise $WO_3$ in an amount greater than or equal to 0.0 mol %, greater than or equal to 1.0 mol %, greater than or equal to 2.5 mol %, greater than or equal to 5.0 mol %, or greater than or equal to 7.5 mol %. In some other embodiments, the glass composition may comprise $WO_3$ in an amount less than or equal to 10.0 mol %, less than or equal to 7.5 mol %, less than or equal to 5.0 mol %, or less than or equal to 2.5 mol %. In some more embodiments, the glass composition may comprise $WO_3$ in an amount of from 0.0 mol % to 10.0 mol %, from 0.0 mol % to 7.5 mol %, from 0.0 mol % to 5.0 mol %, from 0.0 mol % to 2.5 mol %, from 2.5 mol % to 10.0 mol %, from 2.5 mol % to 7.5 mol %, from 2.5 mol % to 5.0 mol %, from 5.0 mol % to 10.0 mol %, from 5.0 mol % to 7.5 mol %, from 2.0 mol % to 5.0 mol %, from 5.3 mol % to 9.5 mol %, or from 6.6 mol % to 9.6 mol %.

In some embodiments, the glass composition may comprise germania ($GeO_2$) in an amount from greater than or equal to 0.0 mol % to less than or equal to 10.0 mol % and all ranges and sub-ranges between the foregoing values. In some embodiments, the glass composition may comprise $GeO_2$ in an amount greater than or equal to 0.0 mol %, greater than or equal to 0.5 mol %, greater than or equal to 1.0 mol %, greater than or equal to 1.5 mol %, greater than or equal to 2.5 mol %, greater than or equal to 5.0 mol %, greater than or equal to 7.5 mol %, greater than or equal to 8.5 mol %, greater than or equal to 9.0 mol %, or greater than or equal to 9.5 mol %. In some other embodiments, the glass composition may comprise $GeO_2$ in an amount less than or equal to 10.0 mol %, less than or equal to 9.5 mol %, less than or equal to 9.0 mol %, less than or equal to 8.5 mol %, less than or equal to 7.5 mol %, less than or equal to 5.0 mol %, less than or equal to 2.5 mol %, less than or equal to 1.5 mol %, less than or equal to 1.0 mol %, or less than or equal to 0.5 mol %. In some more embodiments, the glass composition may comprise $GeO_2$ in an amount of from 0.0 mol % to 10.0 mol %, from 0.0 mol % to 8.5 mol %, from 0.0 mol % to 0.5 mol %, from 0.5 mol % to 8.5 mol %, from 1.0 mol % to 10.0 mol %, from 1.0 mol % to 9.0 mol %, from 1.0 mol % to 7.5 mol %, from 1.5 mol % to 7.5 mol %, from 2.5 mol % to 9.0 mol %, from 2.5 mol % to 7.5 mol %, from 5.0 mol % to 10.0 mol %, from 1.4 mol % to 5.5 mol %, from 5.4 mol % to 8.3 mol %, or from 1.9 mol % to 6.8 mol %.

In some embodiments, the glass composition may comprise tellurium oxide ($TeO_2$) in an amount of from greater than or equal to 0.0 mol % to less than or equal to 10.0 mol % and all ranges and sub-ranges between the foregoing values. In some embodiments, the glass composition may comprise $TeO_2$ in an amount of greater than or equal to 0.0 mol %, greater than or equal to 0.5 mol %, greater than or equal to 1.0 mol %, greater than or equal to 1.5 mol %, greater than or equal to 2.5 mol %, greater than or equal to 5.0 mol %, greater than or equal to 7.5 mol %, greater than or equal to 8.5 mol %, greater than or equal to 9.0 mol %, or greater than or equal to 9.5 mol %. In some other embodiments, the glass composition may comprise $TeO_2$ in an amount less than or equal to 10.0 mol %, less than or equal to 9.5 mol %, less than or equal to 9.0 mol %, less than or equal to 8.5 mol %, less than or equal to 7.5 mol %, less than or equal to 5.0 mol %, less than or equal to 2.5 mol %, less than or equal to 1.5 mol %, less than or equal to 1.0 mol %, or less than or equal to 0.5 mol %. In some more embodiments, the glass composition may comprise $TeO_2$ in an amount of from 0.0 mol % to 10.0 mol %, from 0.0 mol % to 8.5 mol %, from 0.0 mol % to 2.5 mol %, from 0.5 mol % to 8.5 mol %, from 0.5 mol % to 2.5 mol %, from 1.0 mol % to 9.0 mol %, from 1.5 mol % to 9.0 mol %, from 5.0 mol % to 10.0 mol %, from 5.0 mol % to 9.5 mol %, from 5.0 mol % to 9.0 mol %, from 5.0 mol % to 8.5 mol %, from 7.5 mol % to 9.5 mol %, from 1.4 mol % to 9.0 mol %, from 0.7 mol % to 4.2 mol %, or from 3.0 mol % to 7.0 mol %. $TeO_2$ can be cost prohibitive and may cause an increase in the density of the glass that is undesirable in some applications. Therefore, the glasses preferably have less than 10.0 mol % of $TeO_2$. In some embodiments, the glasses may be free or substantially free of $TeO_2$.

In some embodiments, the glass composition may comprise molybdenum oxide ($MoO_3$) in an amount of from greater than or equal to 0.0 mol % to less than or equal to 10.0 mol % and all ranges and sub-ranges between the foregoing values. In some embodiments, the glass composition may comprise $MoO_3$ in an amount greater than or equal to 0.0 mol %, greater than or equal to 0.5 mol %, greater than or equal to 1.0 mol %, greater than or equal to 1.5 mol %, greater than or equal to 2.5 mol %, greater than or equal to 5.0 mol %, greater than or equal to 7.5 mol %, greater than or equal to 8.5 mol %, greater than or equal to 9.0 mol %, or greater than or equal to 9.5 mol %. In some other embodiments, the glass composition may comprise $MoO_3$ in an amount less than or equal to 10.0 mol %, less than or equal to 9.5 mol %, less than or equal to 9.0 mol %, less than or equal to 8.5 mol %, less than or equal to 7.5 mol %, less than or equal to 5.0 mol %, less than or equal to 2.5 mol %, less than or equal to 1.5 mol %, less than or equal to 1.0 mol %, or less than or equal to 0.5 mol %. In some more embodiments, the glass composition may comprise $MoO_3$ in an amount of from 0.0 mol % to 10.0 mol %, from 0.0 mol % to 8.5 mol %, from 0.0 mol % to 3.0 mol %, from 0.5 mol % to 10.0 mol %, from 0.5 mol % to 8.5 mol %, from 0.5 mol % to 2.5 mol %, from 1.0 mol % to 10.0 mol %, from 1.5 mol % to 9.0 mol %, from 1.5 mol % to 7.5 mol %, from 2.5 mol % to 10.0 mol %, from 2.5 mol % to 9.0 mol %, from 2.5 mol % to 7.5 mol %, from 5.0 mol % to 9.5 mol %, from 5.0 mol % to 9.0 mol %, from 7.5 mol % to 9.5 mol %, from 3.0 mol % to 7.0 mol %, from 0.5 mol % to 5.5 mol %, or from 4.5 mol % to 9.2 mol %.

In some embodiments, the glass composition may comprise alumina ($Al_2O_3$) in an amount of from greater than or equal to 0.0 mol % to less than or equal to 5.0 mol % and all ranges and sub-ranges between the foregoing values. In some embodiments, the glass composition may comprise $Al_2O_3$ in an amount greater than or equal to 0.0 mol %, greater than or equal to 0.2 mol %, greater than or equal to 0.4 mol %, greater than or equal to 0.6 mol %, greater than or equal to 1.0 mol %, greater than or equal to 2.0 mol %, greater than or equal to 3.0 mol %, greater than or equal to 4.0 mol %, greater than or equal to 4.4 mol %, greater than or equal to 4.6 mol %, or greater than or equal to 4.8 mol %. In some other embodiments, the glass composition may comprise $Al_2O_3$ in an amount less than or equal to 5.0 mol %, less than or equal to 4.8 mol %, less than or equal to 4.6 mol %, less than or equal to 4.4 mol %, less than or equal to 4.0 mol %, less than or equal to 3.0 mol %, less than or equal to 2.0 mol %, less than or equal to 1.0 mol %, less than or equal to 0.6 mol %, less than or equal to 0.4 mol %, or less than or equal to 0.2 mol %. In some more embodiments, the glass composition may comprise $Al_2O_3$ in an amount of from 0.0 mol % to 5.0 mol %, from 0.0 mol % to 4.4 mol %, from 0.0 mol % to 2.5 mol %, from 0.0 mol % to 2.0 mol %, from 0.2 mol % to 5.0 mol %, from 0.2 mol % to 2.0 mol %, from 0.4 mol % to 2.0 mol %, from 0.6 mol % to 4.6 mol %, from 0.6 mol % to 4.0 mol %, from 0.6 mol % to 2.0 mol %, from 1.0 mol % to 5.0 mol %, from 1.0 mol % to 4.6 mol %, from 1.0 mol % to 4.0 mol %, from 1.0 mol % to 2.0 mol %, from 2.0 mol % to 4.6 mol %, from 2.0 mol % to 4.0 mol %, from 3.0 mol % to 4.4 mol %, from 3.0 mol % to 4.0 mol %, from 1.0 mol % to 3.0 mol %, or from 2.0 mol % to 4.0 mol %.

In some embodiments, the glass composition may comprise gallia ($Ga_2O_3$) in an amount of from greater than or equal to 0.0 mol % to less than or equal to 10.0 mol % and all ranges and sub-ranges between the foregoing values. In some embodiments, the glass composition may comprise $Ga_2O_3$ in an amount greater than or equal to 0.0 mol %, greater than or equal to 0.5 mol %, greater than or equal to 1.0 mol %, greater than or equal to 1.5 mol %, greater than or equal to 2.5 mol %, greater than or equal to 5.0 mol %, greater than or equal to 7.5 mol %, greater than or equal to 8.5 mol %, greater than or equal to 9.0 mol %, or greater than or equal to 9.5 mol %. In some other embodiments, the glass composition may comprise $Ga_2O_3$ in an amount less than or equal to 10.0 mol %, less than or equal to 9.5 mol %, less than or equal to 9.0 mol %, less than or equal to 8.5 mol %, less than or equal to 7.5 mol %, less than or equal to 5.0 mol %, less than or equal to 2.5 mol %, less than or equal to 1.5 mol %, less than or equal to 1.0 mol %, or less than or equal to 0.5 mol %. In some more embodiments, the glass composition may comprise $Ga_2O_3$ in an amount of from 0.0 mol % to 10.0 mol %, from 0.5 mol % to 2.5 mol %, from 1.0 mol % to 10.0 mol %, from 1.0 mol % to 7.5 mol %, from 1.5 mol % to 9.0 mol %, from 1.5 mol % to 7.5 mol %, from 2.5 mol % to 7.5 mol %, from 5.0 mol % to 9.5 mol %, from 5.0 mol % to 9.0 mol %, from 5.0 mol % to 8.5 mol %, from 7.5 mol % to 9.5 mol %, from 2.4 mol % to 9.4 mol %, from 5.0 mol % to 9.2 mol %, or from 5.7 mol % to 9.0 mol %.

In some embodiments, the glasses of the present disclosure may be free or substantially free of fluorine. In some embodiments, the glasses may include fluorine from 0.0 atomic % to 1.0 atomic %. For example, the glasses may include fluorine from 0.0 atomic % to 1.0 atomic %, 0.0 atomic % to 0.5 atomic %, 0.0 atomic % to 0.25 atomic %, or 0.0 atomic % to 0.1 atomic %.

According to an embodiment of the present disclosure, the glasses can include one or more modifiers. As described above, the term "modifier" refers to the oxides of monovalent or divalent metals, i.e., $M_2O$ or MO, where "M" stands for a metal. Modifiers can be added to the glass compositions of the present disclosure to facilitate improving the glassforming ability of the melt, i.e. to decrease the critical cooling rate. Examples of modifiers that can be used in the glasses of the present disclosure include alkali and alkaline earth modifiers, such as CaO, MgO, BaO, $Li_2O$, $Na_2O$, and $K_2O$, as well as other modifiers, such as ZnO and $Ag_2O$. According to one embodiment, the glass composition can include CaO and/or $Li_2O$, which were found to provide a ratio between the desired refractive index and density of the glass. In some embodiments, other alkali and alkaline earth metal oxides (such as $Na_2O$, $K_2O$, MgO, SrO, BaO, etc.), as well as other modifiers that do not provide any coloring (e.g., ZnO, $Ag_2O$, etc.), may be included in the glass composition. While these other modifiers may not facilitate providing the desired refractive index and/or density as CaO and $Li_2O$, these modifiers may be added to the glass composition to provide other characteristics. For example, barium oxide (BaO), potassium oxide ($K_2O$), sodium oxide ($Na_2O$) etc., may be added to increase the solubility of index raisers (such as $TiO_2$, $Nb_2O_5$, $ZrO_2$, etc.) in the glass melts, which could result in an overall increase in the refractive index of the glass and/or an increase in the ratio of refractive index to density. According to one embodiment of the present disclosure, the glasses may include at least CaO as a modifier, as CaO was found to provide a good balance in the desired attributes of density, refractive index, and glass forming ability. Thus, in many examples of the present disclosure, all or at least a part of the modifier(s) present in the glass composition are in the form of CaO. In some embodiments, the glass may be free or substantially free of modifiers.

In some embodiments, the glass composition may comprise calcium oxide (CaO) in an amount of from greater than or equal to 0.0 mol % to less than or equal to 30.0 mol % and all ranges and sub-ranges between the foregoing values. In some embodiments, the glass composition may comprise CaO in an amount greater than or equal to 0.0 mol %, greater than or equal to 1.0 mol %, greater than or equal to 2.0 mol %, greater than or equal to 3.0 mol %, greater than or equal to 5.0 mol %, greater than or equal to 10.0 mol %, greater than or equal to 15.0 mol %, greater than or equal to 20.0 mol %, greater than or equal to 25.0 mol %, greater than or equal to 27.0 mol %, greater than or equal to 28.0 mol %, or greater than or equal to 29.0 mol %. In some other embodiments, the glass composition may comprise CaO in an amount less than or equal to 30.0 mol %, less than or equal to 29.0 mol %, less than or equal to 28.0 mol %, less than or equal to 27.0 mol %, less than or equal to 25.0 mol %, less than or equal to 20.0 mol %, less than or equal to 15.0 mol %, less than or equal to 10.0 mol %, less than or equal to 5.0 mol %, less than or equal to 3.0 mol %, less than or equal to 2.0 mol %, or less than or equal to 1.0 mol %. In some more embodiments, the glass composition may comprise CaO in an amount of from 0.0 mol % to 30.0 mol %, from 0.0 mol % to 25.0 mol %, from 0.0 mol % to 15.0 mol %, from 1.0 mol % to 15.0 mol %, from 2.0 mol % to 27.0 mol %, from 2.0 mol % to 15.0 mol %, from 3.0 mol % to 27.0 mol %, from 5.0 mol % to 25.0 mol %, from 10.0 mol % to 28.0 mol %, from 10.0 mol % to 15.0 mol %, from 15.0 mol % to 30.0 mol %, from 15.0 mol % to 28.0 mol %, from 15.0 mol % to 25.0 mol %, from 10.0 mol % to 21.0 mol %, from 1.0 mol % to 27.0 mol %, or from 13.0 mol % to 22.0 mol %.

In some embodiments, the glass composition may comprise zinc oxide (ZnO) in an amount of from greater than or equal to 0.0 mol % to less than or equal to 10.0 mol % and all ranges and sub-ranges between the foregoing values. In some embodiments, the glass composition may comprise ZnO in an amount greater than or equal to 0.0 mol %, greater than or equal to 0.5 mol %, greater than or equal to 1.0 mol %, greater than or equal to 1.5 mol %, greater than or equal to 2.5 mol %, greater than or equal to 5.0 mol %, greater than or equal to 7.5 mol %, greater than or equal to 8.5 mol %, greater than or equal to 9.0 mol %, or greater than or equal to 9.5 mol %. In some other embodiments, the glass composition may comprise ZnO in an amount less than or equal to 10.0 mol %, less than or equal to 9.5 mol %, less than or equal to 9.0 mol %, less than or equal to 8.5 mol %, less than or equal to 7.5 mol %, less than or equal to 5.0 mol %, less than or equal to 2.5 mol %, less than or equal to 1.5 mol %, less than or equal to 1.0 mol %, or less than or equal to 0.5 mol %. In some more embodiments, the glass composition may comprise ZnO in an amount of from 0.0 mol % to 10.0 mol %, from 0.0 mol % to 5.5 mol %, from 0.0 mol % to 2.5 mol %, from 0.5 mol % to 10.0 mol %, from 1.0 mol % to 9.0 mol %, from 1.0 mol % to 7.5 mol %, from 1.5 mol % to 9.0 mol %, from 1.5 mol % to 7.5 mol %, from 2.5 mol % to 7.5 mol %, from 5.0 mol % to 9.5 mol %, from 5.0 mol % to 9.0 mol %, from 5.0 mol % to 8.5 mol %, from 5.0 mol % to 7.5 mol %, from 7.5 mol % to 9.5 mol %, from 2.9 mol % to 7.2 mol %, from 0.7 mol % to 7.7 mol %, or from 6.5 mol % to 9.5 mol %.

In some embodiments, the glass composition may comprise lithium oxide ($Li_2O$) in an amount from greater than or equal to 0.0 mol % to less than or equal to 10.0 mol % and all ranges and sub-ranges between the foregoing values. In some embodiments, the glass composition may comprise $Li_2O$ in an amount greater than or equal to 0.0 mol %, greater than or equal to 0.5 mol %, greater than or equal to 1.0 mol %, greater than or equal to 1.5 mol %, greater than or equal to 2.5 mol %, greater than or equal to 3.99 mol %, greater than or equal to 5.0 mol %, greater than or equal to 7.5 mol %, greater than or equal to 8.5 mol %, greater than or equal to 9.0 mol %, or greater than or equal to 9.5 mol %. In some other embodiments, the glass composition may comprise $Li_2O$ in an amount less than or equal to 10.0 mol %, less than or equal to 9.5 mol %, less than or equal to 9.0 mol %, less than or equal to 8.5 mol %, less than or equal to 7.5 mol %, less than or equal to 5.0 mol %, less than or equal to 2.5 mol %, less than or equal to 1.5 mol %, less than or equal to 1.0 mol %, or less than or equal to 0.5 mol %. In some more embodiments, the glass composition may comprise $Li_2O$ in an amount of from 0.0 mol % to 10.0 mol %, from 0.0 mol % to 8.5 mol %, from 0.0 mol % to 8.0 mol %, from 0.0 mol % to 2.5 mol %, from 0.5 mol % to 8.5 mol %, from 0.5 mol % to 2.5 mol %, from 1.0 mol % to 9.0 mol %, from 1.0 mol % to 7.5 mol %, from 1.5 mol % to 10.0 mol %, from 1.5 mol % to 9.0 mol %, from 2.5 mol % to 9.0 mol %, from 5.0 mol % to 8.5 mol %, from 5.0 mol % to 7.5 mol %, from 7.5 mol % to 9.5 mol %, from 0.0 mol % to 4.7 mol %, from 2.5 mol % to 7.5 mol %, or from 1.8 mol % to 8.2 mol %.

In some embodiments, the glass composition may comprise barium oxide (BaO) in an amount of from greater than or equal to 0.0 mol % to less than or equal to 15.0 mol % and all ranges and sub-ranges between the foregoing values. In some embodiments, the glass composition may comprise BaO in an amount greater than or equal to 0.0 mol %, greater than or equal to 4.0 mol %, greater than or equal to 5.0 mol %, or greater than or equal to 10.0 mol %. In some other embodiments, the glass composition may comprise BaO in an amount less than or equal to 15.0 mol %, less than or equal to 10.0 mol %, or less than or equal to 5.0 mol %. In some more embodiments, the glass composition may comprise BaO in an amount of from 0.0 mol % to 15.0 mol %, from 0.0 mol % to 10.0 mol %, from 0.0 mol % to 5.0 mol %, from 5.0 mol % to 15.0 mol %, from 5.0 mol % to 10.0 mol %, from 3.5 mol % to 10.5 mol %, from 6.5 mol % to 11.5 mol %, or from 8.9 mol % to 13.4 mol %.

In some embodiments, the glass composition may comprise magnesia (MgO) in an amount of from greater than or equal to 0.0 mol % to less than or equal to 15.0 mol % and all ranges and sub-ranges between the foregoing values. In some embodiments, the glass composition may comprise MgO in an amount greater than or equal to 0.0 mol %, greater than or equal to 1.0 mol %, greater than or equal to 2.0 mol %, greater than or equal to 3.0 mol %, greater than or equal to 5.0 mol %, greater than or equal to 10.0 mol %, greater than or equal to 12.0 mol %, greater than or equal to 13.0 mol %, or greater than or equal to 14.0 mol %. In some other embodiments, the glass composition may comprise MgO in an amount less than or equal to 15.0 mol %, less than or equal to 14.0 mol %, less than or equal to 13.0 mol %, less than or equal to 12.0 mol %, less than or equal to 10.0 mol %, less than or equal to 5.0 mol %, less than or equal to 3.0 mol %, less than or equal to 2.0 mol %, or less than or equal to 1.0 mol %. In some more embodiments, the glass composition may comprise MgO in an amount of from 0.0 mol % to 15.0 mol %, from 1.0 mol % to 13.0 mol %, from 2.0 mol % to 13.0 mol %, from 2.0 mol % to 10.0 mol %, from 3.0 mol % to 13.0 mol %, from 5.0 mol % to 14.0 mol %, from 5.0 mol % to 13.0 mol %, from 5.0 mol % to 12.0 mol %, from 5.0 mol % to 10.0 mol %, from 10.0 mol % to 14.0 mol %, from 9.7 mol % to 13.5 mol %, from 2.1 mol % to 7.5 mol %, or from 5.4 mol % to 11.9 mol %.

In some embodiments, the glass composition may comprise sodium oxide ($Na_2O$) in an amount of from greater than or equal to 0.0 mol % to less than or equal to 10.0 mol % and all ranges and sub-ranges between the foregoing values. In some embodiments, the glass composition may comprise $Na_2O$ in an amount greater than or equal to 0.0 mol %, greater than or equal to 2.5 mol %, greater than or equal to 5.0 mol %, or greater than or equal to 7.5 mol %. In some other embodiments, the glass composition may comprise $Na_2O$ in an amount less than or equal to 10.0 mol %, less than or equal to 7.5 mol %, less than or equal to 5.0 mol %, or less than or equal to 2.5 mol %. In some more embodiments, the glass composition may comprise $Na_2O$ in an amount of from 0.0 mol % to 10.0 mol %, from 0.0 mol % to 7.5 mol %, from 0.0 mol % to 5.0 mol %, from 0.0 mol % to 2.5 mol %, from 2.5 mol % to 10.0 mol %, from 2.5 mol % to 7.5 mol %, from 2.5 mol % to 5.0 mol %, from 5.0 mol % to 10.0 mol %, from 5.0 mol % to 7.5 mol %, from 2.6 mol % to 9.9 mol %, from 0.2 mol % to 6.9 mol %, or from 1.1 mol % to 6.9 mol %.

In some embodiments, the glass composition may comprise potassium oxide ($K_2O$) in an amount of from greater than or equal to 0.0 mol % to less than or equal to 10.0 mol % and all ranges and sub-ranges between the foregoing values. In some embodiments, the glass composition may comprise $K_2O$ in an amount greater than or equal to 0.0 mol %, greater than or equal to 2.0 mol %, greater than or equal to 2.5 mol %, greater than or equal to 5.0 mol %, or greater than or equal to 7.5 mol %. In some other embodiments, the glass composition may comprise $K_2O$ in an amount less than or equal to 10.0 mol %, less than or equal to 7.5 mol %, less than or equal to 5.0 mol %, or less than or equal to 2.5 mol %. In some more embodiments, the glass composition may comprise $K_2O$ in an amount of from 0.0 mol % to 10.0 mol %, from 0.0 mol % to 7.5 mol %, from 0.0 mol % to 5.0 mol %, from 0.0 mol % to 2.5 mol %, from 2.5 mol % to 10.0 mol %, from 2.5 mol % to 7.5 mol %, from 2.5 mol % to 5.0 mol %, from 5.0 mol % to 10.0 mol %, from 5.0 mol % to 7.5 mol %, from 4.4 mol % to 7.6 mol %, from 3.8 mol % to 7.6 mol %, or from 2.1 mol % to 5.8 mol %.

In some embodiments, the glass composition may comprise strontium oxide (SrO) in an amount of from greater than or equal to 0.0 mol % to less than or equal to 10.0 mol % and all ranges and sub-ranges between the foregoing values. In some embodiments, the glass composition may comprise SrO in an amount greater than or equal to 0.0 mol %, greater than or equal to 2.5 mol %, greater than or equal to 5.0 mol %, or greater than or equal to 7.5 mol %. In some other embodiments, the glass composition may comprise SrO in an amount less than or equal to 10.0 mol %, less than or equal to 7.5 mol %, less than or equal to 5.0 mol %, or less than or equal to 2.5 mol %. In some more embodiments, the glass composition may comprise SrO in an amount of from 0.0 mol % to 10.0 mol %, from 0.0 mol % to 7.5 mol %, from 0.0 mol % to 5.0 mol %, from 0.0 mol % to 2.5 mol %, from 2.5 mol % to 10.0 mol %, from 2.5 mol % to 7.5 mol %, from 2.5 mol % to 5.0 mol %, from 5.0 mol % to 10.0 mol %, from 5.0 mol % to 7.5 mol %, from 3.0 mol % to 6.5 mol %, from 3.0 mol % to 6.5 mol %, or from 4.0 mol % to 7.3 mol %.

In some embodiments, the glass composition may comprise a total content of monovalent metal oxides ($R_2O$) in an amount of from greater than or equal to 0.0 mol % to less than or equal to 15.0 mol % and all ranges and sub-ranges between the foregoing values. Examples of monovalent metal oxides $R_2O$ may include alkali metal oxides, $Ag_2O$, $Tl_2O$, and other monovalent oxides. In some embodiments, the glass composition may comprise $R_2O$ in an amount greater than or equal to 0.0 mol %, greater than or equal to 1.0 mol %, greater than or equal to 2.0 mol %, greater than or equal to 3.0 mol %, greater than or equal to 5.0 mol %, greater than or equal to 10.0 mol %, greater than or equal to 12.0 mol %, greater than or equal to 13.0 mol %, or greater than or equal to 14.0 mol %. In some other embodiments, the glass composition may comprise $R_2O$ in an amount less than or equal to 15.0 mol %, less than or equal to 14.0 mol %, less than or equal to 13.0 mol %, less than or equal to 12.0 mol %, less than or equal to 10.0 mol %, less than or equal to 5.0 mol %, less than or equal to 3.0 mol %, less than or equal to 2.0 mol %, or less than or equal to 1.0 mol %. In some more embodiments, the glass composition may comprise $R_2O$ in an amount of from 0.0 mol % to 15.0 mol %, from 0.0 mol % to 12.0 mol %, from 1.0 mol % to 13.0 mol %, from 1.0 mol % to 10.0 mol %, from 2.0 mol % to 13.0 mol %, from 3.0 mol % to 13.0 mol %, from 5.0 mol % to 15.0 mol %, from 5.0 mol % to 13.0 mol %, from 5.0 mol % to 12.0 mol %, from 5.0 mol % to 10.0 mol %, from 10.0 mol % to 14.0 mol %, from 10.0 mol % to 13.0 mol %, from 4.4 mol % to 14.7 mol %, from 4.5 mol % to 9.5 mol %, or from 4.0 mol % to 10.5 mol %.

In some embodiments, the glass composition may comprise a sum of $As_2O_3$ and in $Sb_2O_3$ ($As_2O_3+Sb_2O_3$) in mol % in an amount of from greater than or equal to 0.0 mol % to less than or equal to 5.0 mol % and all ranges and sub-ranges between the foregoing values. In some embodiments, the glass composition may comprise ($As_2O_3+Sb_2O_3$) in an amount greater than or equal to 0.0 mol %, greater than or equal to 0.2 mol %, greater than or equal to 0.4 mol %, greater than or equal to 0.6 mol %, greater than or equal to 1.0 mol %, greater than or equal to 2.0 mol %, greater than or equal to 3.0 mol %, greater than or equal to 4.0 mol %, greater than or equal to 4.4 mol %, greater than or equal to 4.6 mol %, or greater than or equal to 4.8 mol %. In some other embodiments, the glass composition may comprise ($As_2O_3+Sb_2O_3$) in an amount less than or equal to 5.0 mol %, less than or equal to 4.8 mol %, less than or equal to 4.6 mol %, less than or equal to 4.4 mol %, less than or equal to 4.0 mol %, less than or equal to 3.0 mol %, less than or equal to 2.0 mol %, less than or equal to 1.0 mol %, less than or equal to 0.6 mol %, less than or equal to 0.4 mol %, or less than or equal to 0.2 mol %. In some more embodiments, the glass composition may comprise ($As_2O_3+Sb_2O_3$) in an amount of from 0.0 mol % to 5.0 mol %, from 0.0 mol % to 4.4 mol %, from 0.0 mol % to 2.0 mol %, from 0.0 mol % to 1.0 mol %, from 0.2 mol % to 5.0 mol %, from 0.2 mol % to 2.0 mol %, from 0.4 mol % to 5.0 mol %, from 0.4 mol % to 4.4 mol %, from 0.4 mol % to 2.0 mol %, from 0.6 mol % to 4.6 mol %, from 0.6 mol % to 2.0 mol %, from 1.0 mol % to 4.6 mol %, from 1.0 mol % to 4.0 mol %, from 2.0 mol % to 4.6 mol %, from 2.0 mol % to 4.0 mol %, from 3.0 mol % to 4.6 mol %, from 3.0 mol % to 4.4 mol %, from 1.0 mol % to 2.0 mol %, from 2.0 mol % to 5.0 mol %, or from 1.0 mol % to 3.0 mol %.

In some embodiments, the glass composition may comprise a sum of ZnO and $Y_2O_3$ ($ZnO+Y_2O_3$) in mol % in an amount of from greater than or equal to 0.0 mol % to less than or equal to 5.0 mol % and all ranges and sub-ranges between the foregoing values. In some embodiments, the glass composition may comprise ($ZnO+Y_2O_3$) in an amount greater than or equal to 0.0 mol %, greater than or equal to 0.2 mol %, greater than or equal to 0.4 mol %, greater than or equal to 0.6 mol %, greater than or equal to 1.0 mol %, greater than or equal to 2.0 mol %, greater than or equal to 3.0 mol %, greater than or equal to 4.0 mol %, greater than or equal to 4.4 mol %, greater than or equal to 4.6 mol %, or greater than or equal to 4.8 mol %. In some other embodiments, the glass composition may comprise ($ZnO+Y_2O_3$) in an amount less than or equal to 5.0 mol %, less than or equal to 4.8 mol %, less than or equal to 4.6 mol %, less than or equal to 4.4 mol %, less than or equal to 4.0 mol %, less than or equal to 3.0 mol %, less than or equal to 2.0 mol %, less than or equal to 1.0 mol %, less than or equal to 0.6 mol %, less than or equal to 0.4 mol %, or less than or equal to 0.2 mol %. In some more embodiments, the glass composition may comprise ($ZnO+Y_2O_3$) in an amount of from 0.0 mol % to 5.0 mol %, from 0.0 mol % to 2.5 mol %, from 0.0 mol % to 2.0 mol %, from 0.2 mol % to 4.4 mol %, from 0.2 mol % to 2.0 mol %, from 0.4 mol % to 4.4 mol %, from 0.4 mol % to 2.0 mol %, from 0.6 mol % to 4.6 mol %, from 0.6 mol % to 4.0 mol %, from 0.6 mol % to 2.0 mol %, from 1.0 mol % to 4.0 mol %, from 1.0 mol % to 2.0 mol %, from 2.0 mol % to 4.6 mol %, from 3.0 mol % to 4.6 mol %, from 2.0 mol % to 4.0 mol %, or from 3.0 mol % to 5.0 mol %.

In some embodiments, the glass composition may comprise a sum of ($RE_mO_n+TiO_2+Nb_2O_5+ZrO_2+Bi_2O_3+WO_3$), in mol %, in an amount of from greater than or equal to 0.0 mol % to less than or equal to 5.0 mol % and all ranges and sub-ranges between the foregoing values. In some embodiments, the glass composition may comprise ($RE_mO_n+TiO_2+Nb_2O_5+ZrO_2+Bi_2O_3+WO_3$) in an amount greater than or equal to 0.0 mol %, greater than or equal to 0.2 mol %, greater than or equal to 0.4 mol %, greater than or equal to 0.6 mol %, greater than or equal to 1.0 mol %, greater than or equal to 2.0 mol %, greater than or equal to 3.0 mol %, greater than or equal to 4.0 mol %, greater than or equal to 4.4 mol %, greater than or equal to 4.6 mol %, greater than or equal to 4.8 mol %, or greater than or equal to 5.0 mol %. In some other embodiments, the glass composition may comprise ($RE_mO_n+TiO_2+Nb_2O_5+ZrO_2+Bi_2O_3+WO_3$) in an amount less than or equal to 5.0 mol %, less than or equal to 4.8 mol %, less than or equal to 4.6 mol %, less than or equal to 4.4 mol %, less than or equal to 4.0 mol %, less than or equal to 3.0 mol %, less than or equal to 2.0 mol %, less than or equal to 1.0 mol %, less than or equal to 0.6 mol %, less than or equal to 0.4 mol %, or less than or equal to 0.2 mol %. In some more embodiments, the glass composition may comprise ($RE_mO_n+TiO_2+Nb_2O_5+ZrO_2+Bi_2O_3+WO_3$) in an amount of from greater than or equal to 25.0 mol % to less than or equal to 75.0 mol % and all ranges and sub-ranges between the foregoing values. In some embodiments, the glass composition may contain ($RE_mO_n+TiO_2+Nb_2O_5+ZrO_2+Bi_2O_3+WO_3$) in an amount of greater than or equal to 25.0 mol %, greater than or equal to 30.0 mol %, greater than or equal to 40.0 mol %, greater than or equal to 50.0 mol %, greater than or equal to 60.0 mol %, or greater than or equal to 70.0 mol %. In some other embodiments, the glass composition may contain ($RE_mO_n+TiO_2+Nb_2O_5+ZrO_2+Bi_2O_3+WO_3$) in an amount of less than or equal to 75.0 mol %, less than or equal to 70.0 mol %, less than or equal to 60.0 mol %, less than or equal to 50.0 mol %, less than or equal to 40.0 mol %, or less than or equal to 30.0 mol %. In some more embodiments, the glass composition may contain ($RE_mO_n+TiO_2+Nb_2O_5+ZrO_2+Bi_2O_3+WO_3$) in an amount of from 25.0 mol % to 75.0 mol %, from 25.0 mol % to 60.0 mol %, from 25.0 mol % to 40.0 mol %, from 30.0 mol % to 75.0 mol %, from 30.0 mol % to 70.0 mol %, from 30.0 mol % to 60.0 mol %, from 30.0 mol % to 50.0 mol %, from 30.0 mol % to 40.0 mol %, from 40.0 mol % to 75.0 mol %, from 40.0 mol % to 70.0 mol %, from 40.0 mol % to 60.0 mol %, from 40.0 mol % to 50.0 mol %, from 50.0 mol % to 75.0 mol %, from 50.0 mol % to 70.0 mol %, from 50.0 mol % to 60.0 mol %, from 60.0 mol % to 75.0 mol %, from 60.0 mol % to 70.0 mol %, from 39.0 mol % to 54.0 mol %, from 32.0 mol % to 65.0 mol %, or from 53.0 mol % to 66.0 mol %.

In some embodiments, the glass composition may have a quantity ($R_2O+RO-BaO$) of from greater than or equal to 0.0 mol % to less than or equal to 20.0 mol % and all ranges and sub-ranges between the foregoing values. In some embodiments, the glass composition may have a quantity ($R_2O+RO-BaO$) greater than or equal to 0.0 mol %, greater than or equal to 1.0 mol %, greater than or equal to 2.0 mol %, greater than or equal to 3.0 mol %, greater than or equal to 5.0 mol %, greater than or equal to 10.0 mol %, greater than or equal to 15.0 mol %, greater than or equal to 17.0 mol %, greater than or equal to 18.0 mol %, or greater than or equal to 19.0 mol %. In some other embodiments, the glass composition may have a quantity ($R_2O+RO-BaO$) less than or equal to 20.0 mol %, less than or equal to 19.0 mol %, less than or equal to 18.0 mol %, less than or equal to 17.0 mol %, less than or equal to 15.0 mol %, less than or equal to 10.0 mol %, less than or equal to 5.0 mol %, less than or equal to 3.0 mol %, less than or equal to 2.0 mol %, or less than or equal to 1.0 mol %. In some more embodiments, the glass composition may have a quantity ($R_2O+RO-BaO$) of from 0.0 mol % to 20.0 mol %, from 0.0 mol % to 17.0 mol %, from 0.0 mol % to 5.0 mol %, from 1.0 mol % to 20.0 mol %, from 1.0 mol % to 5.0 mol %, from 2.0 mol % to 18.0 mol %, from 2.0 mol % to 15.0 mol %, from 3.0 mol % to 20.0 mol %, from 3.0 mol % to 18.0 mol %, from 3.0 mol % to 15.0 mol %, from 5.0 mol % to 20.0 mol %, from 5.0 mol % to 18.0 mol %, from 10.0 mol % to 19.0 mol %, from 10.0 mol % to 18.0 mol %, from 10.0 mol % to 17.0 mol %, from 10.0 mol % to 15.0 mol %, from 15.0 mol % to 20.0 mol %, from 15.0 mol % to 19.0 mol %, from 8.0 mol % to 18.0 mol %, from 3.0 mol % to 11.0 mol %, or from 8.0 mol % to 18.0 mol %.

Without wishing to be bound by any theory, it was found that when trying to melt modifier-free glasses of some compositions, that improved glass-forming ability was achieved when a particular relationship between the amount of rare earth metal oxides and several other constituents were satisfied. Generally speaking, it was found that a glass composition that was free of modifiers and which contained a total rare earth metal oxide content $RE_mO_n$ (in mol %) that was less than a sum of the concentration (in mol %) of ($Nb_2O_5+ZrO_2$) exhibited poor glass-forming characteristics. For example, these compositions generally tended to have melts that crystallized during cooling with rates less than 300° C./min to 400° C./min, which is generally not acceptable for mass production. It is believed that for these compositions, refractory minerals of niobia and/or zirconia are precipitated at high temperatures. When the composition was free of modifiers and included a total rare earth metal oxide content $RE_mO_n$ (in mol %) that was greater than a sum of the concentration (in mol %) of ($Nb_2O_5+ZrO_2+SiO_2$), it was found that these compositions were typically not able to form glasses. It is believed that this may be due to the rare earth metal oxides crystallizing at high temperatures either themselves or in solid solutions (e.g., with zirconia). When the composition was free of modifiers and included $SiO_2$ in an amount significantly greater than the difference of the concentration (in mol %) of ($RE_mO_n-Nb_2O_5-ZrO_2$) and did not contain a high enough concentration of titania ($TiO_2$), it was found that the glass-forming melts at high temperatures tended to become prone to either phase separation, crystallization, or both. It is believed that $SiO_2$ and $TiO_2$ may be drivers for the phase separation and/or crystallization exhibited by these compositions.

Thus, according to some embodiments of the present disclosure, the glass compositions include $RE_mO_n$, $SiO_2$, $Nb_2O_5$, and $ZrO_2$ in amounts that satisfy at least one of the following conditions (I) and/or (II), in terms of mol %:

$$0.0 \leq (SiO_2 + Nb_2O_5 + ZrO_2 - RE_mO_n) \leq 12.0 \qquad (I)$$

and $$\frac{(RE_mO_n - ZrO_2 - Nb_2O_5) \times (RE_mO_n - ZrO_2 - Nb_2O_5 - SiO_2)}{(RE_mO_n + ZrO_2 + Nb_2O_5 + SiO_2)} \leq 0. \qquad (II)$$

In some examples, glass compositions having a value of formula (II) that is less than −1 were more likely to exhibit good glass-forming ability compared to glass compositions having a value within the range of from −1 to 0. Without wishing to be bound by any theory, it is believed that the glass compositions of the present disclosure, both compositions containing modifiers and those that are free of modifiers, which exhibit good glass-forming ability may result in improved solubility of index raisers in the glass melts, which may contribute to the improved optical characteristics of some of the present glasses.

According to an embodiment of the present disclosure, the glasses described herein have a refractive index $n_d$ of greater than or equal to 1.85, as measured at 587.56 nm. In some examples, the glasses have a refractive index $n_d$ of greater than or equal to 1.85, greater than or equal to 1.90, greater than or equal to 1.95, greater than or equal to 2.00, greater than or equal to 2.05, or greater than or equal to 2.10, as measured at 587.56 nm. In some examples, the glasses have a refractive index $n_d$ of from 1.85 to 2.10, 1.90 to 2.10, 1.91 to 2.10, 1.95 to 2.10, 2.00 to 2.10, 2.05 to 2.10, 1.85 to 2.05, 1.90 to 2.05, 1.91 to 2.05, 1.95 to 2.05, 2.00 to 2.05, 1.85 to 2.00, 1.90 to 2.00, 1.91 to 2.00, 1.95 to 2.00, 1.85 to 1.95, 1.90 to 1.95, or 1.91 to 1.95, as measured at 587.56 nm.

At a given refractive index, lower density corresponds to a lower weight of the optical element which the glass is utilized in. Size and weight can be important in many types of optical devices, particularly portable optical devices, such as augmented reality systems, for example. As described above, the glasses of the present disclosure have a high refractive index in combination with a low density. According to an embodiment of the present disclosure, the glasses described herein have a density $d_{RT}$ of 5.5 g/cm³ or less, as measured at 25° C. In some examples, the glasses of the present disclosure may have a density $d_{RT}$ of 5.5 g/cm³ or less, 5.3 g/cm³ or less, 5.1 g/cm³ or less, 4.9 g/cm³ or less, 4.8 g/cm³ or less, or 4.5 g/cm³ or less, as measured at 25° C. In some examples, the glasses may have a refractive index $n_d$ of 1.91 to 2.0, as measured at 587.56 nm, and a density $d_{RT}$ of 4.3 g/cm³ to 5.1 g/cm³, as measured at 25° C. In some embodiments, the glasses have a refractive index $n_d$ of greater than or equal to 1.90, as measured at 587.56 nm, and a density $d_{RT}$ of less than or equal to 4.8 g/cm³, as measured at 25° C. In some embodiments, the glasses have a refractive index $n_d$ of greater than or equal to 1.96, as measured at 587.56 nm, and a density $d_{RT}$ of less than or equal to 4.95 g/cm³, as measured at 25° C. In some embodiments, the glasses have a refractive index $n_d$ of greater than or equal to 1.91, as measured at 587.56 nm, and a density $d_{RT}$ of less than or equal to 5.0 g/cm³, as measured at 25° C. In some embodiments, the glasses have a refractive index $n_d$ of greater than or equal to 2.00, as measured at 587.56 nm, and a density $d_{RT}$ of less than or equal to 5.0 g/cm³, as measured at 25° C.

In some embodiments, the glasses of the present disclosure can be characterized by a refractive index $n_d$ and a density $d_{RT}$ according to formula (III):

$$n_d-(0.815+0.25*d_{RT})>0.000 \qquad (III)$$

where the refractive index $n_d$ is measured at a wavelength of 587.56 nm and the density is measured at 25° C. (in g/cm³). In some embodiments, the glasses of the present disclosure can be characterized by a refractive index $n_d$ and a density $d_{RT}$ according to formula (IV):

$$n_d-(0.850+0.25*d_{RT})>0.000 \qquad (IV)$$

where the refractive index $n_d$ is measured at a wavelength of 587.56 nm and the density is measured at 25° C. (in g/cm³). In some embodiments, the glasses of the present disclosure can be characterized by a refractive index $n_d$ and a density $d_{RT}$ resulting in a value of greater than or equal to 0.020 according to formula (IV).

In some embodiments, the glasses are characterized by a high transmittance. In general, the higher the transmittance of a glass, the longer is the path traversed by light at a given optical loss, which can improve optical performance in many applications. High refractive index glasses typically include species, such as $TiO_2$ and $Nb_2O_5$, which absorb at least a portion of optical light, particularly light in the blue and near-UV regions of the electromagnetic spectrum. In embodiments of the present disclosure, the transmittance of the glass may be characterized for different wavelengths within the range of from about 300 nm to 2300 nm. High transmission in the visible and near-UV range (blue region) is particularly desirable in some applications. High transmittance in the blue can be challenging to achieve in high refractive index glasses. High level of $TiO_2$ and/or $Nb_2O_5$ that are typically used in glasses to increase refractive index tend to decrease the transmittance in the near-UV region and shift the UV cut-off to higher wavelengths. Internal transmittance (Fresnel losses accounted for) of blue light can be considered as acceptable when a sample of thickness 10 mm has an internal transmittance equal to or greater than 90% at a wavelength of 460 nm, good when the internal transmittance is equal to or greater than 95% at a wavelength of 460 nm, and excellent when the internal transmittance is equal to or greater than 97% at a wavelength of 460 nm.

In some embodiments, the glass may be characterized by a refractive index $n_d$ of at least 1.85 (measured at 587.56 nm), a density $d_{RT}$ (as measured at 25° C.), and a transmittance index $T_i$ that satisfies formula (V):

$$n_d - (0.815 + 0.25 * d_{RT}) - (0.16 - 0.38 * T_i) > 0.000 \quad (V)$$

where the transmittance index $T_i$ is determined according to formula (VI):

$$T_i = \frac{(La_2O_3 + Gd_2O_3 + ZrO_2)}{(La_2O_3 + Gd_2O_3 + ZrO_2 + TiO_2 + Nb_2O_5)} \quad (VI)$$

where each oxide listed in formula (VI) refers to the amount of the oxide, expressed in mol %, in the glass. The transmittance index $T_i$ is the molar fraction of the colorless index raisers $La_2O_3$, $Gd_2O_3$, and $ZrO_2$ to the total sum of the 5 index raisers $La_2O_3$, $Gd_2O_3$, $ZrO_2$, $Nb_2O_5$, and $TiO_2$. It has been found that the quantity of $T_i$ correlates to the blue transmittance of the high refractive index, low density glasses of the present disclosure.

In some embodiments, the glass may be characterized by a refractive index $n_d$ of at least 1.95 (measured at 587.56 nm), a density $d_{RT}$ (as measured at 25° C.), and a transmittance index $T_i$ that satisfies formula (VII):

$$n_d - (0.850 + 0.25 * d_{RT}) - (0.20 - 0.38 * T_i) > 0.000 \quad (VII)$$

where the transmittance index $T_i$ is determined according to formula (VI) above.

Refractive index and density are two properties that can be predicted from the glass composition. A linear regression analysis of comparative glasses near the composition space of the exemplary glasses of the present disclosure and some exemplary glasses was performed to determine an equation that can predict the composition dependence of the refractive index $n_d$ at a wavelength of 587.56 nm and the composition dependence of the density of the glass at 25° C. (in g/cm³). Formulas (VIII) and (IX) below were obtained from the linear regression analysis and used to predict the refractive index and density, respectively, of the glasses:

$$P_n = 1.817 - 0.0035654 * Al_2O_3 - 0.0038101 * B_2O_3 + \quad (VIII)$$
$$0.00081216 * BaO + 0.010373 * Bi_2O_3 + 0.00013728 * CaO +$$
$$0.0073116 * Er_2O_3 + 0.0055226 * Gd_2O_3 - 0.003343 * K_2O +$$
$$0.0060806 * La_2O_3 - 0.0009011 * Li_2O - 0.001967 * Na_2O +$$
$$0.0093799 * Nb_2O_5 + 0.0060396 * Nd_2O_3 - 0.0061024 * P_2O_5 +$$
$$0.0040356 * PbO - 0.0032812 * SiO_2 + 0.0030562 * TeO_2 +$$
$$0.0034148 * TiO_2 + 0.004267 * WO_3 + 0.0034424 * Y_2O_3 +$$
$$0.0071109 * Yb_2O_3 + 0.00096907 * ZnO + 0.0026412 * ZrO_2$$

$$P_d = 4.17 - 0.018843 * Al_2O_3 - 0.020477 * B_2O_3 + \quad (IX)$$
$$0.021988 * BaO + 0.074733 * Bi_2O_3 - 0.0024274 * CaO +$$
$$0.100258 * Er_2O_3 + 0.074270 * Gd_2O_3 - 0.018568 * K_2O +$$
$$0.060370 * La_2O_3 - 0.0089006 * Li_2O - 0.0090924 * Na_2O +$$
$$0.0062468 * Nb_2O_5 + 0.068993 * Nd_2O_3 - 0.038868 * P_2O_5 +$$
$$0.048530 * PbO - 0.018196 * SiO_2 + 0.013124 * TeO_2 -$$
$$0.005285 * TiO_2 + 0.044564 * WO_3 + 0.022887 * Y_2O_3 +$$
$$0.097857 * Yb_2O_3 + 0.0077032 * ZnO + 0.012501 * ZrO_2$$

where $P_n$ is a refractive index parameter that predicts the refractive index $n_d$ of the glass at a wavelength of 587.56 nm and $P_d$ is a density parameter that predicts the density of the glass at a 25° C. (in g/cm³) based on the composition of the glass, where each oxide listed in formulas (VIII) and (IX) refers to the amount of the oxide in the glass, expressed in mol %.

Table 1 below specifies the concentration limits where the formulas (VIII) and (IX) were derived. The linear regression analysis used to determine formulas (VIII) and (IX) randomly selected glasses to use as a training dataset to develop the regression and selected glasses to use as a validation dataset to evaluate the ability to interpolate within predefined compositional limits (shown in Table 1 below). The training dataset of glass compositions satisfying the criteria specified in Table 1 below and having measured values of the properties of interest, about 100 glass compositions for each property, was randomly selected from the literature data presented in the publicly available SciGlass Information System database and from the Exemplary Glasses from the embodiments presented herein. The linear regression analysis on the above-specified dataset was used to determine the formulas (VIII) and (IX), with the exclusion of insignificant variables and outliers. The resulting formulas (VIII) and (IX) are presented in Table 2 below. Another part of the glass compositions satisfying the same criteria was used as a validation set to evaluate the ability to interpolate within the predefined compositional limits, which corresponds to the standard deviations specified in the Table 2. An external dataset of prior art glass compositions, also randomly selected from the SciGlass Information System database, was used to evaluate the ability to predict the particular properties outside of the specified compositional limits with a reasonable accuracy. Multiple iterations of this process were performed in order to determine the best variant for each property of interest, corresponding to the above-mentioned regression formulas specified in the Table 2.

TABLE 1

Composition Area Used for Modeling

| | Property | | | |
|---|---|---|---|---|
| | $n_d$ | | $d_{RT}$ (g/cm³) | |
| Component limits | Min. (mol %) | Max. (mol %) | Min. (mol %) | Max. (mol %) |
| $TiO_2$ | 5 | 40 | 5 | 40 |
| $La_2O_3$ | 0 | 30 | 0 | 30 |
| $B_2O_3$ | 5 | 30 | 5 | 30 |
| $SiO_2$ | 5 | 20 | 5 | 20 |
| $ZrO_2$ | 0 | 10 | 0 | 10 |
| $Nb_2O_5$ | 0 | 15 | 0 | 15 |
| CaO | 0 | 20 | 0 | 20 |
| BaO | 0 | 10 | 0 | 10 |
| Other species | 0 | Not limited | 0 | Not limited |

TABLE 2

Property Prediction Models

| Property | Abbreviation | Unit | Predicting Parameter | Regression Formula | Standard error |
|---|---|---|---|---|---|
| Refractive index at 587.56 nm | $n_d$ | | $P_n$ | Formula (VIII) | 0.019 |
| Density at room temperature | $d_{RT}$ | g/cm³ | $P_d$ | Formula (IX) | 0.090 |

Figure 2:
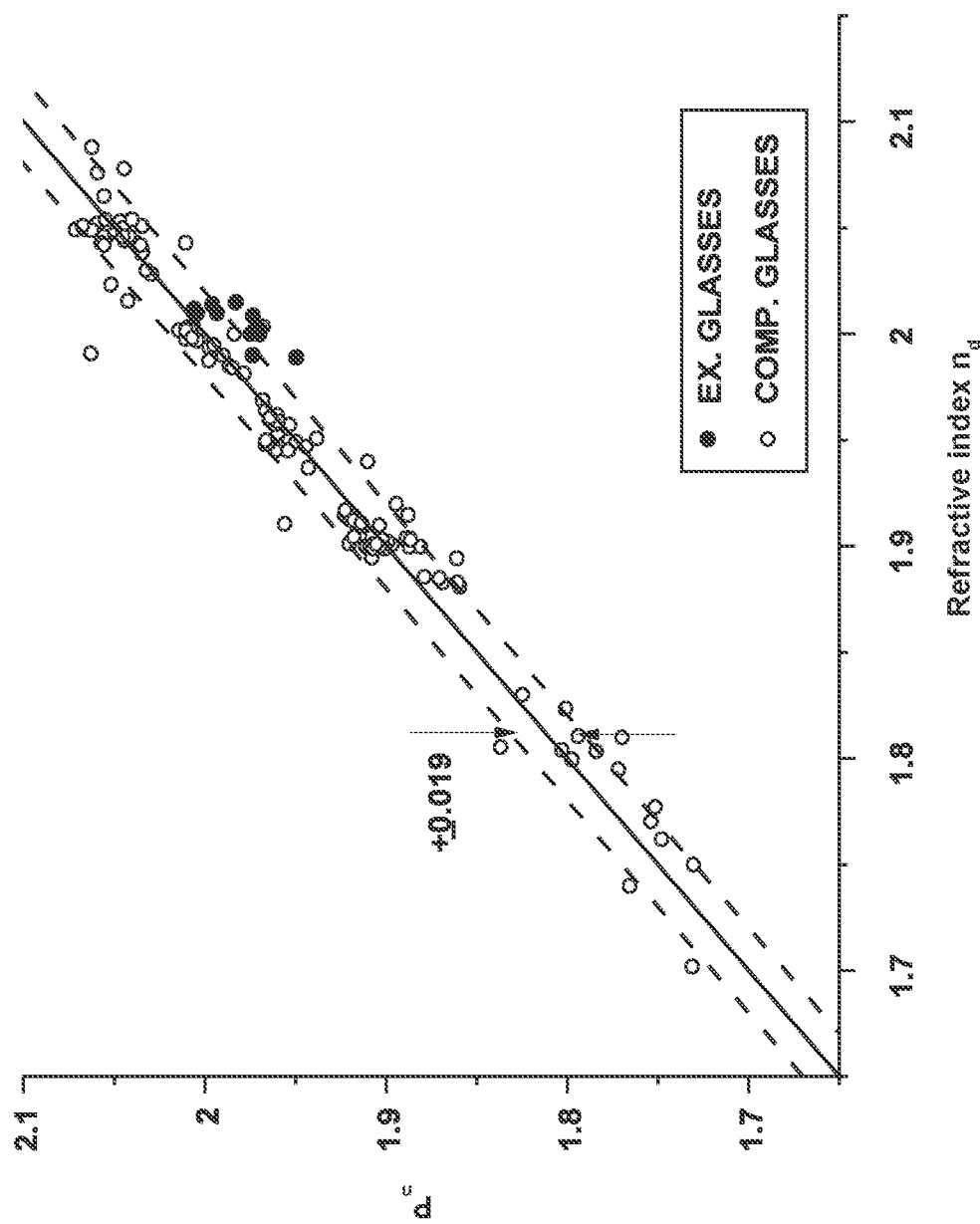
FIG. 2 is a plot illustrating the relationship between the refractive index $n_d$ (as measured at 587.56 nm) and the refractive index parameter $P_n$ calculated according to formula (VIII) for some comparative glasses and some exemplary glasses according to an embodiment of the present disclosure.

FIG. 1 is a plot of measured density $d_{RT}$ (measured at 25° C., in g/cm³) as a function of density parameter $P_d$ for some Comparative Glasses ("Comp. Glasses") and Exemplary Glasses ("Ex. Glasses"). As illustrated by the data in FIG. 1, the composition dependence of the density parameter $P_d$ had an error within a range of ±0.090 g/cm³ of the measured density for the majority of the glasses. FIG. 2 is a plot of measured refractive index $n_d$ (measured at 587.56 nm) as a function of refractive index parameter $P_n$ for some Comparative Glasses ("Comp. Glasses") and Exemplary Glasses ("Ex. Glasses"). As illustrated by the data in FIG. 2, the compositional dependence of the refractive index parameter $P_n$ had an error within a range of ±0.019 units of the measured refractive index $n_d$ for the majority of the glasses.

Concentration limits representing some embodiments of the present disclosure are specified in Tables 3-6 below.

According to another embodiment of the present disclosure, the present glasses can have a refractive index parameter $P_n$ and a density parameter $P_d$ that satisfies formula (X):

$$P_n-(0.815+0.25*P_d)>0.000 \qquad (X).$$

According to some embodiments of the present disclosure, the present glasses can have a refractive index parameter $P_n$ and a density parameter $P_d$ that satisfies formula (XI):

$$P_n-(0.850+0.25*P_d)>0.000 \qquad (XI).$$

In some embodiments, the glasses of the present disclosure can have a refractive index parameter $P_n$, a density parameter $P_d$, and a transmittance index $T_i$ that satisfies formula (XII):

$$P_n-(0.815+0.25*P_d)-(0.16-0.38*T_i)>0.000 \qquad (XII)$$

where $P_n$ has a value of 1.85 or greater.

In some embodiments, the glasses of the present disclosure can have a refractive index parameter $P_n$, a density parameter $P_d$, and a transmittance index $T_i$ that satisfies formula (XIII):

$$P_n-(0.850+0.25*P_d)-(0.20-0.38*T_i)>0.000 \qquad (XIII)$$

In some embodiments, the glasses may be characterized by good glass forming ability, which can be assessed as a resistance to devitrification during cooling. As discussed above, glass forming ability can be measured numerically by determining the critical cooling rate of a melt, i.e., the minimum cooling rate at which a melt forms a glass without crystallization. According to one embodiment, the glasses may be characterized by a critical cooling rate less than or equal to 300° C./min. and in some examples, less than or equal to 100° C./min. In some embodiments, the glasses of the present disclosure can be characterized by an ability to cool, in air, from 1100° C. to 500° C. in 2.5 minutes without crystallizing. Glasses characterized by this glass forming ability can be compatible with press molding processes.

Exemplary Glasses A of the present disclosure according to some embodiments of the present disclosure are shown below in Table 3. Table 3 identifies the combination of components and their respective amounts according to some embodiments of the present disclosure. The Exemplary Glasses A in Table 3 may include additional components according to any aspects of the present disclosure as described herein in an amount that is not greater than 0.5 mol %. The Exemplary Glasses A in Table 3 may have a ratio of ($B_2O_3/SiO_2$), expressed in terms of mol % of each oxide, that is greater than or equal to 0.05.

TABLE 3

| Exemplary Glasses A | |
|---|---|
| Component | Amount (mol %) |
| $SiO_2$ | 14.0 mol % to 50.0 mol % |
| $B_2O_3$ | >0.0 mol % |
| $TiO_2$ | 5.0 mol % to 40.0 mol % |
| $RE_mO_n$ | 0.0 mol % to 30.0 mol % |
| $Nb_2O_5$ | 2.2 mol % to 50.0 mol % |
| $ZrO_2$ | 2.5 mol % to 25.0 mol % |
| $Y_2O_3$ | Substantially free |
| Additional components | 0.0 mol % to 0.5 mol % |

Exemplary Glasses B of the present disclosure according to some embodiments of the present disclosure are shown below in Table 4. Table 4 identifies the combination of components and their respective amounts according to some embodiments of the present disclosure. The Exemplary Glasses B in Table 4 may include additional components according to any aspects of the present disclosure as described herein in an amount that is not greater than 0.5 mol %. The Exemplary Glasses B in Table 4 may have a ratio of ($B_2O_3/SiO_2$), expressed in terms of mol % of each oxide, that is greater than or equal to 0.05.

TABLE 4

| Exemplary Glasses B | |
|---|---|
| Component | Amount (mol %) |
| $SiO_2$ | 14.0 mol % to 50.0 mol % |
| $B_2O_3$ | 10.0 mol % to 40.0 mol % |
| $TiO_2$ | 12.0 mol % to 40.0 mol % |
| $RE_mO_n$ | ≥0.0 mol % |
| $Nb_2O_5$ | 2.2 mol % to 30.0 mol % |
| $ZrO_2$ | 2.5 mol % to 13.0 mol % |
| $Y_2O_3$ | Substantially free |
| Additional components | 0.0 mol % to 0.5 mol % |

Exemplary Glasses C of the present disclosure according to some embodiments of the present disclosure are shown below in Table 5. Table 5 identifies the combination of components and their respective amounts according to an embodiment of the present disclosure. The Exemplary Glasses C in Table 5 may include additional components according to any aspects of the present disclosure as described herein.

TABLE 5

| Exemplary Glasses C | |
|---|---|
| Composition | Amount (mol %) |
| $La_2O_3$ | ≥13.5 mol % |
| $B_2O_3$ | 1.0 mol % to 40.0 mol % |
| $TiO_2$ | 0.0 mol % to 33.0 mol % |
| $P_2O_5$ | 0.0 mol % to 20.0 mol % |
| $Nb_2O_5$ | 0.0 mol % to 12.3 mol % |
| $GeO_2$ | 0.0 mol % to 10.0 mol % |
| $ThO_2$ | 0.0 mol % to 5.0 mol % |
| $Al_2O_3$ | 0.0 mol % to 2.5 mol % |
| ($SiO_2 + B_2O_3$) | 1.0 mol % to 50.0 mol % |
| ($ZnO + Y_2O_3$) | 0.0 mol % to 2.5 mol % |

Exemplary Glasses C according to embodiments of the present disclosure may also satisfy one or more of formula (X) or (XI):

$$P_n-(0.815+0.25*P_d)>0.000 \qquad (X)$$

and/or $$P_n-(0.850+0.25*P_d)>0.000 \qquad (XI)$$

where $P_n$ is refractive index parameter determined according to Formula (VIII) and $P_d$ is density parameter determined according to Formula (IX), where each oxide listed in formula (VIII) and (IX) refers to the amount of the oxide in the glass, expressed in mol %.

Exemplary Glasses C according to embodiments of the present disclosure may also satisfy one or more of formula (III) or (IV):

$$n_d-(0.815+0.25*d_{RT})>0.000 \qquad (III)$$

and/or $$n_d-(0.850+0.25*d_{RT})>0.000 \qquad (IV)$$

where $d_{RT}$ is the density in g/cm³, as measured at 25° C., and $n_d$ is the refractive index, as measured at 587.56 nm.

Exemplary Glasses D of the present disclosure according to some embodiments of the present disclosure are shown below in Table 6. Table 6 identifies the combination of components and their respective amounts according to an embodiment of the present disclosure. The Exemplary Glasses D in Table 6 may include additional components according to any aspects of the present disclosure as described herein.

TABLE 6

| Exemplary Glasses D | |
|---|---|
| Composition | Amount (mol %) |
| $B_2O_3$ | ≥14.5 mol % |
| $SiO_2$ | ≥2.0 mol % |
| $Nb_2O_5$ | 1.0 to 45.0 mol % |
| $TiO_2$ | 0.0 to 36 mol % |
| $ZrO_2$ | ≥0.0 mol % |
| $P_2O_5$ | 0.0 to 20.0 mol % |
| $Al_2O_3$ | 0.0 to 2.5 mol % |
| CaO | 0.0 to 15.0 mol % |
| MgO | 0.0 to 15.0 mol % |
| $TeO_2$ | 0.0 to 10.0 mol % |
| $Li_2O$ | 0.0 to 8.0 mol % |
| ZnO | 0.0 to 5.5 mol % |
| $Ga_2O_3$ | 0.0 to 5.0 mol % |
| $GeO_2$ | 0.0 to 0.5 mol % |
| $MoO_3$ | 0.0 to 3.0 mol % |
| $Ta_2O_5$ | 0.0 to 1.5 mol % |
| $Y_2O_3$ | 0.0 to 1.0 mol % |
| $RE_mO_n$ | 0.0 to 50.0 mol % |
| $R_2O$ | 0.0 to 15.0 mol % |
| ($RE_mO_n$ + $TiO_2$ + $Nb_2O_5$ + $ZrO_2$ + $Bi_2O_3$ + $WO_3$) | ≥25.0 mol % mol % |
| ($SiO_2$ + $B_2O_3$) | 3.0 to 50.0 mol % |
| ($AS_2O_3$ + $Sb_2O_3$) | 0.0 to 1.0 mol % |
| F | substantially free |
| ($R_2O$ + RO − BaO) | 0.0 to 20.0 mol % |

Exemplary Glasses D according to an embodiment of the present disclosure can have a refractive index $n_d$ of greater than or equal to 1.85, as measured at 587.56 nm. In some embodiments, the Exemplary Glasses D satisfy one or more of formula (XII) or (XIII):

$$P_n-(0.815+0.25*P_d)-(0.16-0.38*T_i)>0.000 \qquad (XII)$$

and/or $$P_n-(0.850+0.25*P_d)-(0.20-0.38*T_i)>0.000 \qquad (XIII)$$

where $P_d$ is calculated according to formula (VIII), $P_d$ is calculated according to formula (IX), and $T_i$ is calculated according to formula (VI).

Exemplary Glasses D according to embodiments of the present disclosure may also satisfy one or more of formula (V) or (VII):

$$n_d-(0.815+0.25*d_{RT})-(0.16-0.38*T_i)>0.000 \qquad (V)$$

and/or $$n_d-(0.850+0.25*d_{RT})-(0.20-0.38*T_i)>0.000 \qquad (VII)$$

where $d_{RT}$ is the density in g/cm³, as measured at 25° C., $n_d$ is the refractive index, as measured at 587.56 nm, and $T_i$ is calculated according to formula (VI).

Embodiments of the present disclosure can provide glasses that are characterized by a high refractive index $n_d$ of 1.90 or greater, in some embodiments greater than 2.0, in combination with a density of less than or equal to, 5.5 g/cm³ (as measured at 25° C.), optionally in combination with one or more additional desired features. In some embodiments, the glasses of the present disclosure can provide an improvement in glass forming ability compared to some prior art silicoborate glasses that have similar values of density and refractive index $n_d$. These improvements in glass forming ability can simplify production, provide cost savings and/or improve the quality of the final glass product. In some embodiments, the glasses of the present disclosure may provide comparable or improved transmittance for blue light compared to prior art glasses having similar refractive index $n_d$ and/or density characteristics.

Glass transmittance can be based at least in part on the composition constituents and/or processes used to form the glass. In a manufacturing setting in which the process parameters have already been determined/optimized, the transmittance of the glass essentially becomes composition dependent. Without wishing to be bound by any theory, it is believed that components such as $TiO_2$ and $Nb_2O_5$ may reduce the blue transmittance of a glass, particularly when used in high concentrations. However, components such as $TiO_2$ and $Nb_2O_5$ can be used in to increase the refractive index of a glass without a corresponding undesirable increase in the density of the glass. Thus, in some embodiments, components such as $TiO_2$ and $Nb_2O_5$ can be added at concentrations adapted to provide a desired refractive index and density that also still provides a glass having an acceptable level of blue transmittance. The refractive index of the present glasses can also be increased using other oxides as well, such as $ZrO_2$, $La_2O_3$, $Gd_2O_3$, and in some cases other rare earth metal oxides. It has been found that the addition of these oxides can produce a glass having a desirable blue transmittance. However, these oxides may also increase the density, which may be undesirable in some applications. High concentrations of some of these oxides may also decrease the glass-forming ability of the composition. For example, these oxides may increase the liquidus temperature and/or result in precipitation of crystalline phases containing these oxides from the glass melts at high temperature. Of the oxides $ZrO_2$, $La_2O_3$, $Gd_2O_3$, $TiO_2$, and $Nb_2O_5$, $ZrO_2$ was observed in some compositions to have the greatest impact on liquidus temperature while at the same time having the least impact on blue transmittance of the glass. Thus, attempts to increase the refractive index and/or decrease density can have an undesirable effect on the glass-forming ability of a composition. Embodiments of the present disclosure can provide glasses having a high refractive index $n_d$ of 1.90 or greater, in some embodiments greater than 2.0, in combination with a density of less than or equal to 5.5 g/cm³ (as measured at 25° C.) while also still providing glasses that exhibit a level of blue transmittance and glass-forming ability that is acceptable in many applications, such as augmented reality devices, virtual reality devices, mixed reality devices, and/or eye wear, for example.

Examples

The following examples describe various features and advantages provided by the disclosure, and are in no way intended to limit the invention and appended claims.

Exemplary Glasses and Comparative Glasses were all prepared by melting relatively pure oxide materials. Table 7 below lists the typical tramp elements found in some of the oxides used in preparing the Exemplary Glasses and Comparative Glasses described herein.

TABLE 7

Raw Oxide Materials and Corresponding Level of Tramp Elements.

| Raw material | Fe content (ppm) | Cu content (ppm) | Ni content (ppm) | Cr content (ppm) |
| --- | --- | --- | --- | --- |
| Quartz | <10 | <1 | <1 | <1 |
| Boric anhydride | <10 | <1 | <1 | <1 |
| Titanium oxide | <50 | <15 | <1 | <5 |
| Zirconium oxide | <5 | <5 | <5 | <5 |
| Niobium oxide | <70 | <5 | <5 | <5 |
| Lanthanum oxide | <90 | <4 | <5 | <5 |

Figure 3:
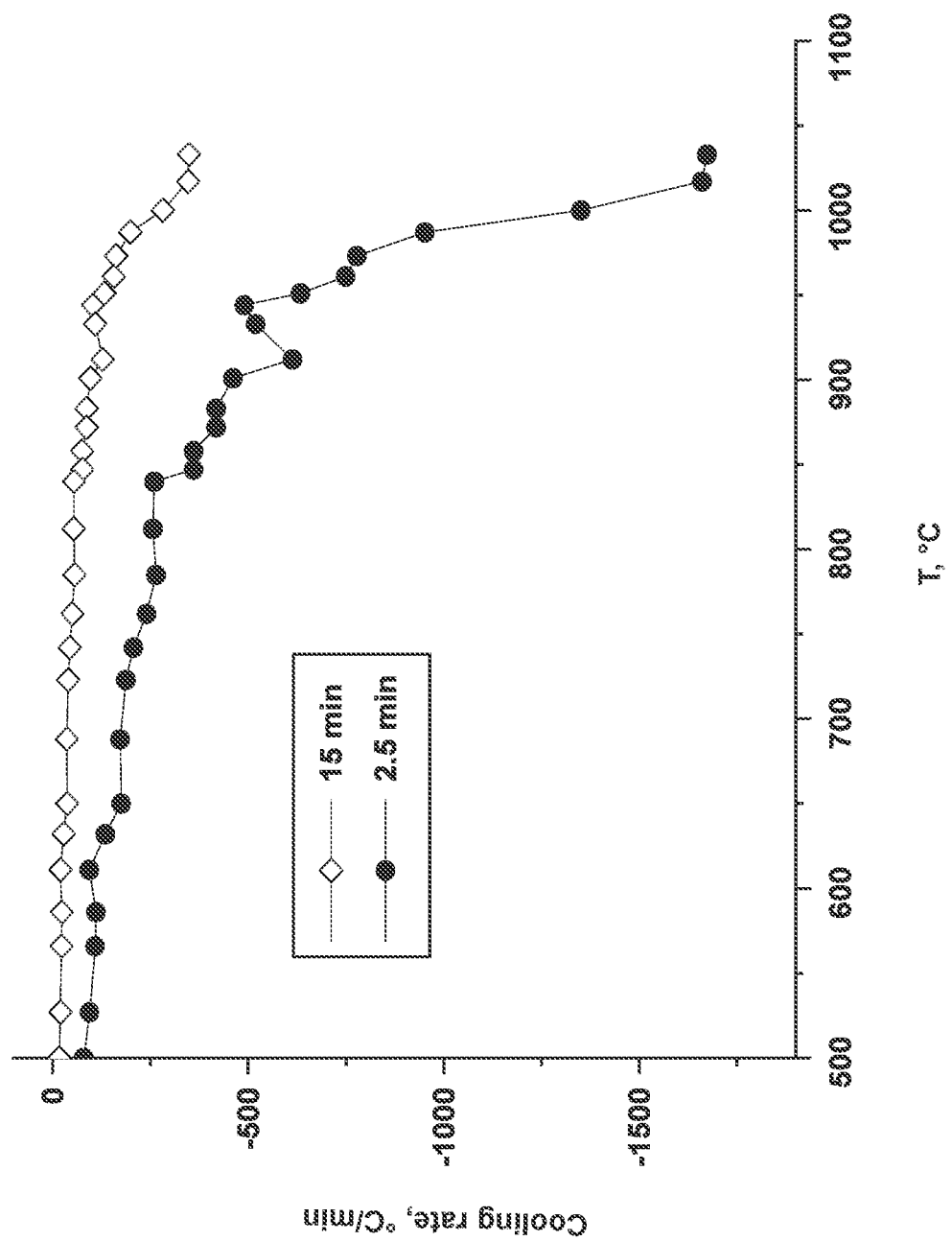
FIG. 3 is a plot of an exemplary cooling schedule according to a "15 min test" condition and a "2.5 min test" condition for some exemplary glasses according to an embodiment of the present disclosure.

To prepare the glass samples, about 15 grams of each sample (content of target species was more than 99.99 wt %) was melted from batch raw materials at a temperature of about 1300° C. in platinum or platinum-rhodium crucibles (Pt:Rh=80:20) for 1 hour. Two controlled cooling conditions were applied. In the first condition (referred to as "15 min test"), it takes about 15 min for the samples to cool from 1100° C. to 500° C. inside a furnace. In the second condition (referred to as "2.5 min test"), it takes about 2.5 min for the samples to cool from 1100° C. to 500° C. Temperature readings were obtained by direct reading of the furnace temperature or using an IR camera reading with calibration scaling. The first condition (15 min test) approximately corresponds to the cooling rate of up to 300° C./min at a temperature of 1000° C. and the second test condition (2.5 min test) approximately corresponds to the cooling rate of up to 600° C./min at 1000° C. (near to this temperature, the cooling rate approached the maximum). When the temperature is lower, the cooling rate also decreases significantly. Typical schedules of the first and second cooling regimes are shown in FIG. 3. No chemical analysis of the tested samples was performed because chemical analysis was performed for similar samples prepared in independent meltings by XRF method (X-ray fluorescence—for all oxides, except for $B_2O_3$) and by ICP method (inductively coupled plasma mass spectrometry—for $B_2O_3$). These analyses gave deviations from the batched compositions within ±2.0 mass % for the major components such as $Nb_2O_5$ which is equivalently less than about 1 mol %.

Table 8 below lists the glass compositions and properties for Exemplary Glasses 1-90, according to embodiments of the present disclosure. Table 8 includes the observations from three devitrification tests, referred to as "Devit test 1," "Devit test 2," and "Devit test 3." "Devit test 1" refers to the results of observations of glass samples melted in 1 liter crucibles under an optical microscope (between 100× and 500× magnification). The abbreviations "A", "B", "C" and "D" are used as follows: no evidence of crystallization ("A"); a very limited number of crystals was found under the microscope, typically in only one or two spots within the glass and only at the surface, with more than 98% of the surface being crystal free ("B"); more crystals at the surface, but with more than 90% of the glass surface being crystal-free ("C"); and some crystals in the bulk of crucible, with less than 90% of the glass surface being crystal-free ("D"). "Devit test 2" refers to the "15 min test" cooling procedure as described above; the observation "OK" is used to indicate that a glass composition passed this test. "Devit test 3" refers to the "2.5 min test" cooling procedure as described above; the observation "OK" is used to indicate that a glass composition passed this test.

TABLE 8

Exemplary Glass Compositions and Properties

| Exemplary Glass | | 1 | 2 | 3 | 4 | 5 | 6 | 7 | 8 |
| --- | --- | --- | --- | --- | --- | --- | --- | --- | --- |
| Composition-mol. % | | | | | | | | | |
| $TiO_2$ | mol. % | 24.93 | 26.54 | 29.60 | 30.44 | 32.49 | 31.28 | 33.08 | 35.01 |
| $B_2O_3$ | mol. % | 17.96 | 16.66 | 17.97 | 16.88 | 17.97 | 16.10 | 16.95 | 17.97 |
| $La_2O_3$ | mol. % | 26.93 | 27.91 | 22.99 | 24.24 | 20.58 | 24.92 | 21.89 | 18.45 |
| $SiO_2$ | mol. % | 17.95 | 18.27 | 17.59 | 17.91 | 17.39 | 18.12 | 17.68 | 17.20 |
| $Nb_2O_5$ | mol. % | 7.98 | 5.41 | 6.55 | 4.54 | 5.67 | 3.03 | 3.84 | 4.90 |
| $ZrO_2$ | mol. % | 3.99 | 4.95 | 5.07 | 5.76 | 5.74 | 6.32 | 6.34 | 6.32 |
| CaO | mol. % | 0.06 | 0.06 | 0.05 | 0.05 | 0.02 | 0.05 | 0.05 | 0.02 |
| $Na_2O$ | mol. % | 0.03 | 0.03 | 0.02 | 0.02 | 0 | 0.02 | 0.02 | 0 |
| $CeO_2$ | mol. % | 0.16 | 0.16 | 0.14 | 0.14 | 0.12 | 0.15 | 0.13 | 0.11 |
| $Al_2O_3$ | mol. % | 0.02 | 0.02 | 0.01 | 0.01 | 0.01 | 0.01 | 0.01 | 0.01 |
| $Fe_2O_3$ | mol. % | 0 | 0 | 0.01 | 0 | 0.01 | 0 | 0.01 | 0.01 |
| Composition constraints | | | | | | | | | |
| $B_2O_3/SiO_2$ | mol. % | 1.001 | 0.9118 | 1.021 | 0.9425 | 1.033 | 0.8886 | 0.9588 | 1.045 |
| REmOn | mol. % | 27.03 | 28.01 | 23.08 | 24.32 | 20.65 | 25.02 | 21.97 | 18.52 |
| $SiO_2 + B_2O_3$ | mol. % | 35.94 | 34.96 | 35.59 | 34.82 | 35.38 | 34.24 | 34.65 | 35.19 |

TABLE 8-continued

Exemplary Glass Compositions and Properties

| | | | | | | | | | |
|---|---|---|---|---|---|---|---|---|---|
| (SiO$_2$ + B$_2$O$_3$) | mol. % | 35.94 | 34.96 | 35.59 | 34.82 | 35.38 | 34.24 | 34.65 | 35.19 |
| REmOn + TiO$_2$ + Nb$_2$O$_5$ + ZrO$_2$ + Bi$_2$O$_3$ + WO$_3$) | mol. % | 63.95 | 64.93 | 64.32 | 65.10 | 64.58 | 65.68 | 65.26 | 64.77 |
| R$_2$O + RO − BaO | mol. % | 0.09005 | 0.09005 | 0.07005 | 0.07007 | 0.02001 | 0.07004 | 0.07005 | 0.02001 |

Measured properties

| | | | | | | | | | |
|---|---|---|---|---|---|---|---|---|---|
| n$_d$ | | | | 2.011 | | | | | |
| d$_{RT}$ | g/cm$^3$ | 4.982 | 5.045 | 4.844 | 4.904 | 4.747 | 4.944 | 4.821 | 4.627 |
| T$_i$ | | 0.48441 | 0.50697 | 0.43712 | 0.46170 | 0.40814 | 0.47660 | 0.43334 | 0.38303 |
| Devit Test 2 | | | | | OK | OK | | OK | |
| Devit Test 3 | | OK | OK | OK | OK | OK | OK | OK | OK |
| n$_d$ − (0.815 + 0.25 * d$_{RT}$) | | | | −0.015 | | | | | |
| n$_d$ − (0.815 + 0.25 * d$_{RT}$) − (0.16 − 0.38 * T$_i$) | | | | −0.0089 | | | | | |

Predicted properties

| | | | | | | | | | |
|---|---|---|---|---|---|---|---|---|---|
| P$_n$ [for n$_d$] | | 2.024 | 2.018 | 2.007 | 2.003 | 1.996 | 2.000 | 1.993 | 1.987 |
| P$_d$ [for d$_{RT}$] | g/cm$^3$ | 5.068 | 5.135 | 4.816 | 4.899 | 4.662 | 4.946 | 4.749 | 4.526 |
| n$_d$ − (0.815 + 0.25 * d$_{RT}$) | | −0.0579 | −0.0809 | −0.0123 | −0.0366 | 0.0156 | −0.0517 | −0.0090 | 0.0402 |
| n$_d$ − (0.815 + 0.25 * d$_{RT}$) − (0.16 − 0.38 * T$_i$) | | −0.0338 | −0.0482 | −0.0063 | −0.0212 | 0.0107 | −0.0306 | −0.0043 | 0.0257 |

| Exemplary Glass | | 9 | 10 | 11 | 12 | 13 | 14 | 15 | 16 |
|---|---|---|---|---|---|---|---|---|---|

Composition-mol. %

| | | | | | | | | | |
|---|---|---|---|---|---|---|---|---|---|
| TiO$_2$ | mol. % | 35.91 | 32.49 | 33.09 | 35.90 | 30.44 | 23.22 | 19.90 | 29.80 |
| B$_2$O$_3$ | mol. % | 16.95 | 17.96 | 16.95 | 16.94 | 16.88 | 20.94 | 20.29 | 21.00 |
| La$_2$O$_3$ | mol. % | 19.54 | 20.57 | 21.89 | 19.53 | 24.24 | 19.97 | 19.97 | 19.97 |
| SiO$_2$ | mol. % | 17.48 | 17.38 | 17.68 | 17.47 | 17.91 | 15.72 | 15.80 | 15.38 |
| Nb$_2$O$_5$ | mol. % | 2.98 | 5.67 | 3.84 | 2.98 | 4.54 | 11.68 | 13.05 | 7.90 |
| ZrO$_2$ | mol. % | 6.98 | 5.73 | 6.34 | 6.98 | 5.76 | 8.31 | 10.83 | 5.78 |
| CaO | mol. % | 0.02 | 0.0493 | 0.0494 | 0.0469 | 0.05 | 0.03 | 0.03 | 0.03 |
| Na$_2$O | mol. % | 0 | 0.0223 | 0.0223 | 0.0212 | 0.02 | 0 | 0 | 0 |
| CeO$_2$ | mol. % | 0.11 | 0.12 | 0.13 | 0.11 | 0.14 | 0.12 | 0.12 | 0.11 |
| Al$_2$O$_3$ | mol. % | 0.01 | 0.0136 | 0.0136 | 0.0129 | 0.01 | 0.01 | 0 | 0.01 |
| Fe$_2$O$_3$ | mol. % | 0.01 | 0 | 0 | 0 | 0 | 0 | 0 | 0 |
| Ta$_2$O$_5$ | mol. % | 0 | 0.0063 | 0.0031 | 0.003 | 0 | 0.01 | 0.01 | 0.01 |

Composition constraints

| | | | | | | | | | |
|---|---|---|---|---|---|---|---|---|---|
| B$_2$O$_3$/SiO$_2$ | mol. % | 0.9697 | 1.033 | 0.9587 | 0.9700 | 0.9425 | 1.332 | 1.284 | 1.365 |
| REmOn | mol. % | 19.61 | 20.64 | 21.97 | 19.60 | 24.32 | 20.04 | 20.04 | 20.04 |
| SiO$_2$ + B$_2$O$_3$ | mol. % | 34.45 | 35.36 | 34.65 | 34.43 | 34.82 | 36.68 | 36.11 | 36.40 |
| (SiO$_2$ + B$_2$O$_3$) | mol. % | 34.45 | 35.36 | 34.65 | 34.43 | 34.82 | 36.68 | 36.11 | 36.40 |
| REmOn + TiO$_2$ + Nb$_2$O$_5$ + ZrO$_2$ + Bi$_2$O$_3$ + WO$_3$) | mol. % | 65.51 | 64.55 | 65.27 | 65.48 | 65.10 | 63.27 | 63.85 | 63.55 |
| R$_2$O + RO − BaO | mol. % | 0.02001 | 0.07169 | 0.07178 | 0.06808 | 0.07007 | 0.03003 | 0.03001 | 0.03001 |

Measured properties

| | | | | | | | | | |
|---|---|---|---|---|---|---|---|---|---|
| n$_d$ | | | 2.014 | 2.010 | 2.015 | | | | |
| d$_{RT}$ | g/cm$^3$ | 4.716 | | | | | | | |
| T$_i$ | | 0.40547 | 0.40800 | 0.43319 | 0.40547 | 0.46159 | 0.44756 | 0.48316 | 0.40582 |
| Devit Test 2 | | OK | | | | OK | | | OK |
| Devit Test 3 | | OK | | | | OK | OK | OK | OK |

Predicted properties

| | | | | | | | | | |
|---|---|---|---|---|---|---|---|---|---|
| P$_n$ [for n$_d$] | | 1.983 | 1.996 | 1.993 | 1.983 | 2.003 | 2.018 | 2.028 | 1.999 |
| P$_d$ [for d$_{RT}$] | g/cm$^3$ | 4.599 | 4.661 | 4.749 | 4.598 | 4.899 | 4.713 | 4.783 | 4.628 |
| n$_d$ − (0.815 + 0.25 * d$_{RT}$) | | 0.0183 | 0.0157 | −0.0089 | 0.0183 | −0.0366 | 0.0247 | 0.0177 | 0.0272 |
| n$_d$ − (0.815 + 0.25 * d$_{RT}$) − (0.16 − 0.38 * T$_i$) | | 0.0124 | 0.0107 | −0.0043 | 0.0124 | −0.0212 | 0.0348 | 0.0413 | 0.0214 |

| Exemplary Glass | | 17 | 18 | 19 | 20 | 21 | 22 | 23 | 24 |
|---|---|---|---|---|---|---|---|---|---|

Composition-mol. %

| | | | | | | | | | |
|---|---|---|---|---|---|---|---|---|---|
| TiO$_2$ | mol. % | 27.83 | 26.00 | 34.96 | 32.83 | 31.13 | 32.93 | 37.76 | 32.91 |
| B$_2$O$_3$ | mol. % | 20.13 | 19.49 | 19.96 | 19.16 | 18.54 | 17.97 | 17.11 | 17.24 |
| La$_2$O$_3$ | mol. % | 19.97 | 19.97 | 19.97 | 19.97 | 19.97 | 21.95 | 21.97 | 25.83 |
| SiO$_2$ | mol. % | 15.37 | 15.38 | 14.98 | 14.97 | 14.97 | 16.96 | 12.98 | 13.80 |
| Nb$_2$O$_5$ | mol. % | 8.26 | 8.77 | 3.99 | 4.53 | 4.95 | 3.49 | 3.49 | 3.49 |
| ZrO$_2$ | mol. % | 8.27 | 10.23 | 5.99 | 8.39 | 10.29 | 6.49 | 6.49 | 6.49 |
| CaO | mol. % | 0.03 | 0.03 | 0.02 | 0.02 | 0.02 | 0.05 | 0.05 | 0.05 |
| Na$_2$O | mol. % | 0 | 0 | 0 | 0 | 0 | 0.02 | 0.02 | 0.02 |
| CeO$_2$ | mol. % | 0.12 | 0.12 | 0.12 | 0.12 | 0.12 | 0.13 | 0.13 | 0.16 |

TABLE 8-continued

Exemplary Glass Compositions and Properties

| | | | | | | | | | |
|---|---|---|---|---|---|---|---|---|---|
| Al$_2$O$_3$ | mol. % | 0.01 | 0.01 | 0.01 | 0.01 | 0.01 | 0.01 | 0 | 0 |
| Ta$_2$O$_5$ | mol. % | 0.01 | 0.01 | 0 | 0 | 0 | 0 | 0 | 0 |
| Composition constraints | | | | | | | | | |
| B$_2$O$_3$/SiO$_2$ | mol. % | 1.310 | 1.267 | 1.332 | 1.280 | 1.239 | 1.059 | 1.318 | 1.249 |
| REmOn | mol. % | 20.04 | 20.04 | 20.04 | 20.04 | 20.04 | 22.03 | 22.05 | 25.94 |
| SiO$_2$ + B$_2$O$_3$ | mol. % | 35.52 | 34.89 | 34.96 | 34.15 | 33.53 | 34.95 | 30.11 | 31.07 |
| (SiO$_2$ + B$_2$O$_3$) | mol. % | 35.52 | 34.89 | 34.96 | 34.15 | 33.53 | 34.95 | 30.11 | 31.07 |
| REmOn + TiO$_2$ + Nb$_2$O$_5$ + ZrO$_2$ + Bi$_2$O$_3$ + WO$_3$) | mol. % | 64.43 | 65.06 | 65.01 | 65.82 | 66.44 | 64.97 | 69.82 | 68.86 |
| R$_2$O + RO − BaO | mol. % | 0.03002 | 0.03003 | 0.02001 | 0.02001 | 0.02001 | 0.07005 | 0.07004 | 0.07006 |
| Measured properties | | | | | | | | | |
| T$_i$ | | 0.43899 | 0.46483 | 0.39991 | 0.43168 | 0.45623 | 0.43845 | 0.40818 | 0.47029 |
| Devit Test 2 | | OK | | OK | OK | | OK | OK | |
| Devit Test 3 | | OK | OK | OK | OK | OK | OK | OK | OK |
| Predicted properties | | | | | | | | | |
| P$_n$ [for n$_d$] | | 2.006 | 2.012 | 1.986 | 1.993 | 1.999 | 1.989 | 2.022 | 2.026 |
| P$_d$ [for d$_{RT}$] | g/cm$^3$ | 4.690 | 4.740 | 4.608 | 4.669 | 4.717 | 4.745 | 4.811 | 5.053 |
| n$_d$ − (0.815 + 0.25 * d$_{RT}$) | | 0.0183 | 0.0119 | 0.0191 | 0.0110 | 0.0045 | −0.0126 | 0.0039 | −0.0527 |
| n$_d$ − (0.815 + 0.25 * d$_{RT}$) − (0.16 − 0.38 * T$_i$) | | 0.0252 | 0.0285 | 0.0111 | 0.0150 | 0.0178 | −0.0060 | −9.400E-04 | −0.0340 |

| Exemplary Glass | | 25 | 26 | 27 | 28 | 29 | 30 | 31 | 32 |
|---|---|---|---|---|---|---|---|---|---|
| Composition-mol. % | | | | | | | | | |
| TiO$_2$ | mol. % | 33.73 | 29.38 | 33.64 | 34.76 | 33.64 | 32.01 | 31.58 | 28.93 |
| B$_2$O$_3$ | mol. % | 17.00 | 17.97 | 16.96 | 17.97 | 16.94 | 17.71 | 17.49 | 17.24 |
| La$_2$O$_3$ | mol. % | 14.21 | 16.55 | 14.35 | 18.63 | 14.35 | 16.14 | 18.38 | 18.30 |
| SiO$_2$ | mol. % | 9.98 | 10.58 | 10.99 | 12.22 | 10.99 | 11.82 | 13.50 | 14.17 |
| Nb$_2$O$_5$ | mol. % | 3.00 | 5.64 | 2.97 | 4.96 | 2.96 | 4.77 | 4.71 | 7.04 |
| ZrO$_2$ | mol. % | 6.99 | 5.76 | 6.99 | 6.26 | 6.99 | 6.21 | 6.09 | 6.09 |
| CaO | mol. % | 14.99 | 9.99 | 9.99 | 0.02 | 9.99 | 11.23 | 8.13 | 8.09 |
| Na$_2$O | mol. % | 0 | 0 | 0 | 0.06 | 0.0194 | 0 | 0 | 0 |
| CeO$_2$ | mol. % | 0.09 | 0.10 | 0.08 | 0.11 | 0.084 | 0.09 | 0.11 | 0.11 |
| Al$_2$O$_3$ | mol. % | 0 | 0 | 0 | 0 | 0 | 0.0075 | 0.01 | 0 | 0.01 |
| Fe$_2$O$_3$ | mol. % | 0.01 | 0.01 | 0.01 | 0 | 0.0075 | 0.01 | 0.01 | 0.01 |
| Ta$_2$O$_5$ | mol. % | 0 | 0 | 0 | 0.01 | 0.0027 | 0.01 | 0 | 0.01 |
| BaO | mol. % | 0 | 3.99 | 3.99 | 0 | 3.99 | 0 | 0 | 0 |
| SrO | mol. % | 0 | 0.03 | 0.03 | 0 | 0.0349 | 0 | 0 | 0 |
| K$_2$O | mol. % | 0 | 0 | 0 | 4.99 | 0 | 0 | 0 | 0 |
| Composition constraints | | | | | | | | | |
| B$_2$O$_3$/SiO$_2$ | mol. % | 1.703 | 1.699 | 1.543 | 1.471 | 1.542 | 1.498 | 1.296 | 1.217 |
| REmOn | mol. % | 14.26 | 16.61 | 14.40 | 18.70 | 14.40 | 16.19 | 18.45 | 18.37 |
| SiO$_2$ + B$_2$O$_3$ | mol. % | 26.99 | 28.56 | 27.96 | 30.21 | 27.94 | 29.54 | 31.00 | 31.43 |
| (SiO$_2$ + B$_2$O$_3$) | mol. % | 26.99 | 28.56 | 27.96 | 30.21 | 27.94 | 29.54 | 31.00 | 31.43 |
| REmOn + TiO$_2$ + Nb$_2$O$_5$ + ZrO$_2$ + Bi$_2$O$_3$ + WO$_3$) | mol. % | 58.00 | 57.41 | 58.01 | 64.71 | 58.01 | 59.20 | 60.85 | 60.45 |
| R$_2$O + RO − BaO | mol. % | 15.00 | 10.03 | 10.02 | 5.074 | 10.05 | 11.23 | 8.134 | 8.095 |
| Measured properties | | | | | | | | | |
| n$_d$ | | 2.000 | | | | 2.002 | | | |
| d$_{RT}$ | g/cm$^3$ | 4.471 | | 4.550 | | | | | |
| T$_i$ | | 0.36589 | 0.38920 | 0.36822 | 0.38524 | 0.36825 | 0.37794 | 0.40261 | 0.40410 |
| Devit Test 2 | | OK | OK | OK | | | OK | OK | OK |
| Devit Test 3 | | OK | OK | OK | OK | | OK | OK | OK |
| n$_d$ − (0.815 + 0.25 * d$_{RT}$) | | 0.0673 | | | | | | | |
| n$_d$ − (0.815 + 0.25 * d$_{RT}$) − (0.16 − 0.38 * T$_i$) | | 0.0463 | | | | | | | |
| Predicted properties | | | | | | | | | |
| P$_n$ [for n$_d$] | | 1.970 | 1.988 | 1.970 | 1.987 | 1.970 | 1.981 | 1.987 | 1.998 |
| P$_d$ [for d$_{RT}$] | g/cm$^3$ | 4.388 | 4.623 | 4.479 | 4.535 | 4.479 | 4.476 | 4.593 | 4.610 |
| n$_d$ − (0.815 + 0.25 * d$_{RT}$) | | 0.0579 | 0.0170 | 0.0347 | 0.0381 | 0.0347 | 0.0470 | 0.0239 | 0.0308 |
| n$_d$ − (0.815 + 0.25 * d$_{RT}$) − (0.16 − 0.38 * T$_i$) | | 0.0369 | 0.0049 | 0.0147 | 0.0245 | 0.0146 | 0.0307 | 0.0170 | 0.0243 |

| Exemplary Glass | | 33 | 34 | 35 | 36 | 37 | 38 | 39 | 40 |
|---|---|---|---|---|---|---|---|---|---|
| Composition-mol. % | | | | | | | | | |
| TiO$_2$ | mol. % | 27.66 | 32.53 | 32.51 | 32.48 | 26.96 | 29.55 | 28.19 | 31.32 |
| B$_2$O$_3$ | mol. % | 18.67 | 17.71 | 17.49 | 17.28 | 37.93 | 36.96 | 36.70 | 36.30 |

TABLE 8-continued

Exemplary Glass Compositions and Properties

| | | | | | | | | | |
|---|---|---|---|---|---|---|---|---|---|
| $La_2O_3$ | mol. % | 14.40 | 13.57 | 13.68 | 13.80 | 19.97 | 19.96 | 19.97 | 19.96 |
| $SiO_2$ | mol. % | 10.37 | 9.88 | 9.97 | 10.05 | 0 | 0.02 | 0.02 | 0.02 |
| $Nb_2O_5$ | mol. % | 8.73 | 4.85 | 4.85 | 4.85 | 9.99 | 8.03 | 8.43 | 6.70 |
| $ZrO_2$ | mol. % | 6.06 | 6.35 | 6.35 | 6.35 | 4.99 | 5.32 | 6.54 | 5.54 |
| CaO | mol. % | 2.15 | 11.00 | 7.85 | 4.56 | 0.03 | 0.03 | 0.03 | 0.03 |
| $Na_2O$ | mol. % | 0.02 | 0 | 0 | 0.02 | 0 | 0 | 0 | 0 |
| $CeO_2$ | mol. % | 0.09 | 0.08 | 0.08 | 0.08 | 0.12 | 0.12 | 0.12 | 0.12 |
| $Fe_2O_3$ | mol. % | 0 | 0.01 | 0.01 | 0.01 | 0 | 0 | 0 | 0 |
| $Ta_2O_5$ | mol. % | 0.01 | 0.01 | 0.01 | 0.01 | 0.01 | 0.01 | 0.01 | 0.01 |
| BaO | mol. % | 11.76 | 3.98 | 7.14 | 10.42 | 0 | 0 | 0 | 0 |
| SrO | mol. % | 0.09 | 0.04 | 0.06 | 0.09 | 0 | 0 | 0 | 0 |
| Composition constraints | | | | | | | | | |
| $B_2O_3/SiO_2$ | mol. % | 1.800 | 1.792 | 1.754 | 1.719 | 0 | 1848 | 1835 | 1815 |
| REmOn | mol. % | 14.45 | 13.61 | 13.73 | 13.84 | 20.05 | 20.04 | 20.04 | 20.03 |
| $SiO_2 + B_2O_3$ | mol. % | 29.05 | 27.60 | 27.47 | 27.34 | 37.95 | 37.00 | 36.74 | 36.34 |
| $(SiO_2 + B_2O_3)$ | mol. % | 29.05 | 27.60 | 27.47 | 27.34 | 37.95 | 37.00 | 36.74 | 36.34 |
| REmOn + $TiO_2$ + $Nb_2O_5$ + $ZrO_2$ + $Bi_2O_3$ + $WO_3$) | mol. % | 56.92 | 57.36 | 57.45 | 57.55 | 62.01 | 62.96 | 63.22 | 63.62 |
| $R_2O$ + RO − BaO | mol. % | 2.261 | 11.04 | 7.914 | 4.673 | 0.03001 | 0.03001 | 0.03001 | 0.03003 |
| Measured properties | | | | | | | | | |
| $T_i$ | | 0.35977 | 0.34756 | 0.34902 | 0.35048 | 0.40325 | 0.40221 | 0.41989 | 0.40153 |
| Devit Test 2 | | | OK | OK | OK | OK | OK | OK | OK |
| Devit Test 3 | | OK | OK | OK | OK | OK | OK | OK | OK |
| Predicted properties | | | | | | | | | |
| $P_n$ [for $n_d$] | | 2.002 | 1.978 | 1.981 | 1.985 | 1.993 | 1.988 | 1.991 | 1.985 |
| $P_d$ [for $d_{RT}$] | g/cm³ | 4.704 | 4.444 | 4.531 | 4.621 | 4.580 | 4.577 | 4.607 | 4.576 |
| $n_d - (0.815 + 0.25 * d_{RT})$ | | 0.0107 | 0.0519 | 0.0335 | 0.0143 | 0.0331 | 0.0287 | 0.0244 | 0.0258 |
| $n_d - (0.815 + 0.25 * d_{RT}) - (0.16 - 0.38 * T_i)$ | | −0.0126 | 0.0240 | 0.0061 | −0.0125 | 0.0263 | 0.0216 | 0.0240 | 0.0183 |

| Exemplary Glass | | 41 | 42 | 43 | 44 | 45 | 46 | 47 | 48 |
|---|---|---|---|---|---|---|---|---|---|
| Composition-mol. % | | | | | | | | | |
| $TiO_2$ | mol. % | 30.42 | 29.07 | 32.96 | 32.12 | 28.01 | 32.01 | 31.15 | 29.90 |
| $B_2O_3$ | mol. % | 35.95 | 35.81 | 35.69 | 17.95 | 16.90 | 35.18 | 35.18 | 34.98 |
| $La_2O_3$ | mol. % | 19.96 | 19.97 | 19.97 | 20.86 | 21.33 | 19.97 | 19.97 | 19.97 |
| $SiO_2$ | mol. % | 0.02 | 0.02 | 0.02 | 12.43 | 16.54 | 0.02 | 0.02 | 0.02 |
| $Nb_2O_5$ | mol. % | 6.83 | 7.33 | 5.47 | 5.77 | 7.25 | 5.66 | 5.89 | 6.29 |
| $ZrO_2$ | mol. % | 6.66 | 7.64 | 5.74 | 5.65 | 5.93 | 6.81 | 7.65 | 8.68 |
| CaO | mol. % | 0.03 | 0.03 | 0.02 | 0.03 | 3.89 | 0.02 | 0.02 | 0.03 |
| $Na_2O$ | mol. % | 0 | 0 | 0 | 0.07 | 0 | 0 | 0 | 0 |
| $CeO_2$ | mol. % | 0.12 | 0.12 | 0.12 | 0.12 | 0.12 | 0.12 | 0.12 | 0.12 |
| $Al_2O_3$ | mol. % | 0 | 0 | 0 | 0 | 0.01 | 0 | 0 | 0 |
| $Ta_2O_5$ | mol. % | 0.01 | 0.01 | 0.01 | 0.01 | 0.01 | 0.01 | 0.01 | 0.01 |
| $K_2O$ | mol. % | 0 | 0 | 0 | 4.98 | 0 | 0 | 0 | 0 |
| Composition constraints | | | | | | | | | |
| $B_2O_3/SiO_2$ | mol. % | 1797 | 1791 | 1785 | 1.444 | 1.022 | 1769 | 1759 | 1749 |
| REmOn | mol. % | 20.03 | 20.04 | 20.04 | 20.93 | 21.41 | 20.04 | 20.04 | 20.04 |
| $SiO_2 + B_2O_3$ | mol. % | 35.99 | 35.85 | 35.73 | 30.40 | 33.46 | 35.41 | 35.22 | 35.02 |
| $(SiO_2 + B_2O_3)$ | mol. % | 35.99 | 35.85 | 35.73 | 30.40 | 33.46 | 35.41 | 35.22 | 35.02 |
| REmOn + $TiO_2$ + $Nb_2O_5$ + $ZrO_2$ + $Bi_2O_3$ + $WO_3$) | mol. % | 63.97 | 64.11 | 64.24 | 64.51 | 62.62 | 64.56 | 64.75 | 64.94 |
| $R_2O$ + RO − BaO | mol. % | 0.03002 | 0.03001 | 0.02001 | 5.084 | 3.893 | 0.02001 | 0.02001 | 0.03001 |
| Measured properties | | | | | | | | | |
| $T_i$ | | 0.41684 | 0.43126 | 0.40081 | 0.41163 | 0.43602 | 0.41548 | 0.42710 | 0.44186 |
| Devit Test 2 | | OK | OK | OK | | OK | OK | OK | OK |
| Devit Test 3 | | OK | OK | OK | OK | OK | OK | OK | OK |
| Predicted properties | | | | | | | | | |
| $P_n$ [for $n_d$] | | 1.987 | 1.990 | 1.982 | 1.997 | 2.008 | 1.984 | 1.986 | 1.989 |
| $P_d$ [for $d_{RT}$] | g/cm³ | 4.602 | 4.628 | 4.574 | 4.678 | 4.771 | 4.600 | 4.621 | 4.647 |
| $n_d - (0.815 + 0.25 * d_{RT})$ | | 0.0215 | 0.0183 | 0.0230 | 0.0123 | 2.500E−04 | 0.0190 | 0.0161 | 0.0125 |
| $n_d - (0.815 + 0.25 * d_{RT}) - (0.16 - 0.38 * T_i)$ | | 0.0199 | 0.0222 | 0.0153 | 0.0088 | 0.0060 | 0.0169 | 0.0184 | 0.0204 |

TABLE 8-continued

Exemplary Glass Compositions and Properties

| Exemplary Glass | | 49 | 50 | 51 | 52 | 53 | 54 | 55 | 56 |
|---|---|---|---|---|---|---|---|---|---|
| Composition-mol. % | | | | | | | | | |
| $TiO_2$ | mol. % | 34.95 | 33.85 | 33.02 | 32.13 | 30.94 | 10.16 | 8.76 | 7.00 |
| $B_2O_3$ | mol. % | 34.94 | 34.69 | 34.47 | 34.26 | 33.96 | 25.98 | 25.98 | 25.98 |
| $La_2O_3$ | mol. % | 19.97 | 19.97 | 19.97 | 19.97 | 19.97 | 13.76 | 13.68 | 14.14 |
| $SiO_2$ | mol. % | 0.02 | 0.02 | 0.02 | 0.02 | 0.02 | 10.04 | 10.31 | 10.44 |
| $Nb_2O_5$ | mol. % | 3.99 | 4.26 | 4.47 | 4.69 | 4.99 | 7.99 | 9.21 | 10.39 |
| $ZrO_2$ | mol. % | 5.99 | 7.07 | 7.91 | 8.79 | 9.98 | 6.99 | 7.00 | 6.99 |
| CaO | mol. % | 0.02 | 0.02 | 0.02 | 0.02 | 0.02 | 24.97 | 24.97 | 24.96 |
| $CeO_2$ | mol. % | 0.12 | 0.12 | 0.12 | 0.12 | 0.12 | 0.08 | 0.08 | 0.0808 |
| $Fe_2O_3$ | mol. % | 0 | 0 | 0 | 0 | 0 | 0.01 | 0.01 | 0.0079 |
| $Ta_2O_5$ | mol. % | 0 | 0 | 0 | 0 | 0 | 0.01 | 0.01 | 0.0086 |
| Composition constraints | | | | | | | | | |
| $B_2O_3/SiO_2$ | mol. % | 1747 | 1734 | 1723 | 1713 | 1697 | 2.587 | 2.520 | 2.488 |
| REmOn | mol. % | 20.04 | 20.04 | 20.04 | 20.04 | 20.05 | 13.81 | 13.72 | 14.19 |
| $SiO_2 + B_2O_3$ | mol. % | 34.98 | 34.73 | 34.51 | 34.30 | 34.00 | 36.04 | 36.30 | 36.43 |
| $(SiO_2 + B_2O_3)$ | mol. % | 34.98 | 34.73 | 34.51 | 34.30 | 34.00 | 36.04 | 36.30 | 36.43 |
| REmOn + $TiO_2$ + $Nb_2O_5$ + $ZrO_2$ + $Bi_2O_3$ + $WO_3$) | mol. % | 65.00 | 65.25 | 65.47 | 65.68 | 65.98 | 38.96 | 38.70 | 38.58 |
| $R_2O + RO - BaO$ | mol. % | 0.02002 | 0.02001 | 0.02001 | 0.02001 | 0.02002 | 24.98 | 24.98 | 24.97 |
| Measured properties | | | | | | | | | |
| $T_i$ | | 0.40005 | 0.41504 | 0.42657 | 0.43851 | 0.45458 | 0.53336 | 0.53514 | 0.54861 |
| Devit Test 2 | | OK | OK | OK | OK | | OK | OK | |
| Devit Test 3 | | OK | OK | OK | OK | OK | OK | OK | OK |
| Predicted properties | | | | | | | | | |
| $P_n$ [for $n_d$] | | 1.978 | 1.981 | 1.983 | 1.985 | 1.988 | 1.900 | 1.906 | 1.913 |
| $P_d$ [for $d_{RT}$] | g/cm³ | 4.573 | 4.600 | 4.620 | 4.642 | 4.671 | 4.307 | 4.313 | 4.355 |
| $n_d - (0.815 + 0.25 * d_{RT})$ | | 0.0197 | 0.0158 | 0.0127 | 0.0095 | 0.0053 | 0.0086 | 0.0125 | 0.0094 |
| $n_d - (0.815 + 0.25 * d_{RT}) - (0.16 - 0.38 * T_i)$ | | 0.0117 | 0.0135 | 0.0148 | 0.0162 | 0.0180 | 0.0513 | 0.0558 | 0.0579 |

| Exemplary Glass | | 57 | 58 | 59 | 60 | 61 | 62 | 63 | 64 |
|---|---|---|---|---|---|---|---|---|---|
| Composition-mol. % | | | | | | | | | |
| $TiO_2$ | mol. % | 32.54 | 25.81 | 32.44 | 35.97 | 35.96 | 34.25 | 32.53 | 31.12 |
| $B_2O_3$ | mol. % | 17.98 | 17.97 | 17.98 | 17.99 | 17.98 | 16.12 | 17.98 | 17.24 |
| $La_2O_3$ | mol. % | 13.42 | 20.10 | 13.50 | 9.99 | 9.99 | 22.37 | 13.42 | 20.78 |
| $SiO_2$ | mol. % | 9.77 | 10.35 | 10.76 | 10.99 | 9.99 | 17.88 | 9.77 | 15.29 |
| $Nb_2O_5$ | mol. % | 4.85 | 6.52 | 4.87 | 3.99 | 3.99 | 2.16 | 4.85 | 4.64 |
| $ZrO_2$ | mol. % | 6.36 | 5.09 | 6.33 | 7.00 | 6.99 | 6.99 | 6.36 | 5.95 |
| CaO | mol. % | 14.99 | 9.99 | 9.99 | 9.98 | 6.00 | 0.05 | 14.99 | 4.81 |
| $Na_2O$ | mol. % | 0 | 0.02 | 0 | 0 | 5.00 | 0.02 | 0 | 0.02 |
| $CeO_2$ | mol. % | 0.08 | 0.12 | 0.08 | 0.06 | 0.06 | 0.14 | 0.08 | 0.13 |
| $Al_2O_3$ | mol. % | 0 | 0 | 0 | 0 | 0 | 0.01 | 0 | 0.01 |
| $Fe_2O_3$ | mol. % | 0.01 | 0.01 | 0.01 | 0.01 | 0.01 | 0.01 | 0.01 | 0.01 |
| $Ta_2O_5$ | mol. % | 0 | 0 | 0 | 0 | 0 | 0 | 0.01 | 0 |
| BaO | mol. % | 0 | 3.99 | 4.00 | 3.99 | 3.99 | 0 | 0 | 0 |
| SrO | mol. % | 0 | 0.03 | 0.04 | 0.03 | 0.03 | 0 | 0 | 0 |
| PbO | mol. % | 0 | 0 | 0 | 0 | 0.01 | 0 | 0 | 0 |
| Composition constraints | | | | | | | | | |
| $B_2O_3/SiO_2$ | mol. % | 1.840 | 1.736 | 1.671 | 1.637 | 1.800 | 0.9016 | 1.840 | 1.127 |
| REmOn | mol. % | 13.47 | 20.17 | 13.54 | 10.02 | 10.02 | 22.45 | 13.46 | 20.86 |
| $SiO_2 + B_2O_3$ | mol. % | 27.76 | 28.34 | 28.75 | 28.98 | 27.98 | 34.02 | 27.76 | 32.55 |
| $(SiO_2 + B_2O_3)$ | mol. % | 27.76 | 28.34 | 28.75 | 28.98 | 27.98 | 34.02 | 27.76 | 32.55 |
| REmOn + $TiO_2$ + $Nb_2O_5$ + $ZrO_2$ + $Bi_2O_3$ + $WO_3$) | mol. % | 57.23 | 57.61 | 57.20 | 57.00 | 56.98 | 65.89 | 57.22 | 62.60 |
| $R_2O + RO - BaO$ | mol. % | 15.00 | 10.05 | 10.03 | 10.01 | 11.04 | 0.07006 | 14.99 | 4.833 |
| Measured properties | | | | | | | | | |
| $n_d$ | | 1.990 | 2.010 | | | 1.989 | | | |
| $d_{RT}$ | g/cm³ | 4.428 | 4.811 | 4.505 | 4.307 | 4.253 | 4.849 | | |
| $T_i$ | | 0.34585 | 0.43798 | 0.34703 | 0.29831 | 0.29827 | 0.44634 | 0.34594 | 0.42768 |
| Devit Test 2 | | OK | | OK | OK | | | OK | OK |
| Devit Test 3 | | OK | OK | OK | OK | OK | OK | OK | OK |
| $n_d - (0.815 + 0.25 * d_{RT})$ | | 0.068 | -0.0078 | | | 0.1108 | | | |
| $n_d - (0.815 + 0.25 * d_{RT}) - (0.16 - 0.38 * T_i)$ | | 0.0395 | -0.0013 | | | 0.0641 | | | |

TABLE 8-continued

Exemplary Glass Compositions and Properties

Predicted properties

| | | | | | | | | |
|---|---|---|---|---|---|---|---|---|
| $P_n$ [for $n_d$] | | 1.974 | 2.004 | 1.973 | 1.957 | 1.950 | 1.989 | 1.974 | 1.994 |
| $P_d$ [for $d_{RT}$] | g/cm³ | 4.334 | 4.857 | 4.421 | 4.190 | 4.172 | 4.783 | 4.334 | 4.718 |
| $n_d - (0.815 + 0.25 * d_{RT})$ | | 0.0751 | −0.0250 | 0.0529 | 0.0944 | 0.0916 | −0.0220 | 0.0751 | −8.600E−04 |
| $n_d - (0.815 + 0.25 * d_{RT}) - (0.16 - 0.38 * T_i)$ | | 0.0466 | −0.0186 | 0.0248 | 0.0478 | 0.0449 | −0.0124 | 0.0466 | 0.0017 |

| Exemplary Glass | | 65 | 66 | 67 | 68 | 69 | 70 | 71 | 72 |
|---|---|---|---|---|---|---|---|---|---|

Composition-mol. %

| | | | | | | | | | |
|---|---|---|---|---|---|---|---|---|---|
| $TiO_2$ | mol. % | 12.87 | 12.88 | 12.88 | 12.87 | 8.56 | 22.83 | 8.98 | 9.58 |
| $B_2O_3$ | mol. % | 25.54 | 25.54 | 25.55 | 25.54 | 21.49 | 20.71 | 21.00 | 20.88 |
| $La_2O_3$ | mol. % | 9.08 | 9.08 | 9.08 | 9.08 | 5.00 | 5.00 | 9.86 | 5.22 |
| $SiO_2$ | mol. % | 13.62 | 13.63 | 13.63 | 13.63 | 19.95 | 17.42 | 17.55 | 18.56 |
| $Nb_2O_5$ | mol. % | 7.28 | 7.28 | 7.29 | 7.29 | 11.48 | 8.71 | 9.47 | 9.49 |
| $ZrO_2$ | mol. % | 7.23 | 7.24 | 7.24 | 7.24 | 10.46 | 2.29 | 10.07 | 7.88 |
| CaO | mol. % | 12.07 | 12.08 | 12.08 | 9.07 | 6.00 | 5.99 | 5.99 | 5.99 |
| $Na_2O$ | mol. % | 0.0386 | 0.0362 | 0 | 0 | 3.00 | 3.00 | 3.00 | 3.00 |
| $CeO_2$ | mol. % | 0.0556 | 0.0521 | 0.0539 | 0.0553 | 0.03 | 0.03 | 0.06 | 0.03 |
| $Al_2O_3$ | mol. % | 0.0235 | 0.022 | 0.0228 | 0.0233 | 0.01 | 0.01 | 0.01 | 0.01 |
| $Fe_2O_3$ | mol. % | 0 | 0 | 0.0073 | 0.0074 | 0.01 | 0.01 | 0.01 | 0.01 |
| $Ta_2O_5$ | mol. % | 0.0027 | 0.0025 | 0.0026 | 0.0027 | 0 | 0 | 0 | 0 |
| BaO | mol. % | 12.07 | 6.04 | 9.08 | 12.08 | 4.00 | 4.00 | 3.99 | 4.00 |
| SrO | mol. % | 0.0924 | 0.0433 | 0.0672 | 0.0918 | 3.99 | 4.00 | 4.00 | 4.00 |
| $K_2O$ | mol. % | 0 | 0 | 0 | 0 | 2.00 | 2.00 | 2.00 | 2.00 |
| MgO | mol. % | 0.0297 | 0.0278 | 0.0288 | 0.0295 | 0 | 0 | 0 | 0 |
| $Li_2O$ | mol. % | 0 | 6.04 | 2.99 | 2.98 | 4.02 | 4.00 | 4.00 | 4.01 |
| $WO_3$ | mol. % | 0 | 0 | 0 | 0 | 0 | 0 | 0 | 5.33 |

Composition constraints

| | | | | | | | | | |
|---|---|---|---|---|---|---|---|---|---|
| $B_2O_3/SiO_2$ | mol. % | 1.875 | 1.874 | 1.875 | 1.874 | 1.077 | 1.189 | 1.197 | 1.125 |
| REmOn | mol. % | 9.107 | 9.112 | 9.113 | 9.112 | 5.017 | 5.016 | 9.895 | 5.235 |
| $SiO_2 + B_2O_3$ | mol. % | 39.17 | 39.18 | 39.19 | 39.19 | 41.45 | 38.14 | 38.56 | 39.45 |
| $(SiO_2 + B_2O_3)$ | mol. % | 39.17 | 39.18 | 39.19 | 39.19 | 41.45 | 38.14 | 38.56 | 39.45 |
| REmOn + $TiO_2$ + $Nb_2O_5$ + $ZrO_2$ + $Bi_2O_3$ + $WO_3$) | mol. % | 36.50 | 36.52 | 36.52 | 36.51 | 35.52 | 38.85 | 38.43 | 37.52 |
| $R_2O + RO - BaO$ | mol. % | 12.24 | 18.24 | 15.17 | 12.18 | 19.01 | 18.99 | 19.00 | 19.00 |

Measured properties

| | | | | | | | | | |
|---|---|---|---|---|---|---|---|---|---|
| $d_{RT}$ | g/cm³ | 4.296 | 4.144 | 4.229 | 4.301 | | | 4.184 | 4.102 |
| $T_i$ | | 0.44737 | 0.44735 | 0.44734 | 0.44734 | 0.43531 | 0.18758 | 0.51922 | 0.40720 |
| Devit Test 3 | | | | | | OK | OK | OK | OK |

Predicted properties

| | | | | | | | | | |
|---|---|---|---|---|---|---|---|---|---|
| $P_n$ [for $n_d$] | | 1.873 | 1.863 | 1.868 | 1.870 | 1.853 | 1.865 | 1.873 | 1.861 |
| $P_d$ [for $d_{RT}$] | | 4.249 | 4.062 | 4.157 | 4.230 | 3.797 | 3.664 | 4.125 | 4.036 |
| $n_d - (0.815 + 0.25 * d_{RT})$ | | −0.0042 | 0.0321 | 0.0138 | −0.0025 | 0.0882 | 0.1338 | 0.0272 | 0.0375 |
| $n_d - (0.815 + 0.25 * d_{RT}) - (0.16 - 0.38 * T_i)$ | | 0.0058 | 0.0421 | 0.0237 | 0.0075 | 0.0937 | 0.0452 | 0.0645 | 0.0322 |

| Exemplary Glass | | 73 | 74 | 75 | 76 | 77 | 78 | 79 | 80 |
|---|---|---|---|---|---|---|---|---|---|

Composition-mol. %

| | | | | | | | | | |
|---|---|---|---|---|---|---|---|---|---|
| $TiO_2$ | mol. % | 6.99 | 6.99 | 7.00 | 13.33 | 15.76 | 13.92 | 11.92 | 15.35 |
| $B_2O_3$ | mol. % | 20.84 | 19.43 | 20.79 | 19.98 | 19.98 | 19.98 | 19.99 | 29.98 |
| $La_2O_3$ | mol. % | 10.68 | 10.87 | 5.81 | 7.68 | 6.72 | 8.16 | 9.72 | 7.04 |
| $SiO_2$ | mol. % | 18.18 | 16.72 | 19.33 | 17.77 | 18.10 | 16.97 | 15.76 | 7.87 |
| $Nb_2O_5$ | mol. % | 10.66 | 12.99 | 11.19 | 7.17 | 7.25 | 7.18 | 7.11 | 7.24 |
| $ZrO_2$ | mol. % | 9.57 | 3.09 | 7.64 | 9.59 | 7.65 | 8.01 | 8.41 | 7.73 |
| CaO | mol. % | 6.00 | 6.01 | 5.99 | 5.99 | 5.99 | 6.01 | 6.00 | 6.01 |
| $Na_2O$ | mol. % | 3.00 | 2.99 | 2.99 | 2.99 | 3.00 | 3.01 | 2.99 | 3.01 |
| $CeO_2$ | mol. % | 0.07 | 0.06 | 0.04 | 0.05 | 0.04 | 0.05 | 0.06 | 0.04 |
| $Al_2O_3$ | mol. % | 0.01 | 0.01 | 0.01 | 0.01 | 0.01 | 0.01 | 0.01 | 0 |
| $Fe_2O_3$ | mol. % | 0.01 | 0.01 | 0.01 | 0.01 | 0.01 | 0.01 | 0.01 | 0.01 |
| BaO | mol. % | 3.99 | 4.00 | 4.00 | 4.00 | 4.00 | 4.00 | 4.00 | 4.00 |
| SrO | mol. % | 3.99 | 3.99 | 4.00 | 4.00 | 3.99 | 4.00 | 4.00 | 4.00 |
| $K_2O$ | mol. % | 2.00 | 2.00 | 2.00 | 1.99 | 2.00 | 2.00 | 1.99 | 2.00 |
| $Li_2O$ | mol. % | 4.01 | 4.00 | 3.99 | 4.01 | 4.02 | 3.99 | 4.00 | 3.98 |
| $WO_3$ | mol. % | 0 | 6.83 | 5.22 | 1.43 | 1.48 | 2.71 | 4.04 | 1.75 |

Composition constraints

| | | | | | | | | | |
|---|---|---|---|---|---|---|---|---|---|
| $B_2O_3/SiO_2$ | mol. % | 1.146 | 1.162 | 1.076 | 1.125 | 1.104 | 1.178 | 1.269 | 3.811 |
| REmOn | mol. % | 10.72 | 10.91 | 5.832 | 7.706 | 6.740 | 8.186 | 9.752 | 7.059 |
| $SiO_2 + B_2O_3$ | mol. % | 39.03 | 36.17 | 40.12 | 37.76 | 38.09 | 36.96 | 35.76 | 37.86 |

TABLE 8-continued

Exemplary Glass Compositions and Properties

| | | | | | | | | | |
|---|---|---|---|---|---|---|---|---|---|
| (SiO$_2$ + B$_2$O$_3$) | mol. % | 39.03 | 36.17 | 40.12 | 37.76 | 38.09 | 36.96 | 35.76 | 37.86 |
| REmOn + TiO$_2$ + Nb$_2$O$_5$ +ZrO$_2$ + Bi$_2$O$_3$ + WO$_3$) | mol. % | 37.95 | 40.82 | 36.88 | 39.24 | 38.89 | 40.01 | 41.24 | 39.13 |
| R$_2$O + RO − BaO | mol. % | 19.01 | 19.00 | 18.97 | 18.98 | 19.00 | 19.01 | 18.98 | 19.00 |

Measured properties

| | | | | | | | | | |
|---|---|---|---|---|---|---|---|---|---|
| d$_{RT}$ | g/cm$^3$ | 4.180 | 4.426 | 4.095 | 4.124 | | | 4.331 | 3.926 |
| T$_i$ | | 0.53432 | 0.41145 | 0.42502 | 0.45733 | 0.38441 | 0.43378 | 0.48787 | 0.39515 |
| Devit Test 3 | | OK | OK | OK | OK | OK | OK | OK | OK |

Predicted properties

| | | | | | | | | | |
|---|---|---|---|---|---|---|---|---|---|
| P$_n$ [for n$_d$] | | 1.880 | 1.925 | 1.869 | 1.861 | 1.859 | 1.870 | 1.883 | 1.856 |
| P$_d$ [for d$_{RT}$] | g/cm$^3$ | 4.178 | 4.483 | 4.076 | 4.030 | 3.932 | 4.108 | 4.299 | 3.948 |
| n$_d$ − (0.815 + 0.25 * d$_{RT}$) | | 0.0205 | −0.0105 | 0.0350 | 0.0388 | 0.0606 | 0.0283 | −0.0067 | 0.0539 |
| n$_d$ − (0.815 + 0.25 * d$_{RT}$) − (0.16 − 0.38 * T$_i$) | | 0.0636 | −0.0142 | 0.0365 | 0.0525 | 0.0467 | 0.0331 | 0.0187 | 0.0441 |

| Exemplary Glass | | 81 | 82 | 83 | 84 | 85 | 86 | 87 | 88 |
|---|---|---|---|---|---|---|---|---|---|

Composition-mol. %

| | | | | | | | | | |
|---|---|---|---|---|---|---|---|---|---|
| TiO$_2$ | mol. % | 13.45 | 11.54 | 20.00 | 21.97 | 21.98 | 35.97 | 29.23 | 32.52 |
| B$_2$O$_3$ | mol. % | 29.99 | 29.98 | 19.99 | 24.97 | 24.98 | 17.99 | 17.95 | 17.97 |
| La$_2$O$_3$ | mol. % | 8.53 | 10.02 | 5.00 | 3.99 | 4.00 | 9.99 | 23.30 | 13.41 |
| SiO$_2$ | mol. % | 6.69 | 5.53 | 16.78 | 12.99 | 12.98 | 9.99 | 12.63 | 9.79 |
| Nb$_2$O$_5$ | mol. % | 7.16 | 7.09 | 7.99 | 7.99 | 7.99 | 4.00 | 6.66 | 4.85 |
| ZrO$_2$ | mol. % | 8.11 | 8.49 | 7.20 | 3.99 | 3.99 | 7.00 | 4.98 | 6.35 |
| CaO | mol. % | 6.01 | 5.99 | 5.99 | 11.98 | 11.98 | 14.99 | 0.05 | 14.99 |
| Na$_2$O | mol. % | 2.99 | 3.00 | 3.00 | 0 | 0 | 0 | 0.07 | 0.0189 |
| CeO$_2$ | mol. % | 0.05 | 0.06 | 0.03 | 0.0249 | 0.0243 | 0.06 | 0.14 | 0.0818 |
| Al$_2$O$_3$ | mol. % | 0 | 0 | 0.01 | 0.0105 | 0.0103 | 0 | 0 | 0 |
| Fe$_2$O$_3$ | mol. % | 0.01 | 0.01 | 0.01 | 0.0067 | 0.0066 | 0.01 | 0 | 0.0074 |
| Ta$_2$O$_5$ | mol. % | 0 | 0 | 0 | 0.0024 | 0.0024 | 0 | 0.01 | 0.0053 |
| BaO | mol. % | 4.00 | 4.00 | 4.00 | 11.98 | 8.53 | 0 | 0 | 0 |
| SrO | mol. % | 4.00 | 4.00 | 3.99 | 0.0931 | 0.0707 | 0 | 0 | 0 |
| K$_2$O | mol. % | 1.99 | 2.00 | 2.00 | 0 | 0 | 0 | 4.99 | 0 |
| Li$_2$O | mol. % | 3.99 | 3.99 | 4.01 | 0 | 0 | 0 | 0 | 0 |
| WO$_3$ | mol. % | 3.03 | 4.30 | 0 | 0 | 0 | 0 | 0 | 0 |
| ZnO | mol. % | 0 | 0 | 0 | 0 | 3.46 | 0 | 0 | 0 |

Composition constraints

| | | | | | | | | | |
|---|---|---|---|---|---|---|---|---|---|
| B$_2$O$_3$/SiO$_2$ | mol. % | 4.483 | 5.422 | 1.191 | 1.923 | 1.924 | 1.801 | 1.421 | 1.836 |
| REmOn | mol. % | 8.556 | 10.05 | 5.015 | 4.007 | 4.010 | 10.02 | 23.38 | 13.46 |
| SiO$_2$ + B$_2$O$_3$ | mol. % | 36.69 | 35.52 | 36.78 | 37.96 | 37.96 | 27.99 | 30.60 | 27.77 |
| ZnO + Y$_2$O$_3$ | mol. % | 0 | 0 | 0 | 0 | 3.460 | 0 | 0 | 0 |
| (SiO$_2$ + B$_2$O$_3$) | mol. % | 36.69 | 35.52 | 36.78 | 37.96 | 37.96 | 27.99 | 30.60 | 27.77 |
| REmOn + TiO$_2$ + Nb$_2$O$_5$ +ZrO$_2$ + Bi$_2$O$_3$ + WO$_3$) | mol. % | 40.32 | 41.48 | 40.21 | 37.96 | 37.98 | 57.01 | 64.28 | 57.20 |
| R$_2$O + RO − BaO | mol. % | 18.99 | 18.99 | 19.00 | 12.08 | 15.52 | 14.99 | 5.114 | 15.01 |

Measured properties

| | | | | | | | | | |
|---|---|---|---|---|---|---|---|---|---|
| n$_d$ | | | | | | | | | 2.0086 |
| d$_{RT}$ | g/cm$^3$ | 4.095 | 4.224 | | | | | | |
| T$_i$ | | 0.44677 | 0.49827 | 0.30362 | 0.21050 | 0.21049 | 0.29830 | 0.44076 | 0.34594 |
| Devit Test 3 | | OK | OK | OK | | OK | OK | | |

Predicted properties

| | | | | | | | | | |
|---|---|---|---|---|---|---|---|---|---|
| P$_n$ [for n$_d$] | | 1.868 | 1.880 | 1.866 | 1.875 | 1.876 | 1.957 | 2.008 | 1.974 |
| P$_d$ [for d$_{RT}$] | g/cm$^3$ | 4.131 | 4.313 | 3.763 | 3.880 | 3.830 | 4.107 | 4.834 | 4.333 |
| n$_d$ − (0.815 + 0.25 * d$_{RT}$) | | 0.0203 | −0.0131 | 0.1107 | 0.0905 | 0.1035 | 0.1157 | −0.0158 | 0.0752 |
| n$_d$ − (0.815 + 0.25 * d$_{RT}$) − (0.16 − 0.38 * T$_i$) | | 0.0301 | 0.0163 | 0.0660 | 0.0105 | 0.0234 | 0.0690 | −0.0084 | 0.0466 |

| Exemplary Glass | | 89 | 90 |
|---|---|---|---|

Composition-mol. %

| | | | |
|---|---|---|---|
| TiO$_2$ | mol. % | 32.45 | 32.53 |
| B$_2$O$_3$ | mol. % | 17.98 | 17.98 |
| La$_2$O$_3$ | mol. % | 13.49 | 13.42 |
| SiO$_2$ | mol. % | 10.76 | 9.77 |
| Nb$_2$O$_5$ | mol. % | 4.87 | 4.85 |
| ZrO$_2$ | mol. % | 6.33 | 6.36 |

TABLE 8-continued

Exemplary Glass Compositions and Properties

| | | | |
|---|---|---|---|
| CaO | mol. % | 9.99 | 14.99 |
| $Na_2O$ | mol. % | 0.0196 | 0 |
| $CeO_2$ | mol. % | 0.0777 | 0.08 |
| $Fe_2O_3$ | mol. % | 0.0076 | 0.01 |
| $Ta_2O_5$ | mol. % | 0.0055 | 0.01 |
| BaO | mol. % | 3.99 | 0 |
| SrO | mol. % | 0.0352 | 0 |
| Composition constraints | | | |
| $B_2O_3/SiO_2$ | mol. % | 1.671 | 1.840 |
| REmOn | mol. % | 13.53 | 13.46 |
| $SiO_2 + B_2O_3$ | mol. % | 28.75 | 27.76 |
| $(SiO_2 + B_2O_3)$ | mol. % | 28.75 | 27.76 |
| REmOn + $TiO_2$ + $Nb_2O_5$ + $ZrO_2$ + $Bi_2O_3$ + $WO_3$) | mol. % | 57.20 | 57.22 |
| $R_2O$ + RO − BaO | mol. % | 10.05 | 14.99 |
| Measured properties | | | |
| $n_d$ | | 2.0012 | |
| $T_i$ | | 0.34683 | 0.34594 |
| Devit Test 2 | | | OK |
| Devit Test 3 | | | OK |
| Predicted properties | | | |
| $P_n$ [for $n_d$] | | 1.973 | 1.974 |
| $P_d$ [for $d_{RT}$] | g/cm³ | 4.420 | 4.334 |
| $n_d$ − (0.815 + 0.25 * $d_{RT}$) | | 0.0531 | 0.0751 |
| $n_d$ − (0.815 + 0.25 * $d_{RT}$) − (0.16 − 0.38 * $T_i$) | | 0.0249 | 0.0466 |

Table 9 below lists the glass compositions and properties for Comparative Glasses 1-25.

TABLE 9

Comparative Glass Compositions and Properties

| | | Comparative Examples | | | | | | | |
|---|---|---|---|---|---|---|---|---|---|
| Reference | | C1 [1] | C2 [5] | C3 [4] | C4 [2] | C5 [6] | C6 [6] | C7 [6] | C8 [6] |
| Composition-mol. % | | | | | | | | | |
| $La_2O_3$ | mol. % | 14.04 | 15.90 | 14.96 | 21.38 | 14.22 | 14.09 | 14.09 | 14.09 |
| $TiO_2$ | mol. % | 34.72 | 13.26 | 17.68 | 31.71 | 23.02 | 19.96 | 19.95 | 19.95 |
| BaO | mol. % | 14.47 | 0 | 14.28 | 0 | 9.73 | 6.92 | 6.92 | 6.92 |
| $B_2O_3$ | mol. % | 23.90 | 32.12 | 24.35 | 36.38 | 23.83 | 23.97 | 23.99 | 23.98 |
| $Nb_2O_5$ | mol. % | 4.17 | 4.43 | 10.58 | 0 | 2.55 | 2.56 | 2.56 | 2.55 |
| $ZrO_2$ | mol. % | 5.63 | 4.78 | 0 | 0 | 5.85 | 7.26 | 7.26 | 7.26 |
| $Ta_2O_5$ | mol. % | 0.63 | 0 | 0 | 0 | 0 | 0 | 0 | 0 |
| $WO_3$ | mol. % | 1.20 | 0 | 0 | 0 | 0 | 0 | 0 | 0 |
| PbO | mol. % | 1.24 | 0 | 0 | 0 | 0 | 0 | 0 | 0 |
| $SiO_2$ | mol. % | 0 | 7.84 | 15.52 | 10.54 | 13.99 | 14.00 | 13.99 | 13.99 |
| MgO | mol. % | 0 | 11.69 | 0 | 0 | 0 | 0 | 0 | 0 |
| CaO | mol. % | 0 | 8.40 | 0 | 0 | 5.63 | 7.04 | 0 | 3.56 |
| ZnO | mol. % | 0 | 1.45 | 0 | 0 | 1.19 | 4.21 | 4.22 | 4.22 |
| $Sb_2O_3$ | mol. % | 0 | 0.12 | 0 | 0 | 0 | 0 | 0 | 0 |
| $K_2O$ | mol. % | 0 | 0 | 1.50 | 0 | 0 | 0 | 0 | 0 |
| $Na_2O$ | mol. % | 0 | 0 | 1.14 | 0 | 0 | 0 | 0 | 0 |
| SrO | mol. % | 0 | 0 | 0 | 0 | 0 | 0 | 7.03 | 3.47 |
| Measured properties | | | | | | | | | |
| $n_d$ | | 2.0183 | 1.8774 | 1.920 | 1.9336 | 1.9269 | 1.9049 | 1.9027 | 1.9038 |
| $d_{RT}$ | g/cm³ | | 4.310 | | | 4.520 | 4.490 | 4.570 | 4.530 |
| $T_i$ | | 0.33590 | 0.53887 | 0.34611 | 0.40271 | 0.43967 | 0.48675 | 0.48678 | 0.48681 |
| Predicted properties | | | | | | | | | |
| $P_n$ [for $n_d$] | | 2.006 | 1.868 | 1.928 | 1.882 | 1.895 | 1.887 | 1.886 | 1.887 |
| $P_d$ [for $d_{RT}$] | g/cm³ | 4.871 | 4.336 | 4.539 | 4.354 | 4.461 | 4.442 | 4.459 | 4.451 |

TABLE 9-continued

Comparative Glass Compositions and Properties

| | | Comparative Examples | | | | | | | |
|---|---|---|---|---|---|---|---|---|---|
| Reference | | C9 [8] | C10 [8] | C11 [9] | C12 [10] | C13 [10] | C14 [10] | C15 [3] | C16 [6] |
| Composition-mol. % | | | | | | | | | |
| $La_2O_3$ | mol. % | 21.00 | 20.30 | 13.89 | 12.34 | 12.20 | 12.04 | 22.36 | 14.23 |
| $TiO_2$ | mol. % | 5.49 | 8.61 | 19.67 | 33.52 | 34.14 | 34.54 | 11.04 | 19.95 |
| BaO | mol. % | 0 | 0 | 8.20 | 9.84 | 11.07 | 8.82 | 0 | 8.33 |
| $B_2O_3$ | mol. % | 32.21 | 31.15 | 23.68 | 15.35 | 16.81 | 15.54 | 32.64 | 23.83 |
| $Nb_2O_5$ | mol. % | 16.29 | 15.76 | 3.90 | 3.83 | 5.03 | 7.53 | 8.42 | 2.55 |
| $ZrO_2$ | mol. % | 10.98 | 10.62 | 7.16 | 7.45 | 5.85 | 5.49 | 8.59 | 5.86 |
| $Ta_2O_5$ | mol. % | 0.82 | 0.79 | 0 | 0 | 0 | 0 | 0 | 0 |
| $WO_3$ | mol. % | 7.61 | 7.36 | 0 | 0.33 | 0.28 | 1.17 | 0 | 0 |
| $SiO_2$ | mol. % | 5.53 | 5.35 | 13.79 | 13.60 | 11.78 | 7.88 | 13.27 | 13.99 |
| CaO | mol. % | 0 | 0 | 3.52 | 0 | 0 | 0 | 0 | 7.04 |
| ZnO | mol. % | 0 | 0 | 4.16 | 2.16 | 1.90 | 3.82 | 0 | 4.22 |
| $Sb_2O_3$ | mol. % | 0.0607 | 0.0596 | 0 | 0 | 0 | 0 | 0 | 0 |
| SrO | mol. % | 0 | 0 | 2.04 | 0.97 | 0 | 1.70 | 0 | 0 |
| $Gd_2O_3$ | mol. % | 0 | 0 | 0 | 0.35 | 0.43 | 0.52 | 2.15 | 0 |
| $Y_2O_3$ | mol. % | 0 | 0 | 0 | 0.28 | 0.28 | 0.36 | 0 | 0 |
| $Yb_2O_3$ | mol. % | 0 | 0 | 0 | 0 | 0.23 | 0.58 | 0 | 0 |
| Measured properties | | | | | | | | | |
| $n_d$ | | 1.9973 | 2.0078 | 1.9038 | 2.0137 | 2.0246 | 2.0302 | 1.911 | 1.9006 |
| $d_{RT}$ | g/cm³ | | | 4.540 | 4.720 | 4.710 | 4.700 | 5.000 | 4.490 |
| $T_i$ | | 0.59478 | 0.55933 | 0.47171 | 0.35032 | 0.32044 | 0.30021 | 0.62919 | 0.47164 |
| Predicted properties | | | | | | | | | |
| $P_n$ [for $n_d$] | | 2.037 | 2.041 | 1.900 | 1.973 | 1.985 | 2.032 | 1.938 | 1.886 |
| $P_d$ [for $d_{RT}$] | g/cm³ | 5.225 | 5.172 | 4.485 | 4.571 | 4.601 | 4.746 | 4.880 | 4.467 |

| | | Comparative Examples | | | | | | | |
|---|---|---|---|---|---|---|---|---|---|
| Reference | | C17 [6] | C18 [7] | C19 [9] | C20 [10] | C21 [10] | C22 [10] | C23 [10] | C24 [10] | C25 [11] |
| Composition-mol. % | | | | | | | | | | |
| $La_2O_3$ | mol. % | 14.16 | 13.32 | 14.15 | 11.74 | 12.02 | 12.30 | 12.23 | 11.89 | 25.33 |
| $TiO_2$ | mol. % | 19.94 | 31.97 | 19.94 | 31.40 | 32.15 | 31.88 | 31.48 | 31.59 | 9.77 |
| BaO | mol. % | 7.62 | 12.49 | 7.63 | 11.35 | 12.48 | 11.04 | 12.28 | 12.38 | 1.13 |
| $B_2O_3$ | mol. % | 23.92 | 14.67 | 23.94 | 17.46 | 15.86 | 15.60 | 15.37 | 16.47 | 31.36 |
| $Nb_2O_5$ | mol. % | 2.56 | 3.84 | 2.55 | 4.81 | 4.25 | 4.62 | 4.56 | 4.36 | 4.53 |
| $ZrO_2$ | mol. % | 6.55 | 7.25 | 6.55 | 7.17 | 6.88 | 7.45 | 6.38 | 6.72 | 8.05 |
| $WO_3$ | mol. % | 0 | 0 | 0 | 0.55 | 0 | 0.11 | 0.50 | 0.22 | 0.69 |
| $SiO_2$ | mol. % | 14.00 | 14.88 | 14.00 | 11.07 | 12.61 | 10.97 | 12.23 | 12.51 | 16.67 |
| CaO | mol. % | 7.04 | 0 | 7.04 | 0 | 0 | 0 | 0 | 0 | 0 |
| ZnO | mol. % | 4.21 | 1.57 | 4.21 | 3.77 | 2.68 | 3.34 | 4.28 | 3.13 | 0 |
| $Sb_2O_3$ | mol. % | 0 | 0 | 0 | 0 | 0.0044 | 0 | 0 | 0.0044 | 0.0266 |
| SrO | mol. % | 0 | 0 | 0 | 0 | 0 | 1.75 | 0 | 0 | 0 |
| $Gd_2O_3$ | mol. % | 0 | 0 | 0 | 0.67 | 1.06 | 0.71 | 0.68 | 0.70 | 1.71 |
| $Y_2O_3$ | mol. % | 0 | 0 | 0 | 0 | 0 | 0.23 | 0 | 0 | 0.27 |
| $Al_2O_3$ | mol. % | 0 | 0 | 0 | 0 | 0 | 0 | 0 | 0 | 0.46 |
| Measured properties | | | | | | | | | | |
| $n_d$ | | 1.903 | 2.000 | 1.903 | 2.0067 | 2.0002 | 2.013 | 2.007 | 2.0001 | 1.8974 |
| $d_{RT}$ | g/cm³ | 4.490 | 4.700 | 4.490 | 4.720 | 4.700 | 4.730 | 4.720 | 4.700 | 4.810 |
| $T_i$ | | 0.47933 | 0.36492 | 0.47925 | 0.35094 | 0.35415 | 0.35921 | 0.34863 | 0.34950 | 0.71047 |
| Predicted properties | | | | | | | | | | |
| $P_n$ [for $n_d$] | | 1.887 | 1.969 | 1.887 | 1.976 | 1.975 | 1.986 | 1.980 | 1.970 | 1.907 |
| $P_d$ [for $d_{RT}$] | g/cm³ | 4.454 | 4.634 | 4.453 | 4.625 | 4.656 | 4.677 | 4.687 | 4.624 | 5.009 |

The reference key for each of the Comparative Glasses listed in Table 9 is as follows: [1] JP50018509A (OHARA OPTICAL GLASS MFG); [2] JPS6033229 (MINOLTA CAMERA KK); [3] U.S. Ser. No. 10/287,205B2 (CDGM GLASS CO LTD); [4] US2004220041 (HIKARI GLASS CO., LTD.); [5] U.S. Pat. No. 7,091,145B2 (CARL-ZEISS-STIFTUNG); [6] U.S. Pat. No. 7,598,193B2 (HOYA CORP); [7] U.S. Pat. No. 8,077,406 (HOYA CORP.); [8] U.S. Pat. No. 8,207,075 (OHARA INC.); [9] U.S. Pat. No. 8,661,853B2 (HOYA CO LTD); [10] U.S. Pat. No. 9,169,152B2 (CDGM GLASS CO. LTD); [11] WO2017-110304A1.

Figure 4:
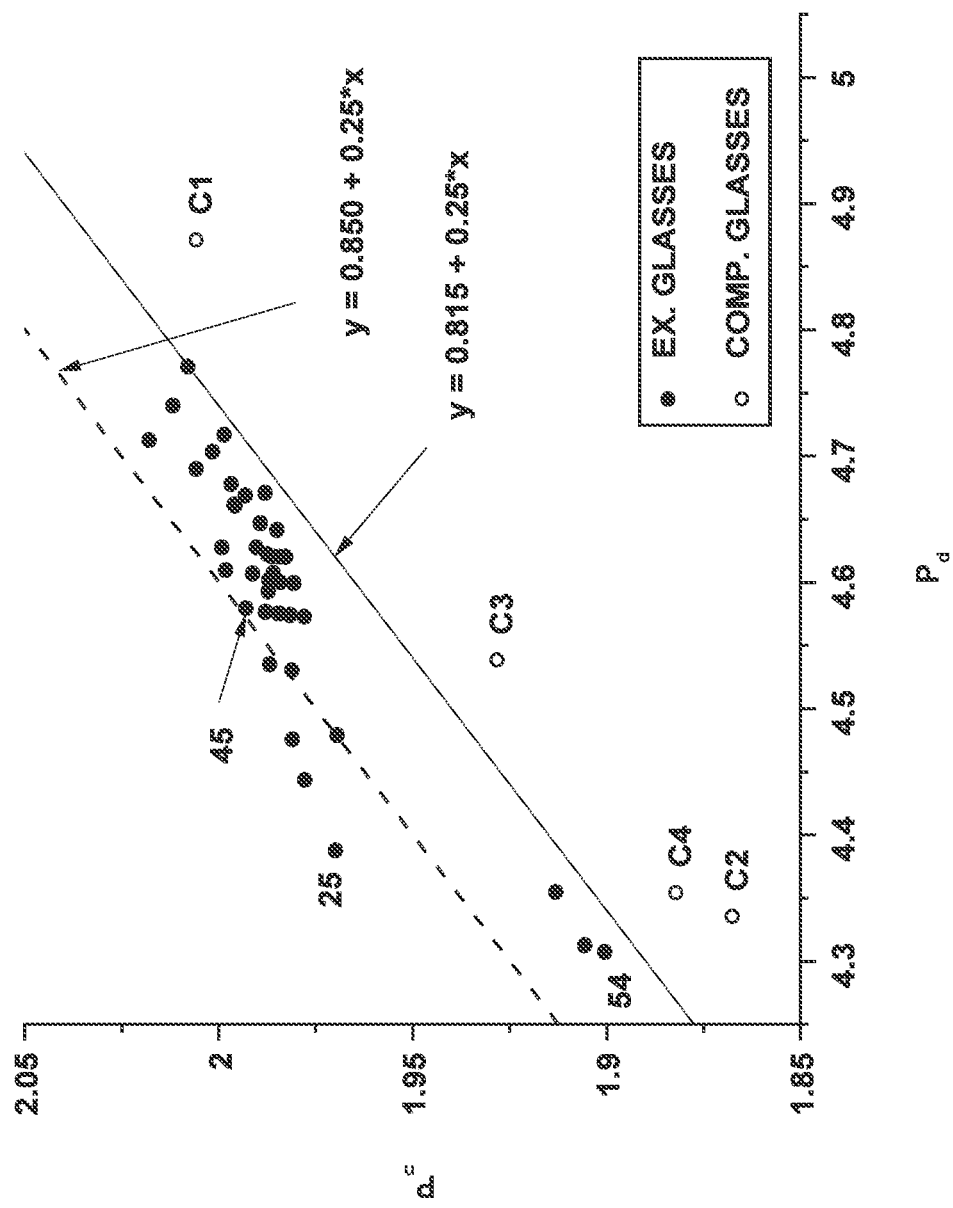
FIG. 4 is a plot illustrating the relationship between the density parameter $P_d$ calculated according to formula (IX) and the refractive index parameter $P_n$ calculated according to formula (VIII) for some comparative glasses and some exemplary glasses according to an embodiment of the present disclosure.

FIG. 4 is a plot showing the relationship between the density parameter $P_d$ and the refractive index $P_n$ for some of the Exemplary Glasses and some of the Comparative Glasses. The said Exemplary Glasses (filled circles) are the Examples 5, 10, 14, 16 to 21 and 25 to 56 from Table 8. The said Comparative Glasses (open circles) are the Examples C1 to C4 from Table 9. The refractive index parameter $P_n$ that predicts the refractive index at 587.56 nm was determined according to Formula (VIII), where chemical formulas listed in the Formula (VIII) refer to the amounts of corresponding components in the glass, expressed in mol %. The density parameter $P_d$ that predicts the density at room temperature was determined according to Formula (IX), where chemical formulas listed in the Formula (IX) refer to the amounts of corresponding components in the glass, expressed in mol %. All of the Exemplary Glasses and Comparative Glasses shown in FIG. 4 have the features specified in Table 10 below. In Table 10, the entry "Not limited", if present, refers to a limitation that was not considered when selecting the compositions. In FIG. 4, some of the above-enumerated compositions may be labeled for better visibility.

TABLE 10

Limitations for Glass Compositions Shown in FIG. 4

| Quantity | Unit | Min | Max |
|---|---|---|---|
| $La_2O_3$ | mol % | 13.5 | Not limited |
| $B_2O_3$ | mol % | 1 | Not limited |
| $TiO_2$ | mol % | 0 | 35 |
| $P_2O_5$ | mol % | 0 | 20 |
| $Nb_2O_5$ | mol % | 0 | 12.5 |
| $GeO_2$ | mol % | 0 | 10 |
| $ThO_2$ | mol % | 0 | 5 |
| $Al_2O_3$ | mol % | 0 | 2.5 |
| $SiO_2 + B_2O_3$ | mol % | 0 | 50 |
| $ZnO + Y_2O_3$ | mol % | 0 | 2.5 |
| $B_2O_3/(B_2O_3 + SiO_2)$ | mol % | 0 | Not limited |

The above-enumerated Comparative Glasses were selected as having the highest refractive index parameter $P_n$ at comparable values of the density parameter $P_d$ among the known glasses that have the features specified in Table 10.

The line corresponding to the formula y=0.815+0.25*x shown in FIG. 4 provides a visual representation of the differences between the Comparative Glasses having the features specified in Table 10 and the Exemplary Glasses 5, 10, 14, 16 to 21 and 25 to 56 according to the present disclosure. As can be seen in FIG. 4, the mentioned Exemplary Glasses (filled circles) and none of the Comparative Glasses (open circles) represented in FIG. 4 fall above the line y=0.815+0.25*x, where y corresponds to the refractive index parameter $P_n$ and x corresponds to the density parameter $P_d$. In other words, some of the Exemplary Glasses and none of the Comparative Glasses represented in FIG. 4 satisfy the following formula (X):

$$P_n - (0.815 + 0.25 * P_d) > 0.000 \qquad (X).$$

As can also be seen in FIG. 4, some of the Exemplary Glasses and none of the Comparative Glasses represented in FIG. 4 fall above the line y=0.850+0.25*x, where y corresponds to the refractive index parameter $P_n$ and x corresponds to the density parameter $P_d$. In other words, the said Exemplary Glasses and none of the Comparative Glasses represented in FIG. 4 satisfy the following formula (XI):

$$P_n - (0.850 + 0.25 * P_d) > 0.000 \qquad (XI).$$

The data shown in FIG. 4 illustrates that, under the conditions specified in Table 10 above, some of the Exemplary Glasses from the present disclosure have higher values of the refractive index parameter $P_n$ at comparable values of the density parameter $P_d$ than the best of the Comparative Glasses satisfying the same conditions. This can be interpreted as these Exemplary Glasses, by prediction, have the highest values of the refractive index $n_d$ at 587.56 nm at comparable values of density at room temperature $d_{RT}$ among the said glasses. In other words, the Exemplary Glasses shown in FIG. 4, by prediction, provide an improvement in the combination of high refractive index $n_d$ and low density at room temperature $d_{RT}$ among the known glasses that have the features specified in Table 10.

Figure 5:
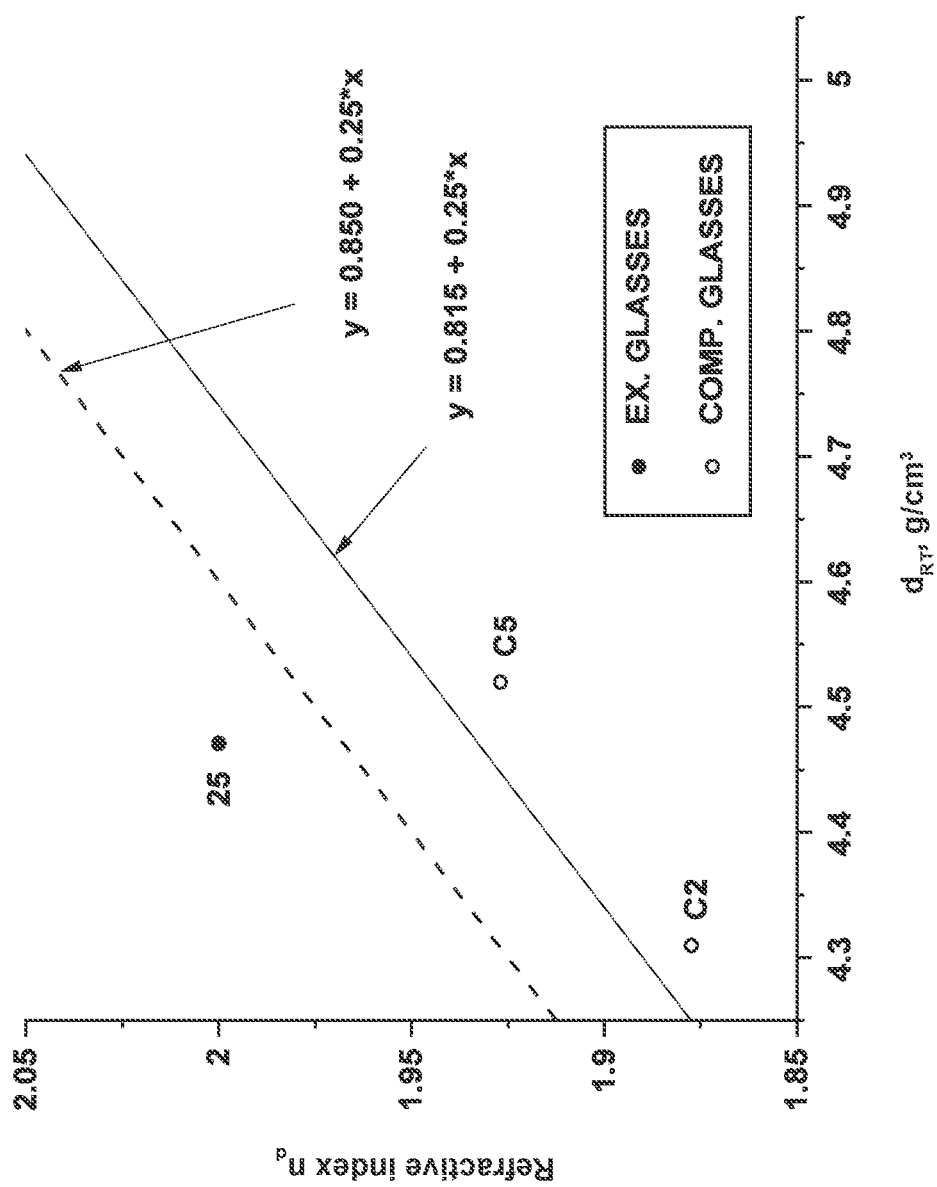
FIG. 5 is a plot illustrating the relationship between the density at room temperature $d_{RT}$ (in g/cm$^3$) and the refractive index $n_d$ (as measured at 587.56 nm) for some comparative glasses and some exemplary glasses according to an embodiment of the present disclosure.

FIG. 5 is a plot showing the relationship between the density at room temperature $d_{RT}$ and the refractive index $n_d$ at 587.56 nm for some of the Exemplary Glasses and some of the Comparative Glasses. The said Exemplary Glasses (filled circles) are the Examples 25 from Table 8. The said Comparative Glasses (open circles) are the Examples C2 and C5 from Table 9. All of the Exemplary Glasses and Comparative Glasses shown in FIG. 5 have the features specified in Table 11. In Table 11, the entry "Not limited", if present, refers to a limitation that was not considered when selecting the compositions. In FIG. 5, some of the above-enumerated compositions may be labeled for better visibility.

TABLE 11

Limitations for Glass Compositions Shown in FIG. 5

| Quantity | Unit | Min | Max |
|---|---|---|---|
| $La_2O_3$ | mol % | 13.5 | Not limited |
| $B_2O_3$ | mol % | 1 | Not limited |
| $TiO_2$ | mol % | 0 | 35 |
| $P_2O_5$ | mol % | 0 | 20 |
| $Nb_2O_5$ | mol % | 0 | 12.5 |
| $GeO_2$ | mol % | 0 | 10 |
| $ThO_2$ | mol % | 0 | 5 |
| $Al_2O_3$ | mol % | 0 | 2.5 |
| $SiO_2 + B_2O_3$ | mol % | 0 | 50 |
| $ZnO + Y_2O_3$ | mol % | 0 | 2.5 |
| $B_2O_3/(B_2O_3 + SiO_2)$ | mol % | 0 | Not limited |

The above-enumerated Comparative Glasses were selected as having the highest measured values of the refractive index $n_d$ at 587.56 nm at comparable values of the density $d_{RT}$, as measured at 25° C. (in g/cm³) among the known glasses that have the mentioned features specified in Table 11.

The line corresponding to the formula y=0.815+0.25*x shown in FIG. 5 provides a visual representation of the differences between the Comparative Glasses having the features specified in Table 11 and the Exemplary Glasses 25 according to the present disclosure. As can be seen in FIG. 5, the mentioned Exemplary Glasses (filled circles) and none of the Comparative Glasses (open circles) represented in FIG. 5 fall above the line y=0.815+0.25*x, where y corresponds to the refractive index $n_d$ and x corresponds to the density $d_{RT}$. In other words, some of the Exemplary Glasses and none of the Comparative Glasses represented in FIG. 5 satisfy the following formula (III):

$$n_d - (0.815 + 0.25 * d_{RT}) > 0.000 \qquad (III).$$

As can also be seen in FIG. 5, some of Exemplary Glasses and none of the Comparative Glasses represented in FIG. 5 fall above the line y=0.850+0.25*x, where y corresponds to the refractive index $n_d$ and x corresponds to the density $d_{RT}$. In other words, the said Exemplary Glasses and none of the Comparative Glasses represented in FIG. 5 satisfy the following formula (IV):

$$n_d - (0.850 + 0.25 * d_{RT}) > 0.000 \qquad (IV)$$

The data shown in FIG. 5 illustrates that, under the conditions specified in Table 11 above, some of the Exemplary Glasses from the present disclosure have higher measured values of the refractive index $n_d$ at 587.56 nm at comparable measured values of the density $d_{RT}$ (as measured at 25° C. in g/cm³) than the best of the Comparative Glasses satisfying the same conditions. This can be interpreted as these Exemplary Glasses, according to measured properties, have the highest values of $n_d$ at comparable values of $d_{RT}$ among the said glasses. In other words, the Exemplary Glasses shown in FIG. 5, by measured properties, provide an improvement in the combination of high refractive index $n_d$ and low density $d_{RT}$ at room temperature among the known glasses that have the features specified in Table 11.

Figure 6:
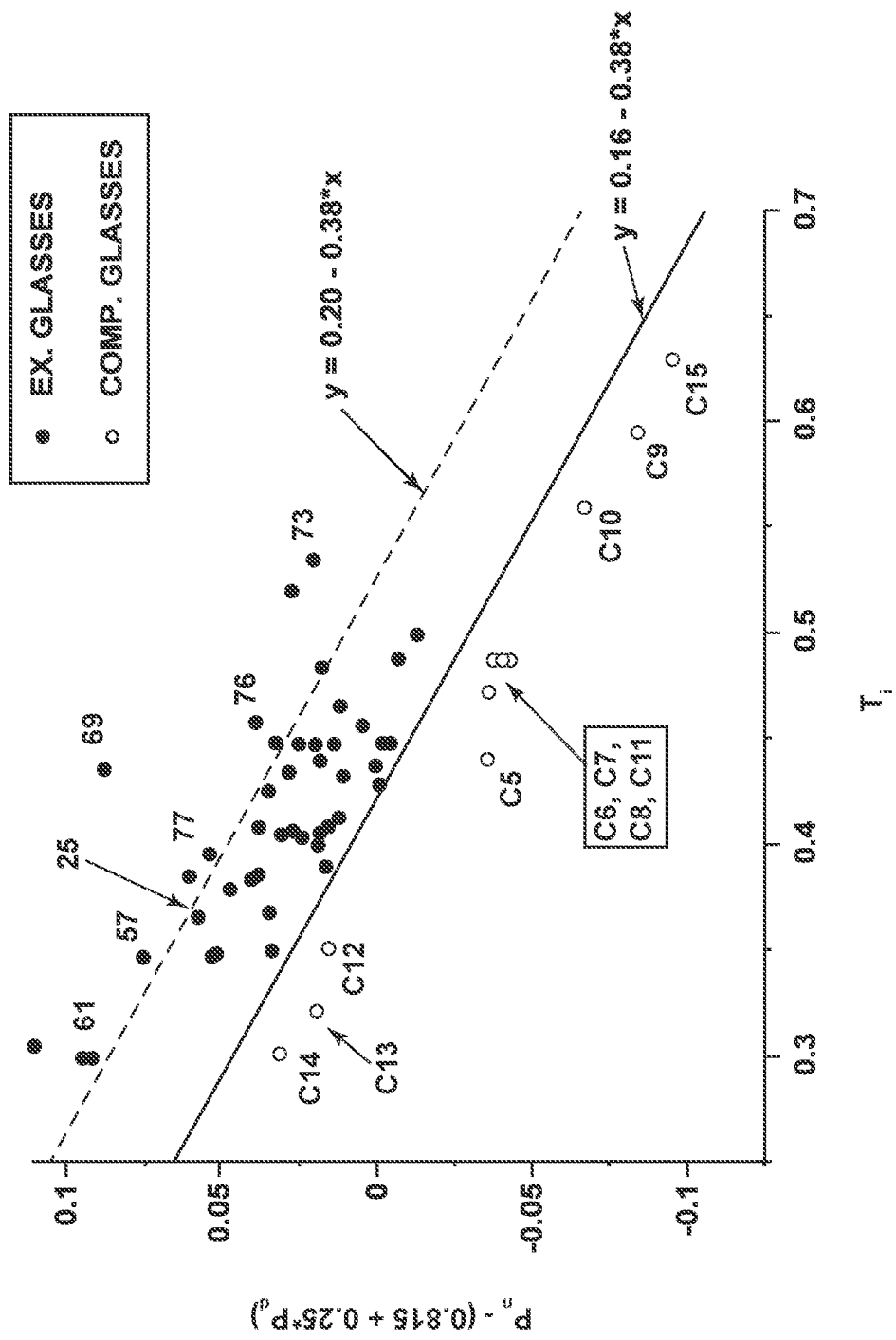
FIG. 6 is a plot illustrating the relationship between the transmittance index $T_i$ calculated according to formula (VI), the refractive index parameter $P_n$ calculated according to formula (VIII), and the density parameter $P_d$ calculated according to formula (IX) for some comparative glasses and some exemplary glasses according to an embodiment of the present disclosure.

The values of all attributes specified in Tables 10 and 11 and Formulas (X), (XI), (III), and (IV) for the Comparative Glasses C1 to C5 plotted in FIGS. 4 and 5 are presented in Table 12 below. Full compositions of the Comparative Glasses are presented in Table 9. Full compositions and above-mentioned attributes of the Exemplary Glasses from the present disclosure are presented in Table 8.

parameter $P_d$ that predicts the density at room temperature was determined according to Formula (IX). The transmittance index $T_i$ was determined according to formula (VI). All of the Exemplary Glasses and Comparative Glasses shown in FIG. 6 have the features specified in Table 13 below. In Table 13, the entry "Not limited", if present, refers to a limitation that was not considered when selecting the compositions. In FIG. 6, some of the above-enumerated compositions may be labeled for better visibility.

TABLE 13

| Limitations for Glass Compositions Shown in FIG. 6 | | | |
|---|---|---|---|
| Quantity | Unit | Min | Max |
| $B_2O_3$ | mol % | 14 | Not limited |
| $SiO_2$ | mol % | 2 | Not limited |

TABLE 12

Attributes of Comparative Glasses Having the Features Specified in Tables 10 and 11

| Ex. # | | C1 | C2 | C3 | C4 | C5 |
|---|---|---|---|---|---|---|
| Composition | | | | | | |
| $B_2O_3$ | mol. % | 23.90 | 32.13 | 24.35 | 36.38 | 23.83 |
| $TiO_2$ | mol. % | 34.72 | 13.27 | 17.68 | 31.71 | 23.02 |
| $P_2O_5$ | mol. % | 0 | 0 | 0 | 0 | 0 |
| $Nb_2O_5$ | mol. % | 4.17 | 4.43 | 10.58 | 0 | 2.55 |
| $GeO_2$ | mol. % | 0 | 0 | 0 | 0 | 0 |
| $ThO_2$ | mol. % | 0 | 0 | 0 | 0 | 0 |
| $Al_2O_3$ | mol. % | 0 | 0 | 0 | 0 | 0 |
| $SiO_2 + B_2O_3$ | mol. % | 23.90 | 39.97 | 39.86 | 46.92 | 37.83 |
| $ZnO + Y_2O_3$ | mol. % | 0 | 1.45 | 0 | 0 | 1.19 |
| $B_2O_3/(B_2O_3 + SiO_2)$ | mol. % | 1.000 | 0.8039 | 0.6108 | 0.7754 | 0.6301 |
| Measured properties | | | | | | |
| $d_{RT}$ | g/cm³ | | 4.310 | | | 4.520 |
| $n_d$ | | 2.0183 | 1.8774 | 1.920 | 1.9336 | 1.9269 |
| $n_d - (0.815 + 0.25 * d_{RT})$ | | | −0.0151 | | | −0.0181 |
| $n_d - (0.850 + 0.25 * d_{RT})$ | | | −0.0501 | | | −0.0531 |
| Predicted properties | | | | | | |
| $P_d$ | g/cm³ | 4.8713 | 4.3356 | 4.5387 | 4.3545 | 6.3408 |
| $P_n$ | | 2.0058 | 1.8676 | 1.9283 | 1.8821 | 2.1021 |
| $P_n - (0.815 + 0.25 * P_d)$ | | −0.0270 | −0.0313 | −0.0214 | −0.0215 | −0.2981 |
| $P_n - (0.850 + 0.25 * P_d)$ | | −0.0620 | −0.0663 | −0.0564 | −0.0565 | −0.3331 |

As follows from FIGS. 4 and 5, both predicted and measured property data confirms that some Exemplary Glasses from the present disclosure have an improved combination of high refractive index $n_d$ at 587.56 nm and low density $d_{RT}$ (as measured at 25° C. in g/cm³) compared to the best of the Comparative Glasses that have the features specified in Tables 10 and 11, accordingly.

FIG. 6 is a plot showing the relationship between the transmittance index $T_i$ and the quantity $P_n-(0.815+0.25*P_d)$ for some of the Exemplary Glasses and some of the Comparative Glasses. The said Exemplary Glasses (filled circles) are the Examples 5, 8 to 10, 12, 14 to 21, 25 to 32, 34, 35, 44, 45, 57, 59 to 61, 63 to 73, 75 to 86 and 88 to 90 from Table 8. The said Comparative Glasses (open circles) are the Examples C6 to C15 from Table 9. The refractive index parameter $P_n$ that predicts the refractive index at 587.56 nm was determined according to Formula (VIII). The density TABLE 13-continued

| Limitations for Glass Compositions Shown in FIG. 6 | | | |
|---|---|---|---|
| Quantity | Unit | Min | Max |
| $Nb_2O_5$ | mol % | 1 | 45 |
| $TiO_2$ | mol % | 0 | 36 |
| $ZrO_2$ | mol % | 0 | 35 |
| $P_2O_5$ | mol % | 0 | 20 |
| CaO | mol % | 0 | 15 |
| MgO | mol % | 0 | 15 |
| $TeO_2$ | mol % | 0 | 10 |
| $Li_2O$ | mol % | 0 | 8 |
| ZnO | mol % | 0 | 5.5 |
| $Ga_2O_3$ | mol % | 0 | 5 |
| $GeO_2$ | mol % | 0 | 3 |
| $MoO_3$ | mol % | 0 | 3 |
| $Ta_2O_5$ | mol % | 0 | 1.5 |

TABLE 13-continued

Limitations for Glass Compositions Shown in FIG. 6

| Quantity | Unit | Min | Max |
|---|---|---|---|
| $Y_2O_3$ | mol % | 0 | 1 |
| $RE_mO_n$ | mol % | 0 | 50 |
| $R_2O$ | mol % | 0 | 18 |
| $RE_mO_n + TiO_2 + Nb_2O_5 + ZrO_2 + Bi_2O_3 + WO_3$ | mol % | 25 | Not limited |
| $SiO_2 + B_2O_3$ | mol % | 3 | 50 |
| $As_2O_3 + Sb_2O_3$ | mol % | 0 | 1 |
| F | at. % | 0 | 0.05 |
| $R_2O + RO - BaO$ | mol % | 0 | 20 |
| $P_n$ | | 1.85 | Not limited |

The above-enumerated Comparative Glasses were selected as having the highest quantity $P_n-(0.815+0.25*P_d)$ at comparable values of the transmittance index $T_i$ among the known glasses that have the features specified in Table 13.

The line corresponding to the formula y=0.16−0.38*x shown in FIG. 6 provides a visual representation of the differences between the Comparative Glasses having the features specified in Table 13 and the Exemplary Glasses 5, 8 to 10, 12, 14 to 21, 25 to 32, 34, 35, 44, 45, 57, 59 to 61, 63 to 73, 75 to 86 and 88 to 90 according to the present disclosure. As can be seen in FIG. 6, the aforementioned Exemplary Glasses (filled circles) and none of the Comparative Glasses (open circles) represented in FIG. 6 fall above the line y=0.16−0.38*x, where y corresponds to the quantity $P_n-(0.815+0.25*P_d)$ and x corresponds to the transmittance index $T_i$. In other words, some of the Exemplary Glasses and none of the Comparative Glasses represented in FIG. 6 satisfy the following formula (XII):

$$P_n-(0.815+0.25*P_d)-(0.16-0.38*T_i) > 0.000 \quad (XII)$$

As can also be seen in FIG. 6, some of Exemplary Glasses and none of the Comparative Glasses represented in FIG. 6 fall above the line y=0.20−0.38*x, where y corresponds to the quantity $P_n-(0.815+0.25*P_d)$ and x corresponds to the transmittance index $T_i$. In other words, the said Exemplary Glasses and none of the Comparative Glasses represented in FIG. 6 satisfy the following formula (XIII):

$$P_n-(0.850+0.25*P_d)-(0.20-0.38*T_i) > 0.000 \quad (XIII)$$

This means that, under the conditions specified in Table 13 above, some of the Exemplary Glasses from the present disclosure have higher values of the quantity $P_n-(0.815+0.25*P_d)$ at comparable values of the transmittance index $T_i$ than the best of the Comparative Glasses satisfying the same conditions. This can be interpreted as these Exemplary Glasses, by prediction, have the highest values of the quantity "$n_d-(0.815+0.25*d_{RT})$" at comparable values of the transmittance index $T_i$ among the said glasses. In other words, the Exemplary Glasses shown in FIG. 6, by prediction, provide an improvement in terms of the combination of the transmittance index $T_i$ and the quantity "$n_d-(0.815+0.25*d_{RT})$" among the known glasses that have the features specified in Table 13.

Figure 7:
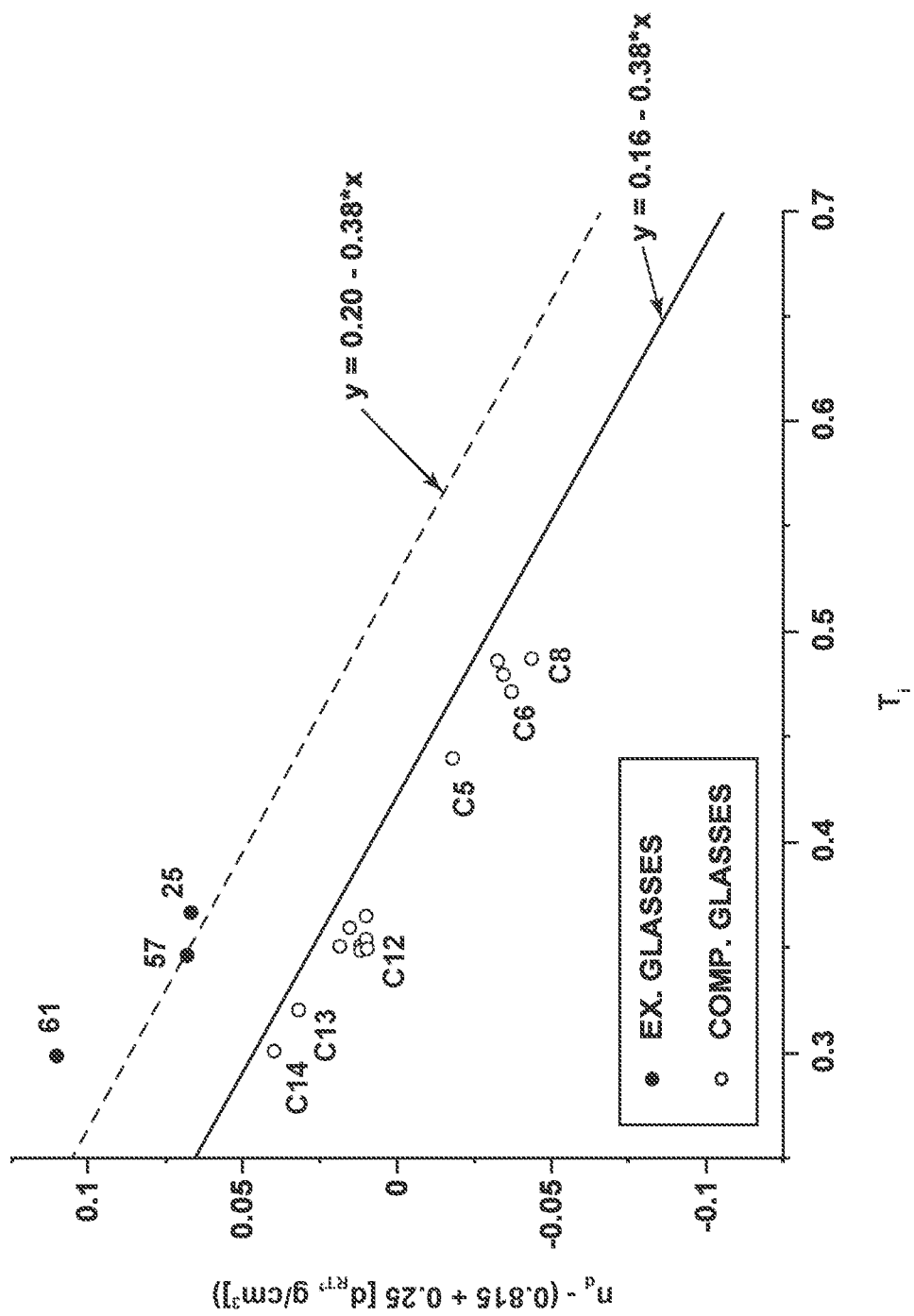
FIG. 7 is a plot illustrating the relationship between the transmittance index $T_i$ calculated according to formula (VI), the refractive index $n_d$ (as measured at 587.56 nm), and the density at room temperature $d_{RT}$ for some comparative

FIG. 7 is a plot showing the relationship between the transmittance index $T_i$ and the quantity "$n_d-(0.815+0.25*d_{RT})$" for some of the Exemplary Glasses and some of the Comparative Glasses. The said Exemplary Glasses (filled circles) are the Examples 25, 57 and 61 from Table 8. The said Comparative Glasses (open circles) are the Examples C5, C6, C8, C12 to C14 and C16 to C25 from Table 9. All of the Exemplary Glasses and Comparative Glasses shown in FIG. 7 have the features specified in Table 14. In Table 14, the entry "Not limited", if present, refers to a limitation that was not considered when selecting the compositions. In FIG. 7, some of the above-enumerated compositions may be labeled for better visibility.

TABLE 14

Limitations for Glass Compositions Shown in FIG. 7

| Quantity | Unit | Min | Max |
|---|---|---|---|
| $B_2O_3$ | mol % | 14 | Not limited |
| $SiO_2$ | mol % | 2 | Not limited |
| $Nb_2O_5$ | mol % | 1 | 45 |
| $TiO_2$ | mol % | 0 | 36 |
| $ZrO_2$ | mol % | 0 | 35 |
| $P_2O_5$ | mol % | 0 | 20 |
| CaO | mol % | 0 | 15 |
| MgO | mol % | 0 | 15 |
| $TeO_2$ | mol % | 0 | 10 |
| $Li_2O$ | mol % | 0 | 8 |
| ZnO | mol % | 0 | 5.5 |
| $Ga_2O_3$ | mol % | 0 | 5 |
| $GeO_2$ | mol % | 0 | 3 |
| $MoO_3$ | mol % | 0 | 3 |
| $Ta_2O_5$ | mol % | 0 | 1.5 |
| $Y_2O_3$ | mol % | 0 | 1 |
| $RE_mO_n$ | mol % | 0 | 50 |
| $R_2O$ | mol % | 0 | 18 |
| $RE_mO_n + TiO_2 + Nb_2O_5 + ZrO_2 + Bi_2O_3 + WO_3$ | mol % | 25 | Not limited |
| $SiO_2 + B_2O_3$ | mol % | 3 | 50 |
| $As_2O_3 + Sb_2O_3$ | mol % | 0 | 1 |
| F | at. % | 0 | 0.05 |
| $R_2O + RO - BaO$ | mol % | 0 | 20 |
| $n_d$ | | 1.85 | Not limited |

The above-enumerated Comparative Glasses were selected as having the highest measured values of the quantity "$n_d-(0.815+0.25*d_{RT})$" at comparable values of the transmittance index $T_i$ among the known glasses that have the mentioned features specified in Table 14.

The line corresponding to the formula y=0.16−0.38*x shown in FIG. 7 provides a visual representation of the differences between the Comparative Glasses having the features specified in Table 14 and the Exemplary Glasses 25, 57 and 61 according to the present disclosure. As can be seen in FIG. 7, the mentioned Exemplary Glasses (filled circles) and none of the Comparative Glasses (open circles) represented in FIG. 7 fall above the line y=0.16−0.38*x, where y corresponds to the quantity "$n_d-(0.815+0.25*d_{RT})$" and x corresponds to the transmittance index $T_i$. In other words, some of the Exemplary Glasses and none of the Comparative Glasses represented in FIG. 7 satisfy the following formula (V):

$$n_d-(0.815+0.25*d_{RT})-(0.16-0.38*T_i) > 0.000 \quad (V)$$

As can also be seen in FIG. 7, some of Exemplary Glasses and none of the Comparative Glasses represented in FIG. 7 fall above the line y=0.20−0.38*x, where y corresponds to the quantity "$n_d-(0.815+0.25*d_{RT})$" and x corresponds to the transmittance index $T_i$. In other words, the said Exemplary Glasses and none of the Comparative Glasses represented in FIG. 7 satisfy the following formula (VII):

$$n_d-(0.850+0.25*d_{RT})-(0.20-0.38*T_i) > 0.000 \quad (VII)$$

This means that, under the conditions specified in Table 14 above, some of the Exemplary Glasses from the present disclosure have higher measured values of the quantity "$n_d-(0.815+0.25*d_{RT})$" at comparable measured values of the transmittance index $T_i$ compared to the best of the Comparative Glasses satisfying the same conditions. This can be interpreted as these Exemplary Glasses, according to measured properties, have the highest values of the quantity "$n_d-(0.815+0.25*d_{RT})$" at comparable values of the transmittance index $T_i$ among the said glasses. In other words, the Exemplary Glasses shown in FIG. 7, according to measured properties, provide an improvement in terms of the combination of the transmittance index $T_i$ and quantity "$n_d-(0.815+0.25*d_{RT})$" among the known glasses that have the features specified in Table 14.

The values of all attributes specified in Tables 13 and 14 and formulas (XII), (XIII), (V), and (VII) for the Comparative Glasses C5 to C25 plotted in FIGS. 6 and 7 are presented in Table 15 below. Full compositions of the Comparative Glasses are presented in Table 9. Full compositions and above-mentioned attributes of the Exemplary Glasses from the present disclosure are presented in Table 8.

TABLE 15

Attributes of Comparative Glasses Having the Features Specified in Tables 13 and 14

| Ex. # | | C5 | C6 | C7 | C8 | C9 | C10 | C11 | C12 |
|---|---|---|---|---|---|---|---|---|---|
| Composition | | | | | | | | | |
| $SiO_2$ | mol. % | 13.99 | 14.00 | 13.99 | 13.99 | 5.53 | 5.35 | 13.80 | 13.60 |
| $Nb_2O_5$ | mol. % | 2.55 | 2.56 | 2.56 | 2.55 | 16.29 | 15.76 | 3.90 | 3.83 |
| $RE_mO_n$ | mol. % | 14.22 | 14.09 | 14.09 | 14.09 | 21.00 | 20.30 | 13.89 | 12.97 |
| $TiO_2$ | mol. % | 23.02 | 19.96 | 19.95 | 19.95 | 5.49 | 8.61 | 19.67 | 33.52 |
| $ZrO_2$ | mol. % | 5.85 | 7.26 | 7.26 | 7.26 | 10.98 | 10.62 | 7.16 | 7.45 |
| $P_2O_5$ | mol. % | 0 | 0 | 0 | 0 | 0 | 0 | 0 | 0 |
| $R_2O$ | mol. % | 0 | 0 | 0 | 0 | 0 | 0 | 0 | 0 |
| CaO | mol. % | 5.62 | 7.04 | 0 | 3.56 | 0 | 0 | 3.52 | 0 |
| MgO | mol. % | 0 | 0 | 0 | 0 | 0 | 0 | 0 | 0 |
| $TeO_2$ | mol. % | 0 | 0 | 0 | 0 | 0 | 0 | 0 | 0 |
| $Li_2O$ | mol. % | 0 | 0 | 0 | 0 | 0 | 0 | 0 | 0 |
| ZnO | mol. % | 1.19 | 4.21 | 4.22 | 4.22 | 0 | 0 | 4.16 | 2.16 |
| $Ga_2O_3$ | mol. % | 0 | 0 | 0 | 0 | 0 | 0 | 0 | 0 |
| $GeO_2$ | mol. % | 0 | 0 | 0 | 0 | 0 | 0 | 0 | 0 |
| $MoO_3$ | mol. % | 0 | 0 | 0 | 0 | 0 | 0 | 0 | 0 |
| $Ta_2O_5$ | mol. % | 0 | 0 | 0 | 0 | 0.82 | 0.79 | 0 | 0 |
| $Y_2O_3$ | mol. % | 0 | 0 | 0 | 0 | 0 | 0 | 0 | 0.28 |
| ($RE_mO_n + TiO_2 + Nb_2O_5 + ZrO_2 + Bi_2O_3 + WO_3$) | mol. % | 45.63 | 43.86 | 43.85 | 43.86 | 61.37 | 62.65 | 44.62 | 58.09 |
| $SiO_2 + B_2O_3$ | mol. % | 37.83 | 37.97 | 37.99 | 37.97 | 37.74 | 36.50 | 37.47 | 28.94 |
| $As_2O_3 + Sb_2O_3$ | mol. % | 0 | 0 | 0 | 0 | 0.0607 | 0.0596 | 0 | 0 |
| F | mol. % | 0 | 0 | 0 | 0 | 0 | 0 | 0 | 0 |
| Measured properties | | | | | | | | | |
| $T_i$ | | 0.4397 | 0.4867 | 0.4868 | 0.4868 | 0.5948 | 0.5593 | 0.4717 | 0.3503 |
| Composition | | | | | | | | | |
| $R_2O + RO - BaO$ | mol. % | 6.816 | 11.25 | 11.25 | 11.25 | 0 | 0 | 9.722 | 3.132 |
| Measured properties | | | | | | | | | |
| $n_d$ | | 1.9269 | 1.9049 | 1.9027 | 1.9038 | 1.9973 | 2.0078 | 1.9038 | 2.0137 |
| $d_{RT}$ | g/cm³ | 4.520 | 4.490 | 4.570 | 4.530 | | | 4.540 | 4.720 |
| $n_d - (0.815 + 0.25 *(d_{RT}))$ | | -0.0181 | -0.0326 | -0.0548 | -0.0437 | | | -0.0462 | 0.0187 |
| $n_d - (0.815 + 0.25 * (d_{RT})) - (0.16 - 0.38 * T_i)$ | | -0.011 | -0.0076 | | -0.0187 | | | | -0.0082 |
| $n_d - (0.815 + 0.25 * (d_{RT})) - (0.20 - 0.38 * T_i)$ | | -0.051 | -0.0476 | | -0.0587 | | | | -0.0482 |
| Predicted properties | | | | | | | | | |
| $P_n$ | | 2.1021 | 1.8874 | 1.8864 | 1.887 | 2.0369 | 2.0409 | 1.8999 | 1.9734 |
| $P_d$ | g/cm³ | 6.3408 | 4.4421 | 4.4587 | 4.4507 | 5.2247 | 5.1723 | 4.4846 | 4.5713 |
| $P_n - (0.815 + 0.25 * (P_d))$ | | -0.0355 | -0.0381 | -0.0433 | -0.0407 | -0.0843 | -0.0672 | -0.0362 | 0.0156 |
| $P_n - (0.815 + 0.25 * (P_d)) - (0.16 - 0.38 * T_i)$ | | -0.0285 | -0.0131 | -0.0183 | -0.0157 | -0.0183 | -0.0146 | -0.0170 | -0.0113 |
| $P_n - (0.815 + 0.25 * (P_d)) - (0.20 - 0.38 * T_i)$ | | -0.0685 | -0.0531 | -0.0583 | -0.0557 | -0.0583 | -0.0546 | -0.0570 | -0.0513 |

| Ex. # | | C13 | C14 | C15 | C16 | C17 | C18 | C19 | C20 |
|---|---|---|---|---|---|---|---|---|---|
| Composition | | | | | | | | | |
| $SiO_2$ | mol. % | 11.78 | 7.88 | 13.34 | 13.99 | 14.00 | 14.88 | 13.99 | 11.07 |
| $Nb_2O_5$ | mol. % | 5.03 | 7.53 | 8.52 | 2.55 | 2.55 | 3.84 | 2.55 | 4.81 |
| $RE_mO_n$ | mol. % | 13.14 | 13.51 | 24.77 | 14.23 | 14.16 | 13.32 | 14.15 | 12.41 |
| $TiO_2$ | mol. % | 34.14 | 34.54 | 11.18 | 19.95 | 19.94 | 31.97 | 19.94 | 31.40 |
| $ZrO_2$ | mol. % | 5.85 | 5.49 | 8.65 | 5.85 | 6.55 | 7.25 | 6.55 | 7.17 |
| $P_2O_5$ | mol. % | 0 | 0 | 0 | 0 | 0 | 0 | 0 | 0 |
| $R_2O$ | mol. % | 0 | 0 | 0 | 0 | 0 | 0 | 0 | 0 |
| CaO | mol. % | 0 | 0 | 0 | 7.04 | 7.04 | 0 | 7.03 | 0 |
| MgO | mol. % | 0 | 0 | 0 | 0 | 0 | 0 | 0 | 0 |
| $TeO_2$ | mol. % | 0 | 0 | 0 | 0 | 0 | 0 | 0 | 0 |

TABLE 15-continued

Attributes of Comparative Glasses Having the Features Specified in Tables 13 and 14

| | | | | | | | | |
|---|---|---|---|---|---|---|---|---|
| Li$_2$O | mol. % | 0 | 0 | 0 | 0 | 0 | 0 | 0 | 0 |
| ZnO | mol. % | 1.90 | 3.82 | 0 | 4.22 | 4.21 | 1.57 | 4.21 | 3.77 |
| Ga$_2$O$_3$ | mol. % | 0 | 0 | 0 | 0 | 0 | 0 | 0 | 0 |
| GeO$_2$ | mol. % | 0 | 0 | 0 | 0 | 0 | 0 | 0 | 0 |
| MoO$_3$ | mol. % | 0 | 0 | 0 | 0 | 0 | 0 | 0 | 0 |
| Ta$_2$O$_5$ | mol. % | 0 | 0 | 0 | 0 | 0 | 0 | 0 | 0 |
| Y$_2$O$_3$ | mol. % | 0.28 | 0.36 | 0 | 0 | 0 | 0 | 0 | 0 |
| (RE$_m$O$_n$ + TiO$_2$ + Nb$_2$O$_5$ + ZrO$_2$ + Bi$_2$O$_3$ + WO$_3$) | mol. % | 58.44 | 62.24 | 53.12 | 42.59 | 43.21 | 56.39 | 43.20 | 56.34 |
| SiO$_2$ + B$_2$O$_3$ | mol. % | 28.59 | 23.42 | 46.88 | 37.82 | 37.93 | 29.55 | 37.93 | 28.53 |
| As$_2$O$_3$ + Sb$_2$O$_3$ | mol. % | 0 | 0 | 0 | 0 | 0 | 0 | 0 | 0 |
| F | mol. % | 0 | 0 | 0 | 0 | 0 | 0 | 0 | 0 |

Measured properties

| | | | | | | | | |
|---|---|---|---|---|---|---|---|---|
| T$_i$ | | 0.3204 | 0.3002 | 0.6292 | 0.4716 | 0.4793 | 0.3649 | 0.4792 | 0.3509 |

Composition

| | | | | | | | | |
|---|---|---|---|---|---|---|---|---|
| R$_2$O + RO − BaO | mol. % | 1.897 | 5.519 | 0 | 11.26 | 11.25 | 1.569 | 11.24 | 3.773 |

Measured properties

| | | | | | | | | |
|---|---|---|---|---|---|---|---|---|
| n$_d$ | | 2.0246 | 2.0302 | 1.911 | 1.9006 | 1.903 | 2.000 | 1.903 | 2.0067 |
| d$_{RT}$ | g/cm$^3$ | 4.710 | 4.700 | 5.000 | 4.490 | 4.490 | 4.700 | 4.490 | 4.720 |
| n$_d$ − (0.815 + 0.25 * (d$_{RT}$)) | | 0.0321 | 0.0402 | −0.154 | −0.0369 | −0.0345 | 0.010 | −0.0345 | 0.0117 |
| n$_d$ − (0.815 + 0.25 * (d$_{RT}$)) − (0.16 − 0.38 * T$_i$) | | −0.0061 | −0.0057 | | −0.0177 | −0.0124 | −0.0113 | −0.0124 | −0.0149 |
| n$_d$ − (0.815 + 0.25 * (d$_{RT}$)) − (0.20 − 0.38 * T$_i$) | | −0.0461 | −0.0457 | | −0.0577 | −0.0524 | −0.0513 | −0.0524 | −0.0549 |

Predicted properties

| | | | | | | | | |
|---|---|---|---|---|---|---|---|---|
| P$_n$ | | 1.9848 | 2.0324 | 1.9358 | 2.0991 | 2.0998 | 2.1453 | 2.0996 | 2.1527 |
| P$_d$ | g/cm$^3$ | 4.6012 | 4.746 | 4.8664 | 6.3523 | 6.3356 | 6.2989 | 6.3344 | 6.2324 |
| P$_n$ − (0.815 + 0.25 * (P$_d$)) | | 0.0194 | 0.0309 | −0.0958 | −0.0455 | −0.0417 | −0.0041 | −0.0417 | 0.0046 |
| P$_n$ − (0.815 + 0.25 * (P$_d$)) − (0.16 − 0.38 * T$_i$) | | −0.0188 | −0.0150 | −0.0167 | −0.0263 | −0.0196 | −0.0254 | −0.0196 | −0.0220 |
| P$_n$ − (0.815 + 0.25 * (P$_d$)) − (0.20 − 0.38 * T$_i$) | | −0.0588 | −0.0550 | −0.0567 | −0.0663 | −0.0596 | −0.0654 | −0.0596 | −0.0620 |

| Ex. # | | C21 | C22 | C23 | C24 | C25 |
|---|---|---|---|---|---|---|

Composition

| | | | | | | |
|---|---|---|---|---|---|---|
| SiO$_2$ | mol. % | 12.61 | 10.97 | 12.23 | 12.51 | 16.67 |
| Nb$_2$O$_5$ | mol. % | 4.25 | 4.62 | 4.56 | 4.36 | 4.53 |
| RE$_m$O$_n$ | mol. % | 13.08 | 13.24 | 12.91 | 12.59 | 27.31 |
| TiO$_2$ | mol. % | 32.15 | 31.88 | 31.48 | 31.59 | 9.77 |
| ZrO$_2$ | mol. % | 6.88 | 7.45 | 6.38 | 6.72 | 8.05 |
| P$_2$O$_5$ | mol. % | 0 | 0 | 0 | 0 | 0 |
| R$_2$O | mol. % | 0 | 0 | 0 | 0 | 0 |
| CaO | mol. % | 0 | 0 | 0 | 0 | 0 |
| MgO | mol. % | 0 | 0 | 0 | 0 | 0 |
| TeO$_2$ | mol. % | 0 | 0 | 0 | 0 | 0 |
| Li$_2$O | mol. % | 0 | 0 | 0 | 0 | 0 |
| ZnO | mol. % | 2.68 | 3.34 | 4.28 | 3.13 | 0 |
| Ga$_2$O$_3$ | mol. % | 0 | 0 | 0 | 0 | 0 |
| GeO$_2$ | mol. % | 0 | 0 | 0 | 0 | 0 |
| MoO$_3$ | mol. % | 0 | 0 | 0 | 0 | 0 |
| Ta$_2$O$_5$ | mol. % | 0 | 0 | 0 | 0 | 0 |
| Y$_2$O$_3$ | mol. % | 0 | 0.23 | 0 | 0 | 0.27 |
| (RE$_m$O$_n$ + TiO$_2$ + Nb$_2$O$_5$ + ZrO$_2$ + Bi$_2$O$_3$ + WO$_3$) | mol. % | 56.36 | 57.30 | 55.83 | 55.49 | 50.36 |
| SiO$_2$ + B$_2$O$_3$ | mol. % | 28.47 | 26.57 | 27.61 | 28.99 | 48.03 |
| As$_2$O$_3$ + Sb$_2$O$_3$ | mol. % | 0.0044 | 0 | 0 | 0.0044 | 0.0266 |
| F | mol. % | 0 | 0 | 0 | 0 | 0 |

Measured properties

| | | | | | | |
|---|---|---|---|---|---|---|
| T$_i$ | | 0.3542 | 0.3592 | 0.3486 | 0.3495 | 0.7105 |

Composition

| | | | | | | |
|---|---|---|---|---|---|---|
| R$_2$O + RO − BaO | mol. % | 2.682 | 5.082 | 4.278 | 3.132 | 0 |

Measured properties

| | | | | | | |
|---|---|---|---|---|---|---|
| n$_d$ | | 2.0002 | 2.013 | 2.007 | 2.0001 | 1.8974 |
| d$_{RT}$ | g/cm$^3$ | 4.700 | 4.730 | 4.720 | 4.700 | 4.810 |
| n$_d$ − (0.815 + 0.25 * (d$_{RT}$)) | | 0.0102 | 0.0155 | 0.012 | 0.0101 | −0.1201 |
| n$_d$ − (0.815 + 0.25 * (d$_{RT}$)) − (0.16 − 0.38 * T$_i$) | | −0.0152 | −0.008 | −0.0155 | −0.0171 | −0.0101 |
| n$_d$ − (0.815 + 0.25 * (d$_{RT}$)) − (0.20 − 0.38 * T$_i$) | | −0.0552 | −0.048 | −0.0555 | −0.0571 | −0.0501 |

TABLE 15-continued

Attributes of Comparative Glasses Having the Features Specified in Tables 13 and 14

| | | Predicted properties | | | | |
|---|---|---|---|---|---|---|
| $P_n$ | | 2.1489 | 2.1579 | 2.1543 | 2.1452 | 2.201 |
| $P_d$ | g/cm³ | 6.3211 | 6.2897 | 6.3149 | 6.2544 | 7.4529 |
| $P_n - (0.815 + 0.25 * (P_d))$ | | −0.0043 | 0.0015 | −0.0068 | −9.478E−04 | −0.1607 |
| $P_n - (0.815 + 0.25 * (P_d)) - (0.16 - 0.38 * T_i)$ | | −0.0297 | −0.0220 | −0.0343 | −0.0281 | −0.0507 |
| $P_n - (0.815 + 0.25 * (P_d)) - (0.20 - 0.38 * T_i)$ | | −0.0697 | −0.0620 | −0.0743 | −0.0681 | −0.0907 |

As follows from FIGS. 6 and 7, both predicted and measured property data confirms that some Exemplary Glasses from the present disclosure have an improved combination of high refractive index $n_d$ at 587.56 nm, density at room temperature $d_{RT}$, and transmittance index $T_i$ compared to the best of the Comparative Glasses that have the features specified in Tables 13 and 14, accordingly.

The following non-limiting aspects are encompassed by the present disclosure. To the extent not already described, any one of the features of the first through the twenty-seventh aspects may be combined in part or in whole with features of any one or more of the other aspects of the present disclosure to form additional aspects, even if such a combination is not explicitly described.

According to a first aspect of the present disclosure, a glass comprises: $SiO_2$ of from 14.0 mol % to 50.0 mol %; $B_2O_3$ at greater than 0.0 mol %; $TiO_2$ from 5.0 mol % to 40.0 mol %; $Nb_2O_5$ from 2.2 mol % to 50.0 mol %; $ZrO_2$ from 2.5 mol % to 25.0 mol %; a total content of rare earth metal oxides ($RE_mO_n$) of from 0.0 mol % to 30.0 mol %; and other oxide species, when present, present at 0.5 mol % or less, and wherein a ratio of an amount of $B_2O_3$ to an amount of $SiO_2$ ($B_2O_3/SiO_2$), in mole percent of oxide, is at least 0.050, and wherein the glass is substantially free of $Y_2O_3$.

According to a second aspect of the present disclosure, the glass of claim 1, wherein the glass comprises at least one of: $TiO_2$ from 12.0 mol % to 40.0 mol %; $ZrO_2$ from 2.5 mol % to 13.0 mol %; and $Nb_2O_5$ from 2.2 mol % to 30.0 mol %.

According to a third aspect of the present disclosure, the glass of claim 1 or claim 2, wherein the glass comprises $B_2O_3$ from 10.0 mol % to 40.0 mol %.

According to a fourth aspect of the present disclosure, the glass of any one of claims 1-3, wherein the total content of rare earth metal oxides ($RE_mO_n$) is from 10.0 mol % to 30.0 mol %.

According to a fifth aspect of the present disclosure, the glass of claim 4, wherein at least one of the one or more rare earth metal oxides is selected from the group of $La_2O_3$, $Gd_2O_3$ and $Yb_2O_3$.

According to a sixth aspect of the present disclosure, the glass of any one of claims 1-5, wherein the glass further comprises at least one of: CaO from 0.0 mol % to 30.0 mol %; BaO from 0.0 mol % to 15.0 mol %; and $K_2O$ from 0.0 mol % to 5.0 mol %.

According to a seventh aspect of the present disclosure, the glass of any one of claims 1-6, wherein the glass has: a refractive index $n_d$ of from 1.90 to 2.10, as measured at a wavelength of 587.56 nm; and a density $d_{RT}$ of 5.5 g/cm³ or less, as measured at 25° C.

According to an eighth aspect of the present disclosure, the glass of any one of claims 1-7, wherein the glass has: a refractive index $n_d$, as measured at a wavelength of 587.56 nm; and a density $d_{RT}$, as measured at 25° C. (in g/cm³), and wherein the glass satisfies formula (III): $n_d-(0.815+0.25*d_{RT})>0.000$ (III).

According to a ninth aspect of the present disclosure, the glass of any one of claims 1-8, wherein the glass satisfies at least one of formula (I) and formula (II), based on an amount of each oxide, in mole percent of oxides:

$$0.0 \leq (SiO_2 + Nb_2O_5 + ZrO_2 - RE_mO_n) \leq 12.0 \quad (I)$$

and $$\frac{(RE_mO_n - ZrO_2 - Nb_2O_5) \times (RE_mO_n - ZrO_2 - Nb_2O_5 - SiO_2)}{(RE_mO_n + ZrO_2 + Nb_2O_5 + SiO_2)} \leq 0, \quad (II)$$

where $RE_mO_n$ is the total content of rare earth metal oxides in terms of mole percent.

According to a tenth aspect of the present disclosure, the glass of any one of claims 1-9, wherein the glass is characterized by an ability to cool, in air, from 1100° C. to 500° C. in 2.5 minutes without crystallizing.

According to an eleventh aspect of the present disclosure, the glass of any one of claims 1-10, wherein the glass comprises: $SiO_2$ from 14.0 mol % to 36.0 mol %; and $B_2O_3$ from 14.0 mol % to 48.0 mol %, and wherein the glass comprises a sum of ($SiO_2+B_2O_3$) of 50.0 mol % or less.

According to a twelfth aspect of the present disclosure, a glass comprises: $B_2O_3$ of from 1.0 mol % to 40.0 mol %; $La_2O_3$ at 13.5 mol % or greater; $SiO_2$ at greater than or equal to 0.0 mol %, wherein a sum of ($SiO_2+B_2O_3$) is from 1.0 mol % to 50.0 mol %; and at least one oxide selected from rare earth metal oxides, $Al_2O_3$, $Nb_2O_5$, $TiO_2$, $ThO_2$, $GeO_2$, $P_2O_5$, ZnO, $Y_2O_3$, BaO, $Bi_2O_3$, CaO, $Er_2O_3$, $Gd_2O_3$, $K_2O$, $La_2O_3$, $Li_2O$, $Na_2O$, $Nd_2O_3$, PbO, $TeO_2$, $WO_3$, $Yb_2O_3$, and $ZrO_2$, subject to the proviso that: $Nb_2O_5$ is from 0.0 mol % to 12.3 mol %; $TiO_2$ is from 0.0 mol % to 33.0 mol %; $ThO_2$ is from 0.0 mol % to 5.0 mol %; $GeO_2$ is from 0.0 mol % to 10.0 mol %; $P_2O_5$ is from 0.0 mol % to 20.0 mol %; $Al_2O_3$ is from 0.0 mol % to 2.5 mol %, and a sum of ($ZnO+Y_2O_3$) is from 0.0 mol % to 2.5 mol %, and wherein the glass satisfies formula (X):

$$P_n-(0.815+0.25*P_d)>0.000 \quad (X)$$

where $P_n$ is a refractive index parameter of the glass and is calculated according to formula (VIII):

$$P_n = 1.817 - 0.0035654*Al_2O_3 - 0.0038101*B_2O_3 + \quad (VIII)$$
$$0.00081216*BaO + 0.010373*Bi_2O_3 + 0.00013728*CaO +$$
$$0.0073116*Er_2O_3 + 0.0055226*Gd_2O_3 - 0.003343*K_2O +$$
$$0.0060806*La_2O_3 - 0.0009011*Li_2O - 0.001967*Na_2O +$$

-continued $$0.0093799*Nb_2O_5 + 0.0060396*Nd_2O_3 - 0.0061024*P_2O_5 +$$
$$0.0040356*PbO - 0.0032812*SiO_2 + 0.0030562*TeO_2 +$$
$$0.0034148*TiO_2 + 0.004267*WO_3 + 0.0034424*Y_2O_3 +$$
$$0.0071109*Yb_2O_3 + 0.00096907*ZnO + 0.0026412*ZrO_2$$

And $P_d$ is a density parameter and is calculated according to formula (IX):

$$P_d = 4.17 - 0.018843*Al_2O_3 - \qquad (IX)$$
$$0.020477*B_2O_3 + 0.021988*BaO + 0.074733*Bi_2O_3 -$$
$$0.0024274*CaO + 0.100258*Er_2O_3 + 0.074270*Gd_2O_3 -$$
$$0.018568*K_2O + 0.060370*La_2O_3 - 0.0089006*Li_2O -$$
$$0.0090924*Na_2O + 0.0062468*Nb_2O_5 +$$
$$0.068993*Nd_2O_3 - 0.038868*P_2O_5 +$$
$$0.048530*PbO - 0.018196*SiO_2 + 0.013124*TeO_2 -$$
$$0.005285*TiO_2 + 0.044564*WO_3 + 0.022887*Y_2O_3 +$$
$$0.097857*Yb_2O_3 + 0.0077032*ZnO + 0.012501*ZrO_2$$

and each oxide listed in formula (VIII) and formula (IX) refers to the amount of the oxide, expressed in mol %, in the glass.

According to a thirteenth aspect of the present disclosure, the glass of claim 12, wherein the glass has: a refractive index $n_d$, as measured at a wavelength of 587.56 nm; and a density $d_{RT}$, as measured at 25° C. (in g/cm³), and wherein the glass satisfies formula (III):

$$n_d - (0.815 + 0.25*d_{RT}) > 0.000 \qquad (III).$$

According to a fourteenth aspect of the present disclosure, the glass of claim 12 or claim 13, wherein the glass comprises: $B_2O_3$ from 10.0 mol % to 40.0 mol %; $La_2O_3$ from 13.5 mol % to 30.0 mol %; and $SiO_2$ from greater than or equal to 0.0 mol % to 20.0 mol %.

According to a fifteenth aspect of the present disclosure, the glass of any one of claims 12-14, wherein the glass comprises at least one of: $TiO_2$ from 0.3 mol % to 33.0 mol %; and $Nb_2O_5$ from 0.3 mol % to 12.3 mol %.

According to a sixteenth aspect of the present disclosure, the glass of any one of claims 12-15, wherein the glass comprises at least one of: $ZrO_2$ from 0.3 mol % to 15.0 mol %; CaO from 0.0 mol % to 30.0 mol %; BaO from 0.0 mol % to 15.0 mol %; and $K_2O$ from 0.0 mol % to 5.0 mol %.

According to a seventeenth aspect of the present disclosure, the glass of any one of claims 12-16, wherein the glass has: a refractive index $n_d$ of from 1.90 to 2.10, as measured at a wavelength of 587.56 nm; and a density $d_{RT}$ of 5.5 g/cm³ or less, as measured at 25° C.

According to a eighteenth aspect of the present disclosure, the glass of any one of claims 11-17, wherein the glass satisfies at least one of formula (I) and formula (II), based on an amount of each oxide, in percent by mole of oxide:

$$0.0 \le (SiO_2 + Nb_2O_5 + ZrO_2 - RE_mO_n) \le 12.0 \text{ and} \qquad (I)$$

$$\frac{(RE_mO_n - ZrO_2 - Nb_2O_5) \times (RE_mO_n - ZrO_2 - Nb_2O_5 - SiO_2)}{(RE_mO_n + ZrO_2 + Nb_2O_5 + SiO_2)} \le 0. \qquad (II)$$

where $RE_mO_n$ is the total content of rare earth metal oxides in terms of mole percent.

According to a nineteenth aspect of the present disclosure, the glass of any one of claims 12-18, wherein the glass is characterized by an ability to cool, in air, from 1100° C. to 500° C. in 2.5 minutes without crystallizing.

According to a twentieth aspect of the present disclosure, a glass comprises: $B_2O_3$ at 14.5 mol % or greater; $SiO_2$ at 2.0 mol % or greater, and wherein a sum of ($SiO_2+B_2O_3$) is from 3.0 mol % to 50.0 mol %; $Nb_2O_5$ from 1.0 mol % to 45.0 mol %; and at least one oxide selected from monovalent metal oxides, divalent metal oxides, rare earth metal oxides, $As_2O_3$, $Sb_2O_3$, $Al_2O_3$, $TiO_2$, $MoO_3$, $Ta_2O_5$, $GeO_2$, $P_2O_5$, ZnO, $Y_2O_3$, BaO, $Bi_2O_3$, CaO, $Er_2O_3$, $Gd_2O_3$, $Ga_2O_3$, $K_2O$, $La_2O_3$, $Li_2O$, $Na_2O$, $Nd_2O_3$, PbO, $TeO_2$, $WO_3$, $Yb_2O_3$, and $ZrO_2$, subject to the proviso that: $TiO_2$ is from 0.0 mol % to 36.0 mol %; $ZrO_2$ is at 0.0 mol % or greater; $Y_2O_3$ is from 0.0 mol % to 1.0 mol %; $Ta_2O_5$ is from 0.0 mol % to 1.5 mol %; $GeO_2$ is from 0.0 mol % to 0.5 mol %; CaO is from 0.0 mol % to 15.0 mol %; $P_2O_5$ is from 0.0 mol % to 20.0 mol %; $Al_2O_3$ is from 0.0 mol % to 2.5 mol %; ZnO is from 0.0 mol % to 5.5 mol %; $MoO_3$ is from 0.0 mol % to 3.0 mol %; MgO is from 0.0 mol % to 15.0 mol %; $Ga_2O_3$ is from 0.0 mol % to 5.0 mol %; $Li_2O$ is from 0.0 mol % to 8.0 mol %; $TeO_2$ is from 0.0 mol % to 10.0 mol %; a total content of monovalent metal oxides ($R_2O$) is from 0.0 mol % to 15.0 mol %; a total content of rare earth metal oxides ($RE_mO_n$) is from 0.0 mol % to 50.0 mol %; a sum of ($As_{2O3}+Sb_2O_3$) is from 0.0 mol % to 1.0 mol %; a sum of ($RE_mO_n+TiO_2+Nb_2O_5+ZrO_2+Bi_2O_3+WO_3$) is 25.0 mol % or greater; a sum of ($R_2O+RO-BaO$) is from 0.0 mol % to 20.0 mol %, where RO is a total content of divalent metal oxides; and the glass is substantially free of fluorine, and wherein the glass satisfies formula (XII):

$$P_n - (0.815 + 0.25*P_d) - (0.16 - 0.38*T_i) > 0.000 \qquad (XII)$$

where $P_n$ is a refractive index parameter having a value of 1.85 or greater and is calculated according to formula (VIII):

$$P_n = 1.817 - 0.0035654*Al_2O_3 - 0.0038101*B_2O_3 + \qquad (VIII)$$
$$0.00081216*BaO + 0.010373*Bi_2O_3 + 0.00013728*CaO +$$
$$0.0073116*Er_2O_3 + 0.0055226*Gd_2O_3 - 0.003343*K_2O +$$
$$0.0060806*La_2O_3 - 0.0009011*Li_2O - 0.001967*Na_2O +$$
$$0.0093799*Nb_2O_5 + 0.0060396*Nd_2O_3 - 0.0061024*P_2O_5 +$$
$$0.0040356*PbO - 0.0032812*SiO_2 + 0.0030562*TeO_2 +$$
$$0.0034148*TiO_2 + 0.004267*WO_3 + 0.0034424*Y_2O_3 +$$
$$0.0071109*Yb_2O_3 + 0.00096907*ZnO + 0.0026412*ZrO_2$$

where $P_d$ is a density parameter calculated according to formula (IX):

$$P_d = 4.17 - 0.018843*Al_2O_3 - 0.020477*B_2O_3 + \qquad (IX)$$
$$0.021988*BaO + 0.074733*Bi_2O_3 - 0.0024274*CaO +$$
$$0.100258*Er_2O_3 + 0.074270*Gd_2O_3 - 0.018568*K_2O +$$
$$0.060370*La_2O_3 - 0.0089006*Li_2O - 0.0090924*Na_2O +$$
$$0.0062468*Nb_2O_5 + 0.068993*Nd_2O_3 - 0.038868*P_2O_5 +$$
$$0.048530*PbO - 0.018196*SiO_2 + 0.013124*TeO_2 -$$

-continued $$0.005285*TiO_2 + 0.044564*WO_3 + 0.022887*Y_2O_3 +$$
$$0.097857*Yb_2O_3 + 0.0077032*ZnO + 0.012501*ZrO_2$$

and where $T_i$ is a transmittance index calculated according to formula (VI):

$$T_i = \frac{(La_2O_3 + Gd_2O_3 + ZrO_2)}{(La_2O_3 + Gd_2O_3 + ZrO_2 + TiO_2 + Nb_2O_5)} \quad \text{(VI)}$$

and each oxide listed in formula (VIII), formula (IX), and formula (VI) refers to the amount of the oxide, expressed in mol %, in the glass.

According to a twenty-first aspect of the present disclosure, the glass of claim 20, wherein the glass has: a refractive index $n_d$ of at least 1.85, as measured at a wavelength of 587.56 nm; and a density $d_{RT}$, as measured at 25° C. (in g/cm³), and wherein the glass satisfies formula (V):

$$n_d-(0.815+0.25*d_{RT})-(0.16-0.38*T_i)>0.000 \quad \text{(V)}.$$

According to a twenty-second aspect of the present disclosure, the glass of claim 20, wherein the glass satisfies formula (XIII):

$$P_n-(0.850+0.25*P_d)-(0.20-0.38*T_i)>0.000 \quad \text{(XIII)}.$$

According to a twenty-third aspect of the present disclosure, the glass of claim 20, wherein the glass has: a refractive index $n_d$ of at least 1.95, as measured at a wavelength of 587.56 nm; and a density $d_{RT}$, as measured at 25° C. (in g/cm³), and wherein the glass satisfies formula (VII):

$$n_d-(0.850+0.25*d_{RT})-(0.20-0.38*T_i)>0.000 \quad \text{(VII)}.$$

According to a twenty-fourth aspect of the present disclosure, the glass of any one of claims 20-23, wherein the glass has: a refractive index $n_d$ of from 1.90 to 2.10, as measured at a wavelength of 587.56 nm; and a density $d_{RT}$ of 5.5 g/cm³ or less, as measured at 25° C.

According to a twenty-fifth aspect of the present disclosure, the glass of any one of claims 20-23, wherein the glass satisfies at least one of formula (I) and formula (II), based on an amount of each oxide, in percent by mole of oxide:

$$0.0 \leq (SiO_2 + Nb_2O_5 + ZrO_2 - RE_mO_n) \leq 12.0 \text{ and} \quad \text{(I)}$$

$$\frac{(RE_mO_n - ZrO_2 - Nb_2O_5) \times (RE_mO_n - ZrO_2 - Nb_2O_5 - SiO_2)}{(RE_mO_n + ZrO_2 + Nb_2O_5 + SiO_2)} \leq 0, \quad \text{(II)}$$

where $RE_mO_n$ is the total content of rare earth metal oxides in terms of mole percent.

According to a twenty-sixth aspect of the present disclosure, the glass of any one of claims 20-25, wherein the glass comprises: $SiO_2$ from 2.0 mol % to 36.0 mol %; and $B_2O_3$ from 14.5 mol % to 48.0 mol %.

According to a twenty-seventh aspect of the present disclosure, the glass of any one of claims 20-26, wherein the glass is characterized by an ability to cool, in air, from 1100° C. to 500° C. in 2.5 minutes without crystallizing.

Many variations and modifications may be made to the above-described embodiments of the disclosure without departing substantially from the spirit and various principles of the disclosure. All such modifications and variations are intended to be included herein within the scope of this disclosure and protected by the following claims.

To the extent not already described, the different features of the various aspects of the present disclosure may be used in combination with each other as desired. That a particular feature is not explicitly illustrated or described with respect to each aspect of the present disclosure is not meant to be construed that it cannot be, but it is done for the sake of brevity and conciseness of the description. Thus, the various features of the different aspects may be mixed and matched as desired to form new aspects, whether or not the new aspects are expressly disclosed.

What is claimed is:

1. A glass, comprising:
   $SiO_2$ of from 14.0 mol % to 50.0 mol %;
   $B_2O_3$ at greater than 0.7 mol %;
   $TiO_2$ from 5.0 mol % to 40.0 mol %;
   $Nb_2O_5$ from 2.2 mol % to 50.0 mol %;
   $ZrO_2$ from 2.5 mol % to 25.0 mol %;
   a total content of rare earth metal oxides ($RE_mO_n$) of from 0.0 mol % to 30.0 mol %; and
   a sum of $SiO_2$, $B_2O_3$, $TiO_2$, $Nb_2O_5$, $ZrO_2$ and $RE_mO_n$ ($SiO_2+B_2O_3+TiO_2+Nb_2O_5+ZrO_2+RE_mO_n$) is greater than or equal to 99.5 mol %, and
   wherein a ratio of an amount of $B_2O_3$ to an amount of $SiO_2$ ($B_2O_3/SiO_2$), in mole percent of oxide, is at least 0.050, and
   wherein the glass is substantially free of $Y_2O_3$.

2. The glass of claim 1, wherein the glass comprises at least one of:
   $TiO_2$ from 12.0 mol % to 40.0 mol %;
   $ZrO_2$ from 2.5 mol % to 13.0 mol %; and
   $Nb_2O_5$ from 2.2 mol % to 30.0 mol %.

3. The glass of claim 1, wherein at least one of the one or more rare earth metal oxides is selected from the group of $La_2O_3$, $Gd_2O_3$ and $Yb_2O_3$.

4. The glass of claim 1, wherein the glass has:
   a refractive index $n_d$ of from 1.90 to 2.10, as measured at a wavelength of 587.56 nm; and
   a density $d_{RT}$ of 5.5 g/cm³ or less, as measured at 25° C.

5. The glass of claim 1, wherein the glass satisfies at least one of formula (I) and formula (II), based on an amount of each oxide, in mole percent of oxides:

$$0.0 \leq (SiO_2+Nb_2O_5+ZrO_2-RE_mO_n) \leq 12.0 \quad \text{(I)}$$

and $$\frac{(RE_mO_n - ZrO_2 - Nb_2O_5) \times (RE_mO_n - ZrO_2 - Nb_2O_5 - SiO_2)}{(RE_mO_n + ZrO_2 + Nb_2O_5 + SiO_2)} \leq 0.0 \quad \text{(II)}$$

where $RE_mO_n$ is the total content of rare earth metal oxides in terms of mole percent.

6. The glass of claim 1, wherein the glass is characterized by an ability to cool, in air, from 1100° C. to 500° C. in 2.5 minutes without crystallizing.

7. A glass, comprising:
   $B_2O_3$ of from 1.0 mol % to 40.0 mol %;
   $La_2O_3$ at 13.5 mol % or greater;
   $SiO_2$ at greater than or equal to 0.0 mol %, wherein a sum of ($SiO_2+B_2O_3$) is from 1.0 mol % to 50.0 mol %; and
   at least one oxide selected from $Al_2O_3$, $Nb_2O_5$, $TiO_2$, $ThO_2$, $GeO_2$, $P_2O_5$, $ZnO$, $Y_2O_3$, $BaO$, $Bi_2O_3$, $CaO$, $Er_2O_3$, $Gd_2O_3$, $K_2O$, $La_2O_3$, $Li_2O$, $Na_2O$, $Nd_2O_3$, $PbO$, $TeO_2$, $WO_3$, $Yb_2O_3$, $ZrO_2$, and other rare earth metal oxides, subject to the proviso that:
   $Nb_2O_5$ is from 0.0 mol % to 12.3 mol %;
   $TiO_2$ is from 0.0 mol % to 33.0 mol %;

$ThO_2$ is from 0.0 mol % to 5.0 mol %;
$GeO_2$ is from 0.0 mol % to 10.0 mol %;
$P_2O_5$ is from 0.0 mol % to 20.0 mol %;
$Al_2O_3$ is from 0.0 mol % to 2.5 mol %, and
a sum of $(ZnO+Y_2O_3)$ is from 0.0 mol % to 2.5 mol %; and wherein the glass satisfies formula (X):

$$P_n-(0.815+0.25*P_d)>0.000 \qquad (X)$$

where $P_n$ is a refractive index parameter of the glass and is calculated according to formula (VIII):

$$P_n=1.817-0.0035654*Al_2O_3-0.0038101*B_2O_3+\\
0.00081216*BaO+0.010373*Bi_2O_3+\\
0.00013728*CaO+0.0073116*Er_2O_3+\\
0.0055226*Gd_2O_3-0.003343*K_2O+\\
0.0060806*La_2O_3-0.0009011*Li_2O-\\
0.001967*Na_2O+0.0093799*Nb_2O_5+\\
0.0060396*Nd_2O_3-0.0061024*P_2O_5+\\
0.0040356*PbO-0.0032812*SiO_2+\\
0.0030562*TeO_2+0.0034148*TiO_2+\\
0.004267*WO_3+0.0034424*Y_2O_3+\\
0.0071109*Yb_2O_3+0.00096907*ZnO+\\
0.0026412*ZrO_2 \qquad (VIII)$$

and $P_d$ is a density parameter and is calculated according to formula (IX):

$$P_d=4.17-0.018843*Al_2O_3-0.020477*B_2O_3+\\
0.021988*BaO+0.074733*Bi_2O_3-\\
0.0024274*CaO+0.100258*Er_2O_3+\\
0.074270*Gd_2O_3-0.018568*K_2O+\\
0.060370*La_2O_3-0.0089006*Li_2O-\\
0.0090924*Na_2O+0.0062468*Nb_2O_5+\\
0.068993*Nd_2O_3-0.038868*P_2O_5+\\
0.048530*PbO-0.018196*SiO_2+\\
0.013124*TeO_2-0.005285*TiO_2+\\
0.044564*WO_3+0.022887*Y_2O_3+\\
0.097857*Yb_2O_3+0.0077032*ZnO+\\
0.012501*ZrO_2 \qquad (IX)$$

and each oxide listed in formula (VIII) and formula (IX) refers to the amount of the oxide, expressed in mol %, in the glass.

8. The glass of claim 7, wherein the glass has:
a refractive index $n_d$, as measured at a wavelength of 587.56 nm; and
a density $d_{RT}$, as measured at 25° C. (in g/cm³), and
wherein the glass satisfies formula (III):

$$n_d-(0.815+0.25*d_{RT})>0.000 \qquad (III)$$

9. The glass of claim 7, wherein the glass comprises:
$B_2O_3$ from 10.0 mol % to 40.0 mol %;
$La_2O_3$ from 13.5 mol % to 30.0 mol %; and
$SiO_2$ from greater than or equal to 0.0 mol % to 20.0 mol %.

10. The glass of claim 7, wherein the glass has:
a refractive index $n_d$ of from 1.90 to 2.10, as measured at a wavelength of 587.56 nm; and
a density $d_{RT}$ of 5.5 g/cm³ or less, as measured at 25° C.

11. The glass of claim 7, wherein the glass satisfies at least one of formula (I) and formula (II), based on an amount of each oxide, in percent by mole of oxide:

$$0.0 \leq (SiO_2+Nb_2O_5+ZrO_2-RE_mO_n) \leq 12.0 \qquad (I)$$

and $$\frac{(RE_mO_n-ZrO_2-Nb_2O_5) \times (RE_mO_n-ZrO_2-Nb_2O_5-SiO_2)}{(RE_mO_n+ZrO_2+Nb_2O_5+SiO_2)} \leq 0.0 \qquad (II)$$

where $RE_mO_n$ is the total content of rare earth metal oxides in terms of mole percent.

12. The glass of claim 7, wherein the glass is characterized by an ability to cool, in air, from 1100° C. to 500° C. in 2.5 minutes without crystallizing.

13. A glass, comprising:
$B_2O_3$ at 14.5 mol % or greater;
$SiO_2$ at 2.0 mol % or greater, and wherein a sum of $(SiO_2+B_2O_3)$ is from 16.5 mol % to 50.0 mol %;
$Nb_2O_5$ from 1.0 mol % to 45.0 mol %; and
at least one oxide selected from $As_2O_3$, $Sb_2O_3$, $Al_2O_3$, $TiO_2$, $MoO_3$, $Ta_2O_5$, $GeO_2$, $P_2O_5$, $ZnO$, $Y_2O_3$, $BaO$, $Bi_2O_3$, $CaO$, $Er_2O_3$, $Gd_2O_3$, $Ga_2O_3$, $K_2O$, $La_2O_3$, $Li_2O$, $Na_2O$, $Nd_2O_3$, $PbO$, $TeO_2$, $WO_3$, $Yb_2O_3$, $ZrO_2$, other monovalent metal oxides, other divalent metal oxides, and other rare earth metal oxides, subject to the proviso that:

$TiO_2$ is from 0.0 mol % to 36.0 mol %;
$ZrO_2$ is at 0.0 mol % or greater;
$Y_2O_3$ is from 0.0 mol % to 1.0 mol %;
$Ta_2O_5$ is from 0.0 mol % to 1.5 mol %;
$GeO_2$ is from 0.0 mol % to 0.5 mol %;
$CaO$ is from 0.0 mol % to 15.0 mol %;
$P_2O_5$ is from 0.0 mol % to 20.0 mol %;
$Al_2O_3$ is from 0.0 mol % to 2.5 mol %;
$ZnO$ is from 0.0 mol % to 5.5 mol %;
$MoO_3$ is from 0.0 mol % to 3.0 mol %;
$MgO$ is from 0.0 mol % to 15.0 mol %;
$Ga_2O_3$ is from 0.0 mol % to 5.0 mol %;
$Li_2O$ is from 0.0 mol % to 8.0 mol %;
$TeO_2$ is from 0.0 mol % to 10.0 mol %;
a total content of monovalent metal oxides ($R_2O$) is from 0.0 mol % to 15.0 mol %;
a total content of rare earth metal oxides ($RE_mO_n$) is from 0.0 mol % to 50.0 mol %;
a sum of $(As_2O_3+Sb_2O_3)$ is from 0.0 mol % to 1.0 mol %;
a sum of $(RE_mO_n+TiO_2+Nb_2O_5+ZrO_2+Bi_2O_3+WO_3)$ is 25.0 mol % or greater;
a sum of $(R2O+RO-BaO)$ is from 0.0 mol % to 20.0 mol %, where RO is a total content of divalent metal oxides; and
the glass is substantially free of fluorine, and wherein the glass satisfies formula (XII):

$$P_n-(0.815+0.25*P_d)-(0.16-0.38*T_i)>0.000 \qquad (XII)$$

where $P_n$ is a refractive index parameter having a value of 1.85 or greater and is calculated according to formula (VIII):

$$P_n=1.817-0.0035654*Al_2O_3-0.0038101*B_2O_3+\\
0.00081216*BaO+0.010373*Bi_2O_3+\\
0.00013728*CaO+0.0073116*Er_2O_3+\\
0.0055226*Gd_2O_3-0.003343*K_2O+\\
0.0060806*La_2O_3-0.0009011*Li_2O-\\
0.001967*Na_2O+0.0093799*Nb_2O_5+\\
0.0060396*Nd_2O_3-0.0061024*P_2O_5+\\
0.0040356*PbO-0.0032812*SiO_2+\\
0.0030562*TeO_2+0.0034148*TiO_2+\\
0.004267*WO_3+0.0034424*Y_2O_3+\\
0.0071109*Yb_2O_3+0.00096907*ZnO+\\
0.0026412*ZrO_2 \qquad (VIII)$$

where $P_d$ is a density parameter calculated according to formula (IX):

$$P_d=4.17-0.018843*Al_2O_3-0.020477*B_2O_3+\\
0.021988*BaO+0.074733*Bi_2O_3-\\
0.0024274*CaO+0.100258*Er_2O_3+\\
0.074270*Gd_2O_3-0.018568*K_2O+\\
0.060370*La_2O_3-0.0089006*Li_2O-\\
0.0090924*Na_2O+0.0062468*Nb_2O_5+\\
0.068993*Nd_2O_3-0.038868*P_2O_5+\\
0.048530*PbO-0.018196*SiO_2+$$

0.013124*TeO_2−0.005285*TiO_2+
0.044564*WO_3+0.022887*Y_2O_3+
0.097857*Yb_2O_3+0.0077032*ZnO+
0.012501*ZrO_2    (IX)

and
where $T_i$ is a transmittance index calculated according to formula (VI):

$$T_i = \frac{(La_2O_3 + Gd_2O_3 + ZrO_2)}{(La_2O_3 + Gd_2O_3 + ZrO_2 + TiO_2 + Nb_2O_5)} \quad (VI)$$

and each oxide listed in formula (VIII), formula (IX), and formula (VI) refers to the amount of the oxide, expressed in mol %, in the glass.

14. The glass of claim 13, wherein the glass has:
a refractive index $n_d$ of at least 1.85, as measured at a wavelength of 587.56 nm; and
a density $d_{RT}$, as measured at 25° C. (in g/cm³), and
wherein the glass satisfies formula (V):

$$n_d−(0.815+0.25*d_{RT})−(0.16−0.38*T_i)>0.000 \quad (V).$$

15. The glass of claim 13, wherein the glass satisfies formula (XIII):

$$P_n−(0.850+0.25*P_d)−(0.20−0.38*T_i)>0.000 \quad (XIII).$$

16. The glass of claim 13, wherein the glass has:
a refractive index $n_d$ of at least 1.95, as measured at a wavelength of 587.56 nm; and
a density $d_{RT}$, as measured at 25° C. (in g/cm³), and
wherein the glass satisfies formula (VII):

$$n_d−(0.850+0.25*d_{RT})−(0.20−0.38*T_i)>0.000 \quad (VII).$$

17. The glass of claim 13, wherein the glass has:
a refractive index $n_d$ of from 1.90 to 2.10, as measured at a wavelength of 587.56 nm; and
a density $d_{RT}$ of 5.5 g/cm³ or less, as measured at 25° C.

18. The glass of claim 13, wherein the glass satisfies at least one of formula (I) and formula (II), based on an amount of each oxide, in percent by mole of oxide:

$$0.0 \leq (SiO_2+Nb_2O_5+ZrO_2−RE_mO_n) \leq 12.0 \quad (I)$$

and $$\frac{(RE_mO_n − ZrO_2 − Nb_2O_5) \times (RE_mO_n − ZrO_2 − Nb_2O_5 − SiO_2)}{(RE_mO_n + ZrO_2 + Nb_2O_5 + SiO_2)} \leq 0.0 \quad (II)$$

where $RE_mO_n$ is the total content of rare earth metal oxides in terms of mole percent.

19. The glass of claim 13, wherein the glass comprises:
SiO_2 from 2.0 mol % to 36.0 mol %; and
B_2O_3 from 14.5 mol % to 48.0 mol %.

20. The glass of claim 13, wherein the glass is characterized by an ability to cool, in air, from 1100° C. to 500° C. in 2.5 minutes without crystallizing.

* * * * *

UNITED STATES PATENT AND TRADEMARK OFFICE
CERTIFICATE OF CORRECTION

PATENT NO.         : 11,802,073 B2
APPLICATION NO.    : 17/398541
DATED              : October 31, 2023
INVENTOR(S)        : Jian Luo et al.

It is certified that error appears in the above-identified patent and that said Letters Patent is hereby corrected as shown below:

On the Title Page

In item (72), in Column 1, "Inventors", Line 3, delete "Chungchongnam-do" and insert
-- Chungcheongnam-do --.

In item (56), in Column 2, under "Other Publications", Line 1, delete "-AI2O3-" and insert
-- -Al2O3- --.

On the page 2, in Column 2, under "Other Publications", Line 5, delete "TeL2-RnOm," and insert
-- TeO2-RnOm, --.

On the page 2, in Column 2, under "Other Publications", Line 5, delete "mandB2L3]" and insert
-- mandB2O3] --.

In the Claims

In Column 68, Line 49, in Claim 5, delete "(II)" and insert -- (II), --.

In Column 69, Line 63, in Claim 11, delete "(II)" and insert -- (II), --.

In Column 70, Line 38, in Claim 13, delete "(R20+RO-BaO)" and insert -- ($R_2O$+RO-BaO) --.

In Column 72, Line 18, in Claim 18, delete "(II)" and insert -- (II), --.

Signed and Sealed this
Second Day of July, 2024

Katherine Kelly Vidal
*Director of the United States Patent and Trademark Office*